(12) United States Patent
Wang et al.

(10) Patent No.: US 9,250,780 B2
(45) Date of Patent: Feb. 2, 2016

(54) INFORMATION PROCESSING METHOD AND ELECTRONIC DEVICE

(71) Applicant: Lenovo (Beijing) Co., Ltd., Beijing (CN)

(72) Inventors: Chao Wang, Beijing (CN); Jun Li, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 175 days.

(21) Appl. No.: 14/229,857

(22) Filed: Mar. 29, 2014

(65) Prior Publication Data

US 2015/0121300 A1 Apr. 30, 2015

(30) Foreign Application Priority Data

| Oct. 28, 2013 | (CN) | 2013 1 0516954 |
| Oct. 28, 2013 | (CN) | 2013 1 0517803 |
| Feb. 10, 2014 | (CN) | 2014 1 0046214 |

(51) Int. Cl.
  *G06F 3/048* (2013.01)
  *G06F 3/0484* (2013.01)
  *G06F 3/0481* (2013.01)
  *G06F 3/0488* (2013.01)

(52) U.S. Cl.
  CPC .......... *G06F 3/04845* (2013.01); *G06F 3/0481* (2013.01); *G06F 3/0488* (2013.01); *G06F 3/04883* (2013.01); *G06F 2203/04806* (2013.01)

(58) Field of Classification Search
  CPC .................................................. G06F 3/04845
  USPC ....................................................... 715/790
  See application file for complete search history.

(56) References Cited

U.S. PATENT DOCUMENTS

| 8,205,169 | B1 * | 6/2012 | Donohoe | G06F 9/4443 715/790 |
| 8,910,083 | B2 * | 12/2014 | Doucet | G06F 3/04845 455/418 |
| 8,963,962 | B2 * | 2/2015 | Ubillos | H04L 51/24 345/661 |
| 9,070,229 | B2 * | 6/2015 | Williamson | G06F 1/1626 |
| 2005/0188329 | A1 * | 8/2005 | Cutler | G06F 8/38 715/804 |
| 2005/0283734 | A1 * | 12/2005 | Santoro | G06F 3/0481 715/765 |
| 2007/0022389 | A1 * | 1/2007 | Ording | G06F 3/0481 715/790 |
| 2013/0111398 | A1 * | 5/2013 | Lu | G06F 3/0482 715/788 |
| 2013/0263047 | A1 * | 10/2013 | Allen | G06F 3/04845 715/790 |
| 2014/0229891 | A1 * | 8/2014 | O'Byrne | G06F 9/4443 715/790 |
| 2014/0380237 | A1 * | 12/2014 | Kroupa | G06F 3/0483 715/803 |
| 2015/0067581 | A1 * | 3/2015 | Wu | G06F 3/0482 715/784 |
| 2015/0082200 | A1 * | 3/2015 | Barker | G06F 17/30185 715/753 |
| 2015/0113476 | A1 * | 4/2015 | Deutsch | G06F 3/0481 715/799 |
| 2015/0121270 | A1 * | 4/2015 | Wang | G06F 3/0484 715/768 |
| 2015/0121302 | A1 * | 4/2015 | Wang | G06F 3/0482 715/800 |
| 2015/0205499 | A1 * | 7/2015 | Freeman | G06F 3/04845 715/711 |
| 2015/0227291 | A1 * | 8/2015 | Wang | G06F 3/0481 345/173 |

* cited by examiner

*Primary Examiner* — William Titcomb

(74) *Attorney, Agent, or Firm* — Harness, Dickey & Pierce, P.L.C.

(57) ABSTRACT

An information processing method and an electronic device are disclosed. The method includes: acquiring a triggering instruction for starting a first application program of the M application programs; executing the triggering instruction, and obtaining a first parameter; generating a first window interface of the first application program based on the first parameter; and displaying the first window interface, where a display area of the first window interface is less than a full-screen display area of the first application program on the display region.

28 Claims, 18 Drawing Sheets

INFORMATION PROCESSING METHOD AND ELECTRONIC DEVICE

This application claims the priority to Chinese Patent Application 201310516954.3, entitled "INFORMATION PROCESSING METHOD AND ELECTRONIC DEVICE", filed with the Chinese State Intellectual Property Office on Oct. 28, 2013, and Chinese Patent Application 201310517803.X, entitled "INFORMATION PROCESSING METHOD AND ELECTRONIC DEVICE", filed with the Chinese State Intellectual Property Office on Oct. 28, 2013, and Chinese Patent Application 201410046214.2, entitled "INFORMATION PROCESSING METHOD AND ELECTRONIC DEVICE", filed with the Chinese State Intellectual Property Office on Feb. 10, 2014, which are incorporated herein by reference in their entirety.

FIELD

The disclosure relates to the field of human-computer interaction technology, and particularly to an information processing method and an electronic device.

BACKGROUND

With the rapid development of electronic devices, software systems of electronic devices are rapidly updated. In order to improve user experience, many software systems of electronic devices support human-computer interaction. Interactions between users and application programs are implemented via application window interfaces for electronic devices supporting human-computer interaction, such as computers, tablet PCs and smart phones.

The screen size of the mobile terminal is small and the screen resolution is low at the early stage of development of the mobile terminal. An operation system of the mobile terminal such as Android system can only provide an application function of a single window in which only one application program is displayed, that is, the operation system only allows one application program to be in the foreground and to interact with a user. However, with rapid development of hardware of the mobile terminal, particularly with the improved screen resolution and the enlarged screen size, the single window application of the Android system can not meet user requirement of interacting with multiple application programs simultaneously, and it is an urgent requirement for the user that the operation system of the mobile terminal can provide an application function of multiple windows. However, some electronic devices do not support multi-window display due to technical limitations. Smart phone, which is inextricably linked with the people's lives, is taken as an example. The operating system of the smart phone is generally Android system, and most user interfaces of the Android system are achieved based on Activity. Generally, the Android system allows only one Activity to be in the foreground to interact with the user, and this limitation leads to a situation that the user can not use multiple applications simultaneously, such as simultaneously using chat software and a browser. Therefore, there is a technical problem in the prior art that multi-window display can not be achieved in electronic devices such as a smart phone and a pad.

In addition, in a case that the screen display region of the electronic device is increased and in a case that a non-full-screen window display is supported for the application program, i.e., all application programs in the electronic device are allowed to be displayed simultaneously on the display unit of the electronic device in non-full-screen windows, there is no solution about how to rotate the non-full-screen windows quickly and easily to save operating time and improve user experience if the non-full-screen windows need to be rotated.

In addition, in a case that various application programs are displayed in multiple non-full-screen windows by the user, a large amount of graphics buffer space is required to store graphics buffer data of the application program for each non-full-screen window, which seriously consumes memory of the electronic device and influences normal operation of the operation system.

SUMMARY

An information processing method is provided, which is applied to an electronic device, where the electronic device includes a touch display unit on which M application programs are capable of being run simultaneously, and M window interfaces of the M application programs are capable of being displayed simultaneously on a display region of the touch display unit, M is a positive integer, the method includes:

acquiring a triggering instruction for starting a first application program of the M application programs;

executing the triggering instruction, and obtaining a first parameter;

generating a first window interface of the first application program based on the first parameter; and displaying the first window interface, where a display area of the first window interface is less than a full-screen display area of the first application program on the display region.

Optionally, the first parameter at least includes a parameter value, a matrix, a parameter group or a parameter set.

Optionally, the method further includes, after the displaying the first window interface, acquiring a first operation instruction for controlling the first window interface;

executing the first operation instruction, and converting the first parameter into a second parameter;

converting the first window interface based on the second parameter to obtain a second window interface; and displaying the second window interface.

Optionally, the first parameter is a first matrix and the first matrix is inverse-transformable.

Optionally, the acquiring a first operation instruction for controlling the first window interface includes:

acquiring a move operation instruction for controlling the first window interface to move from a current position region to a first position region which is not completely overlapped with the current position region, where the current position region and the first position region are both on the display region, the executing the first operation instruction and converting the first parameter into a second parameter includes:

executing the move operation instruction to obtain at least one first conversion coefficient;

determining at least one first matrix element corresponding to the move operation instruction in the first matrix;

performing a first arithmetic on the at least one first matrix element with the at least one first conversion coefficient, to obtain at least one second matrix element; and generating a second matrix, where the second matrix is the second parameter, and the converting the first window interface based on the second parameter to obtain a second window interface includes:

acquiring, on the current position, a first position coordinate set of all data points of the first window interface; and performing a second arithmetic on each of position coordinates in the first position coordinate set sequentially with the second matrix, to obtain a second position coordinate set and thus the second window interface, where the second position coordinate set is a position coordinate set of all data points of the second window interface in the first position region.

Optionally, the acquiring a first operation instruction for controlling the first window interface includes:

acquiring a zooming operation instruction for controlling a display area of the first window interface to be adjusted from a current display area to a first display area not equal to the current display area, where the first display area is less than or equal to the full-screen display area, the executing the first operation instruction and converting the first parameter into a second parameter includes:

executing the zooming operation instruction to obtain at least one second conversion coefficient;

determining at least one third matrix element corresponding to the zooming operation instruction in the first matrix;

performing a third arithmetic on the at least one third matrix element with the at least one second conversion coefficient to obtain at least one fourth matrix element; and generating a third matrix, where the third matrix is the second parameter, and the converting the first window interface based on the second parameter to obtain a second window interface includes:

acquiring a third position coordinate set of all data points of the first window interface in a case that the display area of the first window interface is the current display area; and performing a fourth arithmetic on each of position coordinates in the third position coordinate set sequentially with the third matrix, to obtain a fourth position coordinate set and thus the second window interface, where the fourth position coordinate set is a position coordinate set of all data points of the second window interface having the first display area, and first content information displayed in the first window interface is the same as second content information displayed in the second window interface.

Optionally, the first parameter is a first matrix which is inverse-transformable, and the method further includes:

acquiring a touch instruction of an operator on the first window interface;

acquiring a position coordinate of a touch instruction of the operator on the first window interface;

performing inverse transformation on the first matrix to obtain a first inverse matrix;

performing a fifth arithmetic on the position coordinate with the first inverse matrix, to obtain a second position coordinate; and transmitting the second position coordinate to the first window interface to be used for responding the touch instruction on the first window interface.

Optionally, the acquiring a first operation instruction for controlling the first window interface includes:

acquiring a rotating operation instruction for controlling the first window interface to rotate, and the converting the first window interface based on the second parameter to obtain a second window interface includes:

rotating the first window interface based on the second parameter to obtain the second window interface, where the application program corresponding to the first window interface is displayed in the second window interface, and a display area of the second window interface is less than a display area of the touch display unit.

Optionally, the executing the first operation instruction and converting the first parameter into a second parameter includes:

parsing the first operation instruction to obtain first rotation angle information; and determining the second parameter based on the first rotation angle information, and the rotating the first window interface based on the second parameter includes:

rotating the first window interface based on the second parameter, where the first window interface rotates by an angle that equals to an angle in the first operation instruction for rotating the first window interface.

Optionally, the executing the first operation instruction and converting the first parameter into a second parameter includes:

determining the second parameter based on preset first rotation angle information, and the rotating the first window interface based on the second parameter includes:

rotating the first window interface based on the second parameter, where the first window interface rotates by an angle that corresponds to the preset first rotation angle information.

Optionally, in rotating the first window interface based on the second parameter, a parameter component corresponding to size of a display region of the second window interface in the second parameter keeps unchanged, so that the size of the display region of the second window interface keeps unchanged; or a parameter component corresponding to size of a display region of the second window interface in the second parameter is changed based on the first rotation angle information, so that all content in the second window interface is displayed on the touch display unit.

Optionally, the method further includes:

allocating a graphics buffer space to the first application program based on the first parameter, where the graphics buffer space of the first application program for the first window interface is less than graphics buffer space of the first application program for a full-screen display window interface; and storing graphics buffer data of the first application program in the allocated graphics buffer space.

Optionally, the method further includes:

reading the graphics buffer data of the first application program, and combining the graphics buffer data into frame buffer data corresponding to a screen display region of the electronic device; and displaying the frame buffer data in the first window interface of the first application program on the touch display unit of the electronic device.

Optionally, the allocating a graphics buffer space to the first application program based on the first parameter includes:

determining size of a display region of the first window interface of the first application program based on the first parameter;

determining graphics buffer data amount of the first application program based on the size of the display region of the first window interface and screen resolution of the electronic device; and allocating the graphics buffer space to the first application program based on the graphics buffer data amount of the first application program.

An electronic device is provided, where the electronic device includes a touch display unit on which M application programs are capable of being run simultaneously, and M window interfaces of the M application programs are capable of being displayed simultaneously on a display region of the touch display unit, M is a positive integer, the electronic device further includes:

a first acquisition unit, configured to acquire a triggering instruction for starting a first application program of the M application programs;

a first execution unit, configured to execute the triggering instruction and obtain a first parameter;

a first generation unit, configured to generate a first window interface of the first application program based on the first parameter; and a first display unit, configured to display the first window interface, where a display area of the first window interface is less than a full-screen display area of the first application program on the display region.

Optionally, the first parameter at least includes a parameter value, a matrix, a parameter group or a parameter set.

Optionally, the electronic device further includes:

a second acquisition unit, configured to acquire a first operation instruction for controlling the first window interface after the first window interface is displayed on the first display unit;

a second execution unit, configured to execute the first operation instruction and convert the first parameter into a second parameter;

a first conversion unit, configured to convert the first window interface based on the second parameter to obtain a second window interface; and a second display unit, configured to display the second window interface.

Optionally, the first parameter is a first matrix and the first matrix is inverse-transformable.

Optionally, the second acquisition unit includes:

a first acquisition sub-unit, configured to acquire a move operation instruction for controlling the first window interface to move from a current position region to a first position region which is not completely overlapped with the current position region, where the current position region and the first position region are both on the display region, the second execution unit includes:

a first execution sub-unit, configured to execute the move operation instruction to obtain at least one first conversion coefficient;

a first determination sub-unit, configured to determine at least one first matrix element corresponding to the move operation instruction in the first matrix;

a first arithmetic sub-unit, configured to perform a first arithmetic on the at least one first matrix element with the at least one first conversion coefficient, to obtain at least one second matrix element; and a first generation sub-unit, configured to generate a second matrix, where the second matrix is the second parameter, and the first conversion unit includes:

a fourth acquisition sub-unit, configured to acquire, on the current position, a first position coordinate set of all data points of the first window interface; and a second arithmetic sub-unit, configured to perform a second arithmetic on each of position coordinates in the first position coordinate set sequentially with the second matrix, to obtain a second position coordinate set and thus the second window interface, where the second position coordinate set is a position coordinate set of all data points of the second window interface in the first position region.

Optionally, the second acquisition unit includes:

a second acquisition sub-unit, configured to acquire a zooming operation instruction for controlling a display area of the first window interface to be adjusted from a current display area to a first display area not equal to the current display area, where the first display area is less than or equal to the full-screen display area, the second execution unit includes:

a second execution sub-unit, configured to execute the zooming operation instruction to obtain at least one second conversion coefficient;

a second determination sub-unit, configured to determine at least one third matrix element corresponding to the zooming operation instruction in the first matrix;

a third arithmetic sub-unit, configured to perform a third arithmetic on the at least one third matrix element with the at least one second conversion coefficient to obtain at least one fourth matrix element; and a second generation sub-unit, configured to generate a third matrix, where the third matrix is the second parameter, and the first conversion unit includes:

a fifth acquisition sub-unit, configured to acquire a third position coordinate set of all data points of the first window interface in a case that the display area of the first window interface is the current display area; and a fourth arithmetic sub-unit, configured to perform a fourth arithmetic on each of position coordinates in the third position coordinate set sequentially with the third matrix, to obtain a fourth position coordinate set and thus the second window interface, where the fourth position coordinate set is a position coordinate set of all data points of the second window interface having the first display area, and first content information displayed in the first window interface is the same as second content information displayed in the second window interface.

Optionally, the first parameter is a first matrix which is inverse-transformable, and the electronic device further includes:

a third acquisition unit, configured to acquire a touch instruction of an operator on the first window interface;

a fourth acquisition unit, configured to acquire a position coordinate of a touch instruction of the operator on the first window interface;

a second conversion unit, configured to perform inverse transformation on the first matrix to obtain a first inverse matrix;

a fifth arithmetic unit, configured to perform a fifth arithmetic on the position coordinate with the first inverse matrix, to obtain a second position coordinate; and a first transmission unit, configure to transmit the second position coordinate to the first window to be used for responding the touch instruction on the first window interface.

Optionally, the second acquisition unit includes:

a third acquisition sub-unit, configured to acquire a rotating operation instruction for controlling the first window interface to rotate, and the first conversion unit includes:

a rotation unit, configured to rotate the first window interface based on the second parameter to obtain the second window interface, where the application program corresponding to the first window interface is displayed in the second window interface, and a display area of the second window interface is less than a display area of the touch display unit.

Optionally, the third acquisition sub-unit is further configured to parse the first operation instruction to obtain first rotation angle information;

the fourth acquisition sub-unit is further configured to determine the second parameter based on the first rotation angle information; and the rotation unit is further configured to rotate the first window interface based on the second parameter, where the first window interface rotates by an angle that equals to an angle in the first operation instruction for rotating the first window interface.

Optionally, the fourth acquisition sub-unit is further configured to determine the second parameter based on preset first rotation angle information; and the rotation unit is further configured to rotate the first window interface based on the second parameter, where the first window interface rotates by an angle that corresponds to the preset first rotation angle information.

Optionally, in the rotation unit rotating the first window interface based on the second parameter, a parameter component corresponding to size of a display region of the second window interface in the second parameter keeps unchanged, so that the size of the display region of the second window interface keeps unchanged; or a parameter component corresponding to size of a display region of the second window interface in the second parameter is changed based on the first rotation angle information, so that all content in the second window interface is displayed on the touch display unit.

Optionally, the electronic device further includes a first allocation unit and a first storage unit, where the first allocation unit is configured to allocate a graphics buffer space to the first application program based on the first parameter, where the graphics buffer space of the first application program for the first window interface is less than graphics buffer space of the first application program for a full-screen display window interface; and the first storage unit is configured to store graphics buffer data of the first application program in the allocated graphics buffer space.

Optionally, the electronic device further includes a first reading unit, where the first reading unit is configured to read the graphics buffer data of the first application program, and combining the graphics buffer data into frame buffer data corresponding to a screen display region of the electronic device; and the touch display unit is further configured to display the frame buffer data in the first window interface of the first application program.

Optionally, the first allocation unit includes a third determination sub-unit, a fourth determination sub-unit and a first allocation sub-unit, where the third determination sub-unit is configured to determine size of a display region of the first window interface of the first application program based on the first parameter;

the fourth determination sub-unit is configured to determine graphics buffer data amount of the first application program based on the size of the display region of the first window interface and screen resolution of the electronic device; and the first allocation sub-unit is configured to allocate the graphics buffer space to the first application program based on the graphics buffer data amount of the first application program.

The technical problem in the prior art that multi-window display can not be achieved in the electronic deice is solved by the information processing method and the electronic device provided in the embodiments of the disclosure. Therefore, when multiple application programs are run, multiple application window interfaces of the multiple application programs can be displayed simultaneously on the display unit of the electronic device in non-full-screen size.

In the embodiments of the disclosure, the touch display unit can simultaneously display M window interfaces of M application programs. For the first application program in the M application programs, a triggering instruction for triggering the first application program is firstly acquired, a first parameter for generating a first window interface of the first application program is obtained when the triggering instruction is executed, and the first window interface, whose display area is less than the full-screen display area of the first application program on the display region, is generated based on the first parameter. Therefore, the technical problem in the prior art that multi-window display can not be achieved in the electronic device is effectively solved, and multiple application window interfaces of multiple application programs are simultaneously displayed on the display unit of the electronic device in non-full-screen display size when the multiple application programs are run.

In the embodiments of the disclosure, the first parameter may be converted, based on a touch operation of a user on the displayed first window interface, into a second parameter corresponding to the touch operation, and the first window interface may be converted into a second window interface based on the second parameter. The first parameter may be a matrix, i.e., a first matrix. Specifically, when an operation such as moving, zooming or triggering, which corresponds to a touch operation of moving, zooming or triggering, are performed on the first window interface, corresponding arithmetic are performed on the first matrix to obtain a second matrix, a third matrix or a first inverse matrix which can achieve an expected operation effect. In summary, a conversion matrix can be obtained flexibly from the first matrix based on the operation instruction, and thus an expected second window interface can be obtained. The operation performed on the window interface by the user is unknown to the application program. That is, the window interface is not needed to be re-constructed and drawn, which effectively solves the technical problem in the prior art that the window interface can not be adjusted and displayed flexibly in the multi-window display of the electronic device, and achieves the technical effect that the window interface is not needed to be re-constructed and drawn in adjusting the window interface, and the display of contents in the window interface is not limited by the application program, so as to flexibly adjust and display multi-window interface.

In the embodiments of the disclosure, in zooming the first window interface, the content displayed in the window interface after the zooming is the same as the content displayed in the window interface before the zooming, and after the user performs a touch operation on the interactive object (i.e., a touch point) on the first window interface, an arithmetic is performed on the position coordinate of the touch point with the inverse matrix of the first matrix to obtain the position coordinate of the touch point when the first application program is displayed in a full-screen display manner, and thereby a user event corresponding to the touch point can be triggered, which effectively solves the technical problem in the prior art that the contents in the touch region of the window interface is lessened when the size of the application window interface is less than the screen size, and achieves the technical effect that when multiple applications reuse one actual screen, each application has a full virtual screen and the touch region of application window interface is unchanged.

In the embodiments of the disclosure, when the user performs a touch operation on the first window interface, the change of the first window interface can not be sensed by the application program, therefore, the window interface needs not to be adjusted, that is, the developers do not need to consider operating system environments to which the application program is to be applied in developing the application program, which effectively solves the technical problem that the writing of the application program is limited by the operating system, and achieves the technical effect that the development of the application program is independent from the operating system environments.

In the embodiments of the disclosure, a first window interface is rotated by utilizing a second parameter to obtain a second window interface, thereby implementing a second window display, i.e., a non-full-screen window display. Further, the operation of rotating the first window interface may be implemented by a specific operation. Therefore, the first window may be rotated quickly and easily, which saves operating time and improves user experience.

In the embodiments of the disclosure, a corresponding graphics buffer space is allocated to the first application program by the electronic device based on a window parameter of the first application program. For example, in a case that the window interface of the first application program is smaller, less graphic buffer space is allocated to the first application program, and in a case that the window interface of the first application program is larger, more graphic buffer space is allocated to the first application program, so that data displayed in the non-full-screen window can be identified clearly by the user. Here, graphics buffer space of the non-full-screen window of the first application program is less than graphics buffer space of a full-screen window of the first application program. Therefore, the first application program is displayed by drawing graphics buffer data less than graphics buffer data of a full-screen window interface, which saves memory space of the electronic device and reduces the influence on the electronic device due to memory occupied by the graphics buffer data.

DETAILED DESCRIPTION

An information processing method and an electronic device are provided by embodiments of the disclosure, to solve the technical problem in the prior art that multi-window display can not be achieved in the electronic device and to achieve the technical effect of simultaneously displaying on a display unit of the electronic device multiple application window interfaces of multiple application programs in a non-full-screen display manner when the multiple application programs are run.

A technical solution of the embodiments of the disclosure is to solve the above-mentioned technical problems, and the general idea is as follows:

An electronic device is provided to acquire a triggering instruction for triggering a first application program of M application programs, execute the triggering instruction and obtain a first parameter; generate a first window interface of the first application program based on the first parameter, and display the first window interface, where a display area of the first window interface is less than a full-screen display area of the first application program on the display region.

It can be seen that, the touch display unit can simultaneously display thereon M window interfaces of M application programs. A first application program of the M application programs is taken as an example, a triggering instruction for triggering the first application program is firstly acquired, a first parameter for generating a first window interface of the first application program is obtained when the triggering instruction is executed, and the display area of the first window interface generated based on the first parameter is less than the full-screen display area of the first application program on the display region, which effectively solves the technical problem in the prior art that multi-window display can not be achieved in the electronic device and achieves the technical effect of simultaneously displaying on the display unit of the electronic device multiple application window interfaces of multiple application programs in a non-full-screen display manner when the multiple application programs are run.

To make those skilled in the art understand the disclosure more clearly, the technical solution of the disclosure will be described in detail by way of embodiments in conjunction with drawings hereinafter. It should be understood that the disclosure and specific features in the embodiments are intended to describe the technical solution of the disclosure in detail, but not to limit the technical solution of the disclosure. Embodiments of the disclosure and the specific features in the embodiments can be combined without collision.

Figure 1:
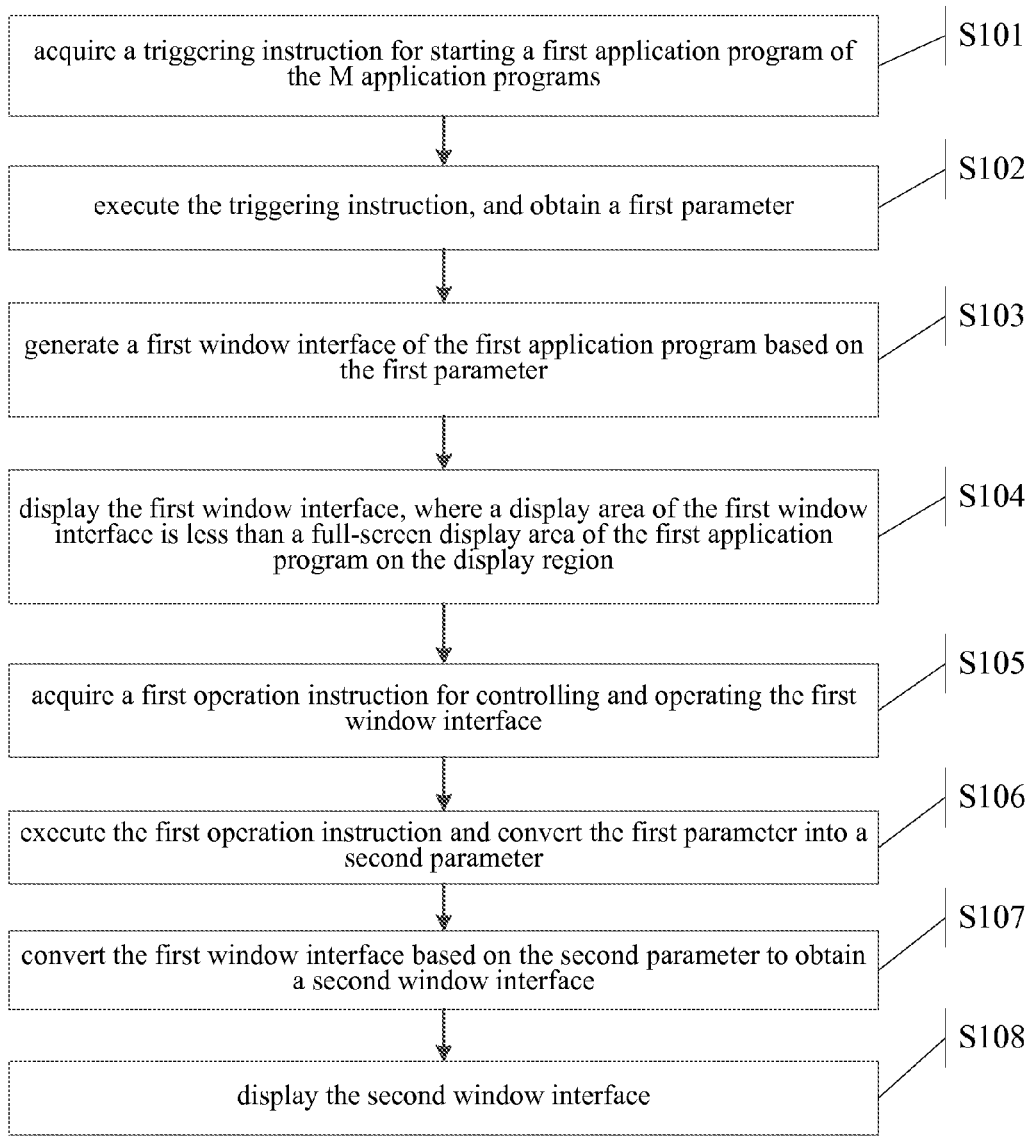
FIG. 1 is a schematic flow chart of an information processing method according to an embodiment of the disclosure.

Referring to FIG. 1, an embodiment of the disclosure provides an information processing method applied to an electronic device, the electronic device includes a touch display unit, and a display region of the touch display unit is capable of simultaneously displaying thereon M window interfaces of M application programs, M is a positive integer. The method includes the following steps S101 to S104.

S101 is acquiring a triggering instruction for triggering a first application program of the M application programs.

S102 is executing the triggering instruction and obtaining a first parameter. The first parameter may be, for example, a number, an array, a determinant or a matrix.

S103 is generating a first window interface of the first application program based on the first parameter.

S104 is displaying the first window interface.

The display area of the first window interface is less than the full-screen display area of the first application program on the display region.

In an implementation, an electronic device including a touch display unit, such as a smart phone, a pad and a touch notebook, is installed with M application programs such as a browser, a video player, a chat tool and a game. Multiple shortcuts of these application programs are established on the touch display unit of the electronic device. If a user wants to use N application programs of these application programs, the user may trigger the shortcuts of the application programs to be used on the touch display unit. After detecting the user's triggering operation, the electronic device may generate a triggering instruction in response to the user's triggering operation and assign the triggering instruction to the triggered application programs to start the application programs. The touch display unit may be a touch display screen, such as a capacitive touch screen, a resistive touch screen, a voltage touch screen and an infrared touch screen. If the user clicks a shortcut icon of a chat tool (such as QQ, Wechat) or a shortcut icon of a video player (such as Tudou, Youku) on a phone screen when chatting or watching a video on a touch phone, the phone system may acquire the triggering operation by a sensing element on the touch display screen, acquire the triggering instruction by analyzing the triggering operation, and acquire an application program the triggering instruction points to, and then assign the triggering instruction to the chat tool software and the video player software.

In an implementation, in order to allow the N first window interfaces of the N objects to be all in the foreground and interacted with the user to achieve the multi-window application, a Window Activity Module (Activity) and a Task Management Module (Task) may be adjusted. While the triggering instruction is executed and the N first window interfaces of the N objects are laid out and drawn, N Activities of the N first window interfaces are started, and the N Activities are made to be in a restart state (i.e., a Resumed state).

Further, when the triggering instruction is executed, each triggering instruction corresponds to a first parameter. The first parameter may be default or may be generated in executing the user's operation instruction. The first parameter affects area and position of a window interface of the triggered application program on the display unit. For the electronic device, the received N triggering instructions for triggering N different application programs are different, and N first parameters corresponding to the N different triggering instructions may be the same or may be different. If the N first parameters are same, each window interface of application program is presented on the display unit with a same area and a same position region. In contrast, if the N first parameters are different, N application window interfaces are presented with different areas and/or different position regions. In order to display multiple application window interfaces on the display region with a limited area, each application window interface is displayed in a non-full-screen display manner, i.e., the area of each window interface is smaller than the area of the display region.

To facilitate the user to perform various touch operations on the opened first window interface so as to achieve flexible adjustment of the application window interface, the method further includes steps S105 to S108 after the N first window interfaces are displayed simultaneously on the display region.

S105 is acquiring a first operation instruction for controlling and operating the first window interface.

S106 is executing the first operation instruction and converting the first parameter into a second parameter.

S107 is converting the first window interface based on the second parameter to obtain a second window interface.

S108 is displaying the second window interface.

The first operation instruction may be a move operation instruction for controlling the position of the window interface to move, or may be a zooming operation instruction for controlling the area of the window interface to be changed, or may be a triggering operation instruction for triggering an interactive object on the first window interface, where the interactive object is a user event corresponding to the touch point, such as clicking to open a web page. In order to understand, from a mathematical point of view, a relationship between the first parameter and the second parameter and an implementation process of window conversion more clearly, three cases of the acquired first operation instruction being respectively a move operation instruction, a zooming operation instruction and a triggering operation instruction will be described hereinafter in conjunction with the first parameter being the first matrix which is inverse-transformable.

Figure 2:
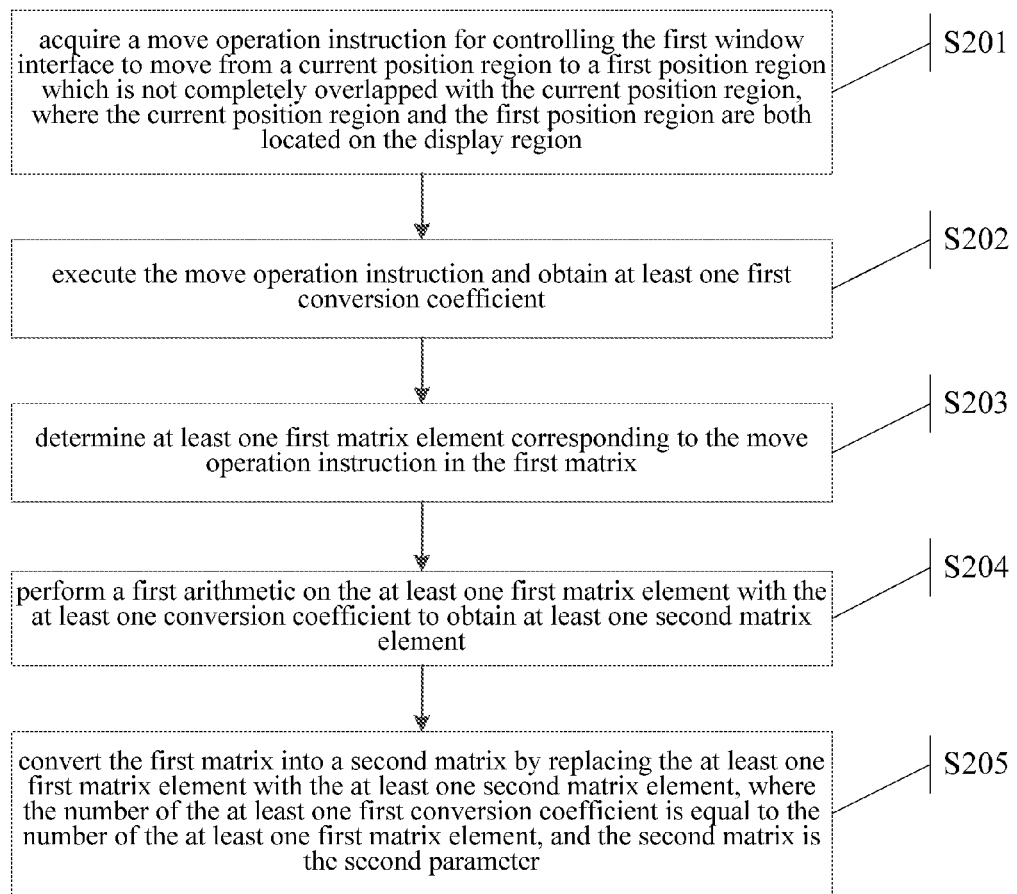
FIG. 2 is a schematic flow chart of a method for executing a move operation instruction according to an embodiment of the disclosure.

(1) The move operation to the first window interface. Referring to FIG. 2, steps S105 and S106 include steps S201-S205.

S201 is acquiring a move operation instruction for controlling the first window interface to move from a current position region to a first position region which is not completely overlapped with the current position region, where the current position region and the first position region are both located on the display region.

S202 is executing the move operation instruction and obtain at least one first conversion coefficient.

S203 is determining at least one first matrix element corresponding to the move operation instruction in the first matrix.

S204 is performing a first arithmetic (addition in the embodiment) on the at least one first matrix element with the at least one first conversion coefficient, to obtain at least one second matrix element.

S205 is converting the first matrix into a second matrix by replacing the at least one first matrix element with the at least one second matrix element.

The number of the at least one first conversion coefficient is equal to the number of the at least one first matrix element, and the second matrix is the second parameter.

Figure 3A:
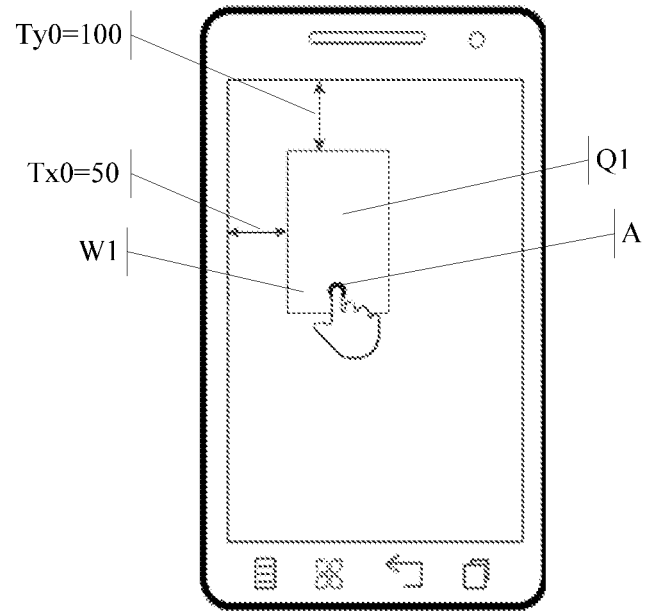
FIGS. 3a-3c are schematic diagrams of moving a window interface according to an embodiment of the disclosure.
Figure 3B:
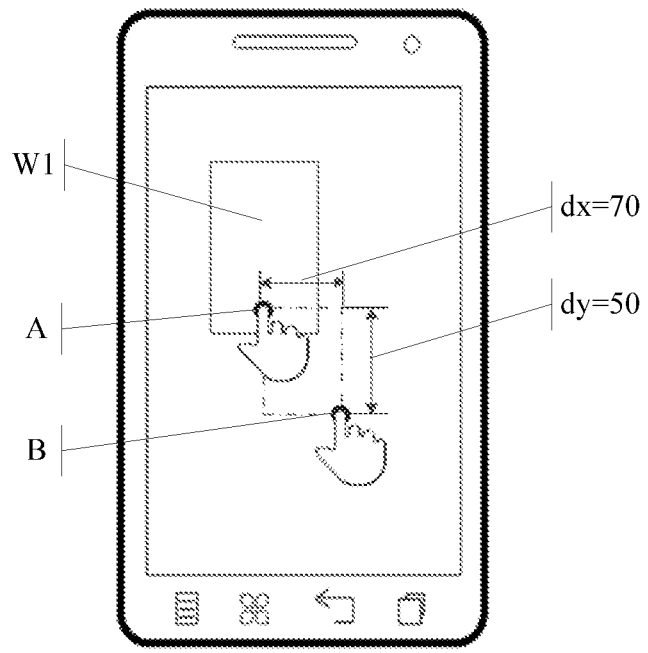
Figure 3C:
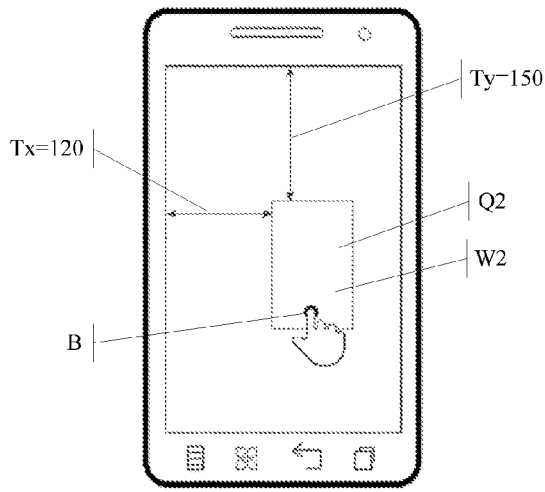

An example is taken to make an illustration below. Referring to FIGS. 3a-3c, a first window interface W1 is moved from a current position region Q1 to a first position region Q2 by a moving touch operation of a finger, to obtain a second window interface W2.

As shown in FIG. 3a, when the user starts an application program and the first window interface W1 of the application program is opened, the first window interface is disposed by the electronic device in default in a position which has a distance of 50 pixels from the left edge of the screen, i.e., Tx0=50, and has a distance of 100 pixels from the upper edge of the screen, i.e., Ty0=100, and the width and height of the first window interface are respectively ⅓ width and ⅓ height of the full-screen display. That is, to achieve the display effect of the first window interface W1 in FIG. 3a, the first matrix of the current position region of the first window interface is $$M1 = \begin{bmatrix} 1/3 & 0 & 50 \\ 0 & 1/3 & 100 \\ 0 & 0 & 1 \end{bmatrix}.$$

It is determined that matrix parameters related to the window position moving in the first matrix are the number at the first row in the third column and the number at the second row in the third column As shown in FIGS. 3b and 3c, when performing a move operation on the first window interface, the user may select and press some point for a long time with a finger, and then drag the point from position A to position B. The change of the position of the point is used as a change of the position of the first window interface. It can be known that the first window interface is moved to the right in the horizontal direction by 70 pixels, i.e., dx=70, and is moved down in the vertical direction by 50 pixels, i.e., dy=50. Thus, the final position value of the second window interface W2 may be calculated by respectively calculating the value in the horizontal direction and the value in the vertical direction based on the position initial value Tx0=50 and Ty0=100 and the position change value dx=70 and dy=50, where the final position has a distance of Tx=Tx0+dx=50+70=120 pixels from the left edge of the screen and has a distance of Ty=Ty0+dy=100+50=150 pixels from the upper edge of the screen.

Then, the second matrix of the second window interface W2 may be obtained as follows:

$$M2 = \begin{bmatrix} 1/3 & 0 & Tx \\ 0 & 1/3 & Ty \\ 0 & 0 & 1 \end{bmatrix} = \begin{bmatrix} 1/3 & 0 & Tx0+dx \\ 0 & 1/3 & Ty0+dy \\ 0 & 0 & 1 \end{bmatrix} = \begin{bmatrix} 1/3 & 0 & 120 \\ 0 & 1/3 & 150 \\ 0 & 0 & 1 \end{bmatrix} \quad (1)$$

Where dx and dy are the at least a first conversion coefficient. In the embodiment, the first window interface is moved in both the horizontal direction and the vertical direction, and thus there are two first conversion coefficients. If the first window interface is only moved rightward in the horizontal direction by dx pixels, there is only one first conversion coefficient, in this case, the second matrix corresponding to the position of the second window interface may be obtained as follows:

$$M2' = \begin{bmatrix} 1/3 & 0 & 50+dx \\ 0 & 1/3 & 100 \\ 0 & 0 & 1 \end{bmatrix}.$$

Similarly, if the first window interface is only moved downwards in the vertical direction by dy pixels, the second matrix may be obtained as follows:

$$M2'' = \begin{bmatrix} 1/3 & 0 & 50 \\ 0 & 1/3 & 100+dy \\ 0 & 0 & 1 \end{bmatrix}.$$

The relationship between the first matrix and the second matrix in other cases may be obtained in the same manner.

Further, coordinates of the pixels on the second window interface corresponding to the second matrix may be calculated based on the obtained second matrix M2. A first position coordinate set of all data points (i.e., pixels) of the first window interface may be firstly obtained on the current region. A data point is taken as an example. Provided that the three-dimensional coordinate of the data point is $(x_0, y_0, z_0)$, and the three-dimensional coordinate is multiplied with the second matrix to obtain the coordinate $(x_1, y_1, z_1)$ of the point on the second window interface after conversion:

$$[x_t \ y_t \ z_t] = [x_0 \ y_0 \ z_0] \times \begin{bmatrix} 1/3 & 0 & 120 \\ 0 & 1/3 & 150 \\ 0 & 0 & 1 \end{bmatrix} \quad (2)$$

Each position coordinate in the first position coordinate set is selected sequentially on which the second arithmetic, i.e., multiplication, is performed with the second matrix, to obtain a second position coordinate set, and thus the second window interface. The second position coordinate set is a position coordinate set of all data points of the second window interface in the first position region.

Figure 4:
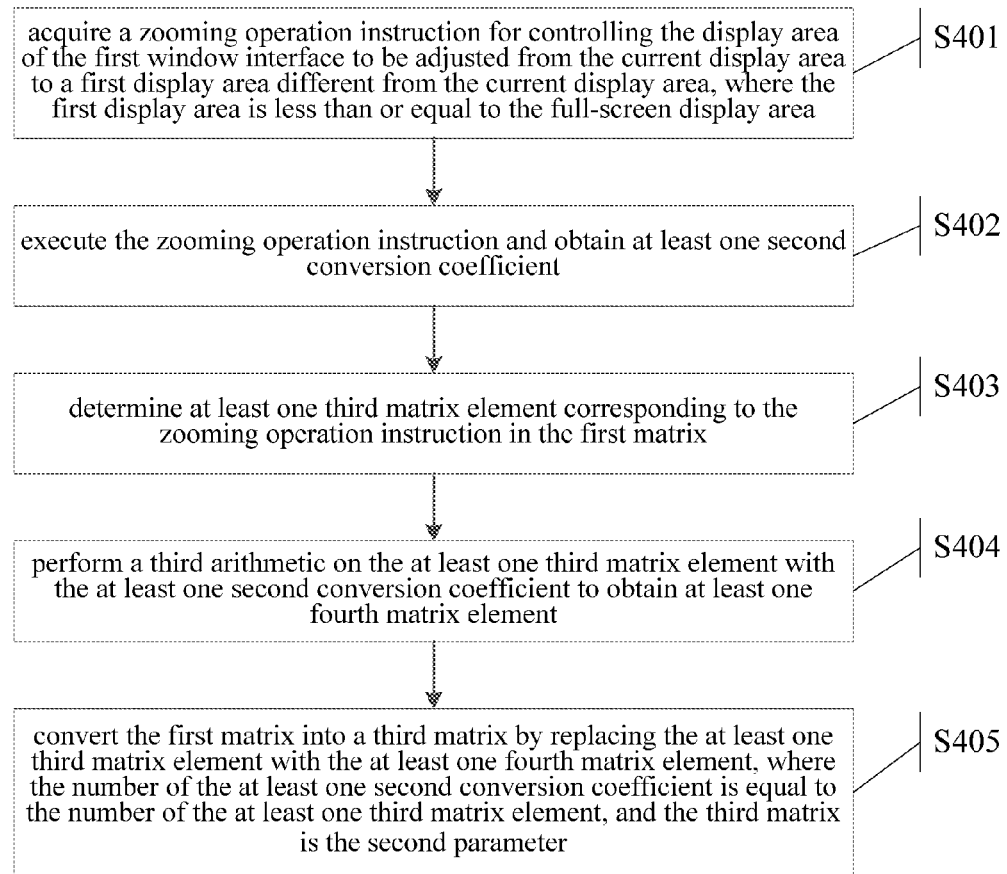
FIG. 4 is a schematic flow chart of a method for executing a zooming operation instruction according to an embodiment of the disclosure.

(2) The zooming operation to the first window interface. Referring to FIG. 4, steps S105 and S106 include the following steps S401-S405.

S401 is acquiring a zooming operation instruction for controlling the display area of the first window interface to be adjusted from the current display area to a first display area different from the current display area, where the first display area is less than or equal to the full-screen display area.

S402 is executing the zooming operation instruction and obtaining at least one second conversion coefficient.

S403 is determining at least one third matrix element corresponding to the zooming operation instruction in the first matrix.

S404 is performing a third arithmetic such as multiplication on the at least one third matrix element with the at least one second conversion coefficient to obtain at least one fourth element matrix.

S405 is converting the first matrix into a third matrix by replacing the at least one third matrix element with the at least one fourth matrix element.

The number of the at least one second conversion coefficient is equal to the number of the at least one third matrix element, and the third matrix is the second parameter.

Figure 5:
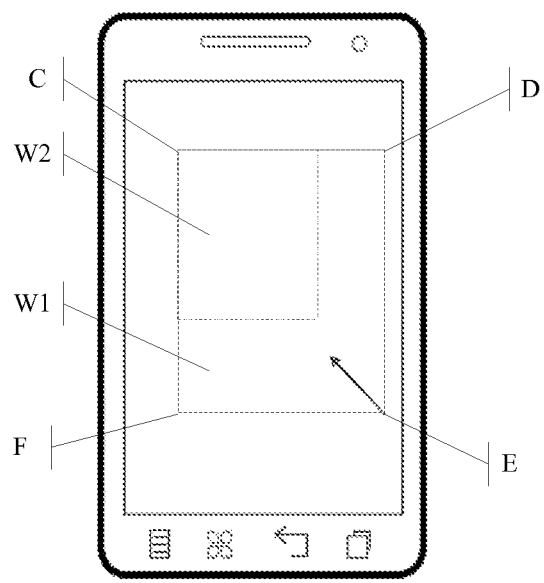
FIG. 5 is a schematic diagram of zooming a window interface according to an embodiment of the disclosure.

Referring to FIG. 5, the first window interface W1 have four vertices C, D, E and F. In the embodiment, if the vertex C is selected as the reference point for the position moving, i.e., whether the position is moved is determined by whether the distance from the vertex C to the upper edge and left edge of the display screen is changed, the position of the point C should not be changed if only the area but not the position of the first window interface is changed.

For example, the first matrix corresponding to the first window interface is $$M1 = \begin{bmatrix} 1/3 & 0 & 50 \\ 0 & 1/3 & 100 \\ 0 & 0 & 1 \end{bmatrix},$$

and the width and height of the first window interface is ⅓ width and ⅓ height of the full-screen display. The matrix corresponding to the full-screen window interface is an identity matrix M0=

$$M0 = \begin{bmatrix} 1 & 0 & 0 \\ 0 & 1 & 0 \\ 0 & 0 & 1 \end{bmatrix}.$$

The experience shows that the number $m_{11}$ at the first row in the first column and the number $m_{22}$ at the second row in the second column of the first matrix are related to the window area conversion, i.e., $m_{11}=⅓$, $m_{22}=⅓$ in the first matrix M1. If the user wants to view other application windows conveniently and scale down the area of the first window interface to n=¼ times of the current area, i.e., the width and height of the finally obtained second window interface are ¼ width and ¼ height of the first window interface not converted. The third matrix corresponding to the second window interface is:

$$M3 = \begin{bmatrix} m_{11} \times n & 0 & 50 \\ 0 & m_{22} \times n & 100 \\ 0 & 0 & 1 \end{bmatrix} = \quad (3)$$

$$\begin{bmatrix} \frac{1}{3} \times \frac{1}{4} & 0 & 50 \\ 0 & \frac{1}{3} \times \frac{1}{4} & 100 \\ 0 & 0 & 1 \end{bmatrix} = \begin{bmatrix} 1/12 & 0 & 50 \\ 0 & 1/12 & 100 \\ 0 & 0 & 1 \end{bmatrix}$$

Equation (3) is a case that the first window interface is scaled down by n=¼ times. However, in an implementation, there is also a case that the first window interface is non-proportionally scaled down by n=¼ times, then the third matrix may be $$\begin{bmatrix} \frac{1}{3} \times n^2 & 0 & 50 \\ 0 & 1/3 & 100 \\ 0 & 0 & 1 \end{bmatrix} \text{ or } \begin{bmatrix} 1/3 & 0 & 50 \\ 0 & \frac{1}{3} \times n^2 & 100 \\ 0 & 0 & 1 \end{bmatrix}.$$

In this case, a distortion of the second window interface may occur, for example, the window image is elongated or widened. Therefore, the non-proportional scaling is rarely used in practice.

In an implementation, a zooming operation and a move operation may be both performed on the window. For example, if the user wants to watch a video by the first window interface in a full-screen display manner, it is required to enlarge the first window image to be a second window image displayed in the full-screen. In this case, the position of the vertex C relative to the edge of the screen is changed, i.e., the first window interface is enlarged by three times, and the first window interface is moved to the left in the horizontal direction by 50 pixels and moved upwards in the vertical direction by 70 pixels, then the conversion process of the third matrix is $$M3 = \begin{bmatrix} m_{11} \times n & 0 & m_{13} \\ 0 & m_{22} \times n & m_{23} \\ 0 & 0 & 1 \end{bmatrix} = \quad (4)$$

$$\begin{bmatrix} \frac{1}{3} \times 3 & 0 & 50-50 \\ 0 & \frac{1}{3} \times 3 & 100-100 \\ 0 & 0 & 1 \end{bmatrix} = \begin{bmatrix} 1 & 0 & 0 \\ 0 & 1 & 0 \\ 0 & 0 & 1 \end{bmatrix}$$

Where $m_{13}$ and $m_{23}$, which are the number at the first row in the third column and the number at the second row in the third column, are matrix parameters of position moving.

Similarly, coordinates of pixels in the second window interface corresponding to the third matrix may be calculated based on the obtained third matrix M3. A third position coordinate set of all data points of the first window interface is firstly acquired in a case that the display area of the first window interface is the current display area. Each position coordinate of the third position coordinate set is then selected sequentially on which a fourth arithmetic, such as multiplication, is performed with the third matrix, to obtain a fourth position coordinate set and thus the second window interface. The calculation process is the same as that of moving the window interface described above, and thus is not described herein.

The fourth position coordinate set is a position coordinate set of all data points of the second window interface whose display area is the first display area. First content information displayed in the first window interface is the same as second content information displayed in the second window interface, that is, the displayed content of the second window interface is not changed as the window interface becomes larger or smaller.

Figure 6:
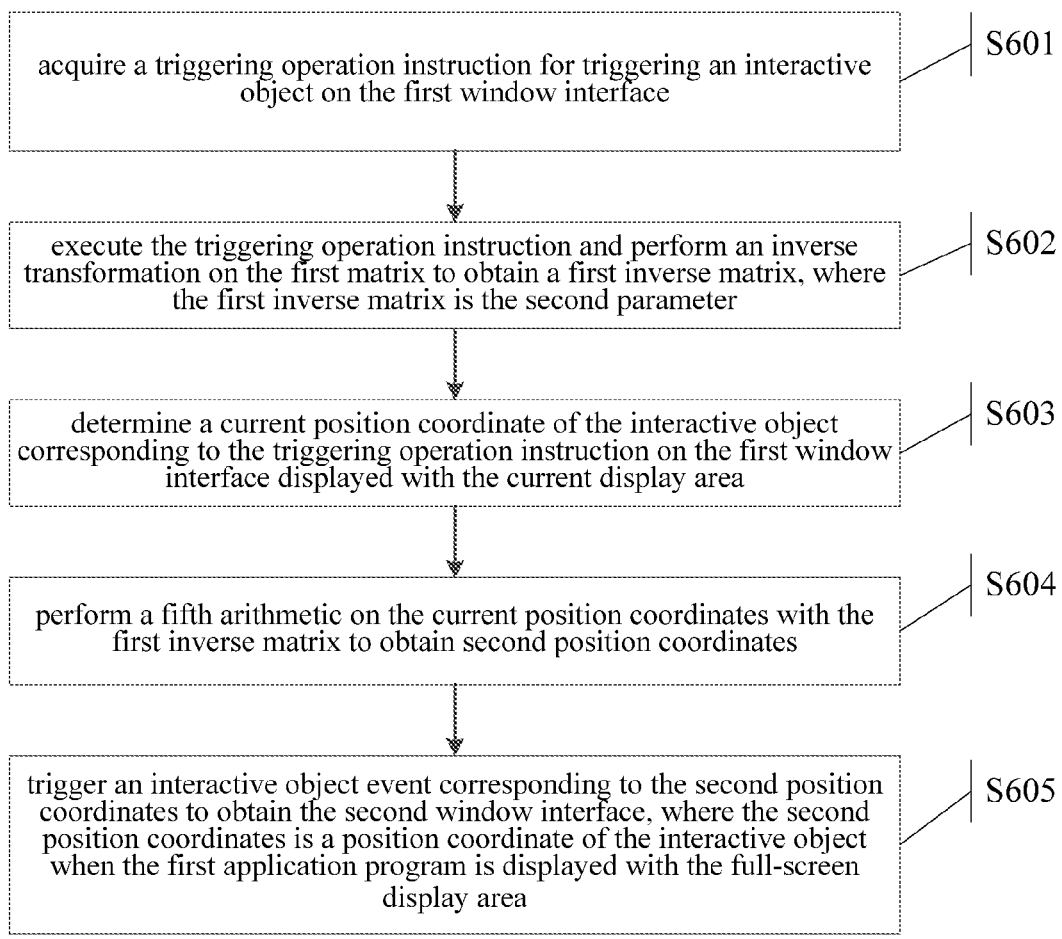
FIG. 6 is a schematic flow chart of a method for executing a triggering operation instruction according to an embodiment of the disclosure.

(3) The triggering operation to an interactive object on the first window interface. Referring to FIG. 6, steps S105-S107 include the following steps S601-S605.

S601 is acquiring a triggering operation instruction for triggering an interactive object on the first window interface.

S602 is executing the triggering operation instruction and performing an inverse transformation on the first matrix to obtain a first inverse matrix, where the first inverse matrix is the second parameter.

S603 is determining a current position coordinate of the interactive object corresponding to the triggering operation instruction on the first window interface which is displayed with the current display area.

S604 is performing a fifth arithmetic, such as multiplication, on the current position coordinate with the first inverse matrix to obtain a second position coordinate.

S605 is triggering an interactive object event corresponding to the second position coordinate, i.e., a user event corresponding to the touch point, to obtain the second window interface.

The second position coordinate is a position coordinate of the interactive object in a case that the first application program is displayed with a full-screen display area.

Each application program has a virtual full-screen. When a user clicks a touch point on a non-full-screen window interface of a application program, a coordinate point of the touch point in a case that the application program is displayed in full-screen is used to response, and there is an inverse transformation in this process. For example, referring to FIG. 7, the user opens a home page of the browser which includes many application event buttons with links, such as "Taobao sale", "Sina". If the user clicks "Taobao sale" on the first window interface, as point $D_1$ ($x_1$, $y_1$, $z_1$) in FIG. 7, point $D_2$ ($x_2$, $y_2$, $z_2$) corresponding to a position of point $D_1$ in a case that the first window interface is displayed in full-screen needs to be solved out. Since the first window interface is obtained by performing an arithmetic on the full-screen window interface with the first matrix, an inverse transformation needs to be performed to obtain the coordinate of point $D_2$ corresponding to point $D_1$. An inverse matrix of the first matrix needs to be obtained by calculation. The first matrix:

$$M1 = \begin{bmatrix} 1/3 & 0 & 50 \\ 0 & 1/3 & 100 \\ 0 & 0 & 1 \end{bmatrix}$$

is still taken as an example. According to basic knowledge of matrix conversion, the inverse matrix of the first matrix M1 is $$M1^{-1} = \begin{bmatrix} 3 & 0 & -50 \\ 0 & 3 & -100 \\ 0 & 0 & 1 \end{bmatrix},$$

therefore, $$[x_2 \quad y_2 \quad z_2] = [x_1 \quad y_1 \quad z_1] \times \tag{5}$$

$$M1^{-1} = [x_1 \quad y_1 \quad z_1] \times \begin{bmatrix} 1/3 & 0 & 120 \\ 0 & 1/3 & 150 \\ 0 & 0 & 1 \end{bmatrix}$$

Therefore, point $D_2$ ($x_2$, $y_2$, $z_2$) corresponding to point $D_1$ ($x_1$, $y_1$, $z_1$) is obtained, so that the user event pointed by point $D_1$ may be opened. The above example describes opening a new web page through another web page. Alternatively, the user event pointed by point $D_1$ may be a shortcut button for changing appearance of the window interface such as zooming in or out the window interface. Therefore, the display state of the first window interface may be adjusted by triggering point $D_1$.

Further, if the first operation instruction obtained by electronic device is to rotate the first window interface by a certain angle, a matrix parameter corresponding to the rotating operation in the first matrix may be changed accordingly.

For example, if the first window interface is rotate to the left by a certain angle, the first matrix $$M1 = \begin{bmatrix} 1/3 & 0 & 50 \\ 0 & 1/3 & 100 \\ 0 & 0 & 1 \end{bmatrix}$$

is converted into a fourth matrix $$M4 = \begin{bmatrix} \frac{1}{3}\cos(a) & \sin(b) & 50 \\ \sin(c) & \frac{1}{3}\cos(d) & 100 \\ 0 & 0 & 1 \end{bmatrix},$$

where values of a, b, c and d are related to the rotation angle, which may be determined by those skilled in the art according to specific situation. The obtained coordinates of the pixels on the second window interface after the rotation may be obtained by multiplying the coordinates of the pixels on the first window interface with the fourth matrix.

Figure 8:
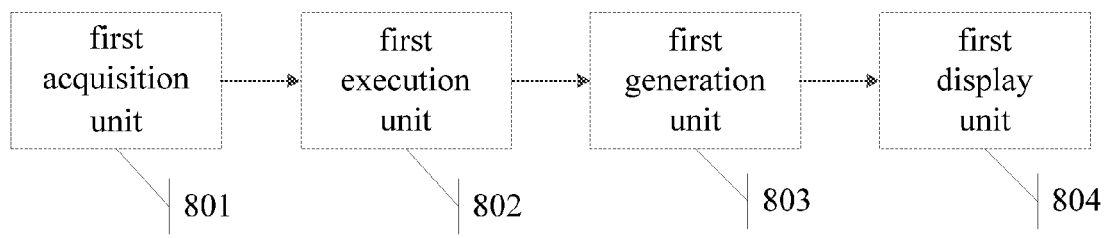
FIG. 8 is a structure block diagram of an electronic device according to an embodiment of the disclosure.

Referring to FIG. 8, an electronic device is provided according to an embodiment of the disclosure. M window interfaces of M application programs can be simultaneously displayed on a display region of a touch display unit, where M is a positive integer. The electronic device includes the following units 801-804.

A first acquisition unit 801 is configured to acquire a triggering instruction for triggering and starting a first application program of the M application programs.

A first execution unit 802 is configured to execute the triggering instruction and obtain a first parameter.

A first generation unit 803 is configured to generate a first window interface of the first application program based on the first parameter.

A first display unit 804 is configured to display the first window interface.

A display area of the first window interface is less than a full-screen display area of the first application program on the display region.

To facilitate the user to perform various touch operations on opened M first window interfaces so as to achieve flexible adjustment to the application window interface, the electronic device further includes:

a second acquisition unit, configured to acquire a first operation instruction for controlling and operating the first window interface after the first window interface is displayed on the first display unit displays;

a second execution unit, configured to execute the first operation instruction and convert the first parameter into a second parameter;

a first conversion unit, configured to convert the first window interface based on the second parameter to obtain a second window interface; and a second display unit, configured to display the second window interface.

An example is descried below in order to understand the relationship between the first parameter and the second parameter and the implementation process of the window conversion more clearly from a mathematical point of view. The first parameter is a first matrix, and the first matrix is inverse-transformable.

The second acquisition unit includes:

a first acquisition sub-unit, configured to acquire a move operation instruction for controlling the first window interface to move from a current position region to a first position region which is not completely overlapped with the current position region, where the current position region and the first position region are both located on the display region;

a second acquisition sub-unit, configured to acquire a zooming operation instruction for controlling a display area of the first window interface to be adjusted from the current display area to a first display area that is not equal to the current display area, where the first display area is less than or equal to a full-screen display area; and a third acquisition sub-unit, configured to acquire a triggering operation instruction for triggering an interactive object on the first window interface.

Further, the second execution unit includes:

a first execution sub-unit, configured to execute the move operation instruction and obtain at least one first conversion coefficient;

a first determination sub-unit, configured to determine at least one first matrix element corresponding to the move operation instruction in the first matrix;

a first arithmetic sub-unit, configured to perform a first arithmetic on the at least one first matrix element with the at least one first conversion coefficient to obtain at least one second matrix element; and a first conversion sub-unit, configured to convert the first matrix into a second matrix by replacing the at least one first matrix element with the at least one second matrix element, where the number of the at least one first conversion coefficient is equal to the number of the at least one first matrix element, and the second matrix is the second parameter.

Further, the first conversion unit includes:

a fourth acquisition sub-unit, configured to acquire, on the current position region, a first position coordinate set of all data points of the first window interface; and a second arithmetic sub-unit, configured to perform a second arithmetic on each position coordinate in the first position coordinate set sequentially with the second matrix, to obtain a second position coordinate set and thus the second window interface, where the second position coordinate set is a position coordinate set of all data points of the second window interface on the first position region.

Further, the second execution unit includes:

a second execution sub-unit, configured to execute the zooming operation instruction and obtain at least one second conversion coefficient;

a second determination sub-unit, configured to determine at least one third matrix element corresponding to the zooming operation instruction in the first matrix;

a third arithmetic sub-unit, configured to perform a third arithmetic on the at least third matrix element with the at least one second conversion coefficient to obtain at least one fourth matrix element; and a second conversion sub-unit, configured to convert the first matrix into a third matrix by replacing the at least one third matrix element with the at least one fourth matrix element, where the number of the at least one second conversion coefficient is equal to the number of the at least one third matrix element, and the third matrix is the second parameter.

Specifically, the first conversion unit includes:

a fifth acquisition sub-unit, configured to acquire a third position coordinate set of all data points of the first window interface in a case that a display area of the first window interface is the current display area; and a fourth arithmetic sub-unit, configured to perform a fourth arithmetic on each position coordinate in the third position coordinate set sequentially with the third matrix, to obtain a fourth position coordinate set and thus the second window interface, where the fourth position coordinate set is a position coordinate set of all data points of the second window interface whose display area is the first display area, and first content information displayed in the first window interface is the same as second content information displayed in the second window interface.

Specifically, the second execution unit includes:

a third execution sub-unit, configured to execute the triggering operation instruction and perform an inverse transformation on the first matrix to obtain a first inverse matrix, where the first inverse matrix is the second parameter.

Specifically, the first conversion unit includes:

a sixth acquisition sub-unit, configured to acquire a current position coordinate of the interactive object corresponding to the triggering operation instruction on the first window interface which is displayed with the current display area;

a fifth arithmetic sub-unit, configured to perform a fifth operation on the current position coordinate with the first inverse matrix to obtain a second position coordinate; and a first triggering unit, configured to trigger an interactive object event corresponding to the second position coordinate to obtain the second window interface;

where the second position coordinate is a position coordinate of the interactive object in a case that the first application program is displayed with a full-screen display area.

From the above description, the above electronic device is configured to implement the above information processing method, so the operation process of the electronic device is consistent with one or more embodiments of the above method, and thus is not described in detail herein.

An information processing method applied to an electronic device is further provided according to an embodiment of the disclosure. The electronic device includes a touch display unit, and M objects of M application programs are displayed on the touch display unit, where M is a positive integer. The method includes the following steps S101'-S104'.

S101' is acquiring a triggering instruction which is generated for responding a triggering operation to N objects of the M objects.

In an implementation, an electronic device including a touch display unit, such as a touch phone, a pad and a touch notebook, is installed with M application programs such as a browser, a video player, a chat tool and a game. Multiple shortcuts of these application programs are established on the touch display unit of the electronic device. If the user wants to use some application programs of these application programs, the user may trigger the shortcuts of the application programs to be used on the touch display unit. After detecting the user's triggering operation, the electronic device may generate a triggering instruction in response to the user's triggering operation and assign the triggering instruction to the triggered application programs to start the application programs. The touch display unit may be a touch display screen, such as a capacitive touch screen, a resistive touch screen, a voltage touch screen and an infrared touch screen. If the user clicks a shortcut icon of a chat tool (such as QQ, Wechat) or a shortcut icon of a video player (such as Tudou, Youku) on a phone screen when chatting or watching a video on a touch phone, the phone system may acquire the triggering operation by a sensing element on the touch display screen, acquire the triggering instruction by analyzing the triggering operation, and acquire an application program the triggering instruction points to, and then assign the triggering instruction to the chat tool software and the video player software. S102' is performed next.

S102' is executing the triggering instruction, laying out and drawing N first target window interfaces of the N objects, where each of the N first target window interface includes a first window image and a first touch region, and N is an integer which is less than or equal to M and greater than or equal to 1.

In an implementation, if the user opens N objects, i.e., N application programs, target window interfaces, i.e., application window interfaces, of the N application programs may be laid out and drawn on the touch display unit of the electronic device, and the contents in each application window interface includes a window image and a touch region, where the window image refers to shape, size, character and image of the application window interface, and the touch region refers to the touchable position on the application window interface. S103' is performed next.

S103' is performing a first matrix conversion on the i-th first window image of the i-th first target window interface of the N first target window interfaces to obtain the i-th second window image, and performing a first matrix conversion on the i-th first touch region of the i-th first target window interface to obtain the i-th second touch region, so as to obtain the i-th second target window interface, where i is taken to be an integer from 1 to N sequentially. The i-th second target window interface includes the i-th second window image and the i-th second touch region.

In opening the N objects, the N target window interfaces can be simultaneously displayed on the touch display unit which has a limited size and resolution only by scaling the size and adjusting the position of the target window interfaces. The adjustment of the size and position of the target window interface is achieved by matrix conversion. The matrix conversion includes a conversion to the size and position of the window interface, i.e., adjustment to the target window image, and also includes a conversion to the touchable position coordinate on the interface, i.e., a conversion to the touch region. By converting the N first target window images into the N second target window images and converting the N first touch regions into the N second touch regions, the converted N second window interfaces are obtained. The matrix conversion is expressed by the equations as follows:

$$\text{second target window image} = \text{first target window image} * T \quad (I)$$

$$\text{second touch region} = \text{first touch region} * T \quad (II)$$

Equation (I) represents a conversion of the window image, and equation (II) represents a conversion of the touch region. T represents a conversion matrix. S104' is performed next.

S104' is obtaining N second target window interfaces when i is taken to be N, and displaying simultaneously the N second target window interfaces on the touch display unit.

The N second target window interfaces of the application programs are obtained by performing the first matrix conversion on the N first target window interfaces of the application programs in S103. The display content on the second target window interface of the application program is the same as the display content on a full-screen window interface of the application program. Therefore, developers of application programs need not to consider the change in the application program window interface. For example, for zooming out of the window interface, the developers need not to consider whether the display content on the window interface is lessened, and thus need not to set a scroll bar function for the application program.

Figure 9:
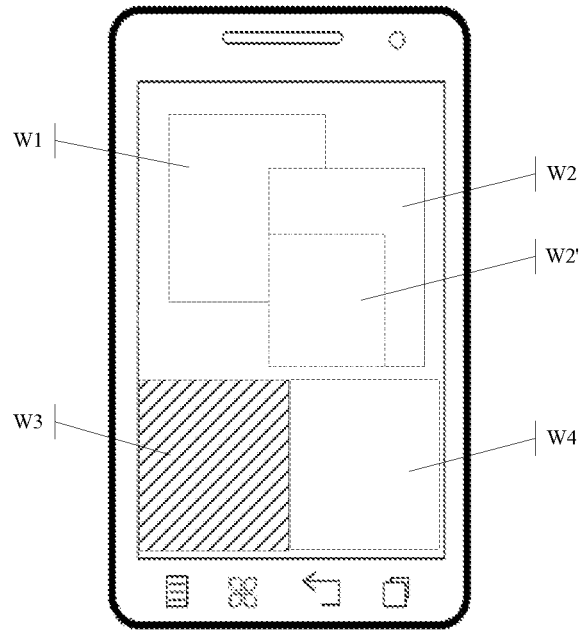
FIG. 9 is a schematic diagram of arrangement of multiple window interfaces on a screen of an electronic device according to an embodiment of the disclosure.

In addition, the size and position of the N second target window interfaces may be adjusted on the touch display unit. Referring to FIG. 9, the N second target window interfaces may be stacked (window interfaces W1 and W2 as shown in FIG. 9), and may be placed side by side (window interfaces W3 and W4 as shown in FIG. 9), and may be placed with an arbitrary rotation angle, and may even be placed with part of the window interface outside the screen according to a user's touch operation. For example, to facilitate the touch of the user, the window interface may be zoomed in to three times of the entire screen size to display clearly the position to be touched on the window interface, and it can be known that ⅔ of the window interface is outside the screen. In a word, the target window interface may be arbitrarily adjusted by the first matrix conversion, and a desired window interface may be obtained by the user.

In an implementation, in order to allow the N first window interfaces of the N objects to be all in the foreground and interacted with the user to achieve the multi-window application, a Window Activity Module (Activity) and a Task Management Module (Task) may be adjusted. While the triggering instruction is executed and the N first target window interfaces of the N objects are laid out and drawn in step S102', N Activities of the N first window interfaces are started and the N Activities are made to be in a restarted state (i.e., a Resumed state).

A phone used by a user is still taken as an example. If a language translation is performed by the user by using an Android phone, the user opens an application program of a text document in foreign language and a translation software program (such as Youdao Dictionary). The Android system may respectively assign an Activity for the two application programs and make the two Activities be in a Resumed state, i.e., a running state. To facilitate operation, the user may lay the two application window interfaces side by side on the phone screen (window interfaces W3 and W4 as shown in FIG. 9). During the translation, the user may choose and copy certain content of the text document in foreign language, and then paste the content into a text input region on the translation software window interface. In this process, the current task window interface is the window interface of the text document application program when copying a text, and the current task window is a window interface of the translation software program when pasting the text, but the two application window interfaces are both in a foreground running state, which avoids undesirable cases such as the application program of the text document in a background state being abruptly closed when performing the text pasting operation.

In an implementation, the laying out and drawing N first target window interfaces of the N objects as described in S101' includes: laying out and drawing N first target window interfaces of the N objects based on a display parameter value of the touch display unit. The display parameter value may be a size value of the touch display unit. That is, when multiple application programs are opened, each of the first target window interfaces laid out and drawn occupies the entire touch display unit. Since the screen size of the electronic device is fixed, the parameter value of the first target window interface laid out and drawn on the entire screen of the electronic device is also fixed, which provides a fixed original reference value for matrix conversion.

Further, after the laying out and drawing N first target window interfaces of the N objects, the method further includes: acquiring N first parameter values corresponding to the N first target window interfaces, where the i-th first target window interface corresponds to the i-th first parameter value, i is an integer taken from 1 to N.

The first parameter value of each first target window interface needs to be acquired after the N first target window interfaces are laid out and drawn. The first parameter value includes: the size and reference position coordinate of the first window image of the first target window interface, and original position coordinate of infinite touch points of the first touch region on the first target window interface. A first matrix conversion is performed on the first target window interface, and the conversion is based on the size and reference position coordinate of the first window image and the position coordinate of the first touch region. The reference position may be the central position of the entire first target window interface, or may be any other position on the first target window interface, which is not limited herein.

S103' may include steps S301'-S302'.

S301' is acquiring the i-th first matrix for the first matrix conversion based on the i-th first target window interface.

S302' is performing the first matrix conversion on the i-th first window image based on the i-th first parameter value and the i-th first matrix to obtain the i-th second window image; and performing the i-th first matrix conversion on the i-th first touch region based on the i-th first parameter value and the i-th first matrix to obtain the i-th second touch region, so as to obtain the i-th second target window interface.

There may be two cases for acquiring the first matrix in S301'.

(1) The first case: if the adjustment of the first target window interface is achieved by performing a touch operation on any point on the first target window interface by a user, the first matrix may be acquired by the following steps S401a-S403a.

S401a is acquiring a first operation instruction, which is generated in response to the first touch operation performed on the i-th first target window interface.

S402a is executing the first operation instruction to acquire the i-th second parameter value of the i-th first target window interface.

S403a is acquiring the i-th first matrix based on the i-th first parameter value and the i-th second parameter value.

The implementation process of S401a-S403a will be described in detail below. A user continuously touches two separate points on the first target window interface with a finger and a thumb, and gradually increases or decreases the distance between the two fingers until the window interface size reaches the desired size, then the user stops the zooming operation. Alternatively, the user continuously touches a certain point on the first target window interface with a finger and moves the finger upward, downward, left or right in straight track or arc track until the window interface reaches the desired position or angle, then the user stops the adjustment operation of the position or angle.

In this process, the touch display unit may sense the first touch operation, such as the zooming, position adjustment or angle adjustment, performed on the first target window interface by the user, and generate a first operation instruction in response to the first touch operation. The system assigns the first operation instruction to the first target window interface. The first target window interface executes the first operation instruction to acquire the second parameter value of the first target window interface. The second parameter value of the first target window interface refers to a second parameter value of a virtual first target window interface selected on the first target window interface by the user's finger when the user stops the first touch operation. The virtual first target window interface is a transition window interface that the first target window interface of the application program is converted into the second target window interface in executing the first operation instruction by the application program. The second parameter value includes the size and reference position coordinate of the virtual first target window image of the virtual first target window interface, and the position coordinates of the first touch region of the virtual first target window interface. A first matrix for the first matrix conversion is then obtained by combining the second parameter value and the first parameter value.

Referring to FIG. 9, the window interface W2 is the first target window interface, and the window interface W2' is the virtual first target window interface. When the user's finger moves away, the window interface W2' is converted into the second target window interface.

(2) The second case: shortcut buttons are provided on the first target window interface, for example, shortcut buttons of zooming out by ¼ times, displaying with full-screen, rotating rightward by 45 degrees. If the adjustment of the first target window interface is achieved by operating the shortcut buttons on the first target window interface by the user, the first matrix may be acquired by the following steps S401b-S402b.

S401b is acquiring a second operation instruction, which is generated in responses to the second touch operation performed on the i-th first target window interface.

S402b is executing the second operation instruction to acquire the i-th first matrix of the i-th first target window interface corresponding to the second operation instruction.

The shortcut buttons may specify a particular first matrix. The particular first matrix may an inherent matrix stored in the application software, or may be a variable matrix varied according to a certain rule, where the variable matrix has a matrix value corresponding to the window interface state of the application program when the application program is closed by the user last time, recorded by the application program. When the touch display unit senses that the user clicks a shortcut button on the first target window interface, a second operation instruction is generated. The system assigns the second operation instruction to the first target window interface. The first target window interface executes the second operation instruction, and acquires the first matrix corresponding to the second operation instruction from the storage unit, to achieve an effect of adjusting the window interface rapidly.

Further, referring to FIG. 9, in order to distinguish the i-th first target window interface being adjusted from other N-1 first target window interfaces not being adjusted and in order to cause the window interface to present a better visual effect, the method further includes the following S300' before S301'.

S300' is adjusting the transparency value of the i-th first target window interface from a first value to a second value different from the first value. The window interface W3 shown in FIG. 9 represents a current window interface whose transparency is different from that of other window interfaces.

Further, after executing S302' and obtaining the i-th second target window interface, the method further includes the following steps S303'-S305'.

S303' is acquiring a third operation instruction, which is generated in response to a third touch operation performed on the i-th second target window interface.

S304' is executing the third operation instruction and determining the position coordinate of the touch point of the third touch operation.

S305' is performing a first matrix inverse conversion on the position coordinate of the touch point of the third touch operation based on the i-th first parameter value and the inverse matrix of the i-th first matrix, to obtain position coordinate of the touch point on the i-th first target window interface corresponding to the position coordinate of the touch point of the third touch operation.

After converting the N first target window interfaces into N second target window interfaces, the user performs a third touch operation on the second target window interface, to operate the second object.

Figure 7:
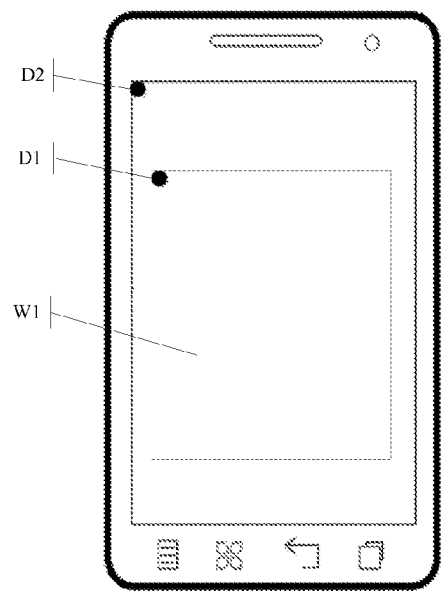
FIG. 7 is a schematic diagram of a correspondence between touch point positions on the window interfaces according to an embodiment of the disclosure.

For example, referring to FIG. 7, the user opens a browser application on a phone, and converts the home page of the browser from a full-screen interface to ½ screen interface, i.e., the home page of the browser displayed in a full-screen manner is the first target window interface of the home page of the browser, and the home page of the browser displayed in a ½ screen manner is the second target window interface of the home page of the browser (window interface W1 as shown in FIG. 7). The home page of the browser includes many application event buttons with links, such as "Taobao sale", "Sina". If the user clicks "Taobao sale" on the first target window interface (as point D1 shown in FIG. 7), the page of Taobao can be opened by the event button link In this case, the coordinate value of the event button "Taobao Sale" is the first parameter value $(X_1, Y_1, Z_1)$, i.e., the position coordinate of point D1 in FIG. 7. After performing the third touch operation on the "Taobao Sale" event button (as point D2 shown in FIG. 7) on the adjusted home page on the second target window interface, the third operation instruction is obtained. The browser executes the third operation instruction and detects the coordinate value $(X_2, Y_2, Z_2)$ of "Taobao Sale" event button, i.e., the position coordinate of point D2 in FIG. 7. It is required to convert the coordinate $(X_1, Y_1, Z_1)$ into $(X_2, Y_2, Z_2)$, so that the user can open the page of Taobao. That is, the touch effect generated when the user clicks the touch event (D1) on the second target window interface is the same as the touch effect generated when the user clicks the same touch event (D2) on the first target window interface.

When the first target window interface of the home page of the browser is converted into the second target window interface, it is known in conjunction with equation (II) that the first touch region of the first target window interface is converted into the second touch region of the second target window interface by using the first conversion matrix. Therefore, in order to convert the button coordinate $(X_1, Y_1, Z_1)$ of the touch event on the second touch region into the button coordinate $(X_2, Y_2, Z_2)$ of the same touch event on the first touch region, it is required to perform a first inverse matrix conversion on $(X_1, Y_1, Z_1)$, where the equation is expressed as follows:

$(X_2, Y_2, Z_2)=(X_1, Y_1, Z_1)*T^{-1}$, i.e., event button coordinate on first touch region=event button coordinate on second touch region*$T^{-1}$ (III)

Similarly, after the N second target window interfaces are obtained, the N second target window interfaces may be converted into N third target window interfaces by performing the second matrix conversion, or the N second target window interfaces may be converted into N fourth target window interfaces by performing the third matrix conversion, where the matrix used in the second matrix conversion is the second matrix and the matrix used in the third matrix conversion is the third matrix. The implementation processes of the second matrix conversion and the third matrix conversion are described in detail below.

1, The Implementation Process of the Second Matrix Conversion

If the adjustment of the second target window interface is achieved by performing a touch operation by a user on any point of the second target window interface, the second matrix may be acquired firstly and the second target window interface is converted by performing the second matrix conversion based on the second matrix. The implementation process includes the following steps S601a-S604a.

S601a is acquiring a fourth operation instruction, which is generated in response to a fourth touch operation performed on the i-th second target window interface.

S602a is executing the fourth operation instruction and acquiring the i-th third parameter value of the i-th second target window interface.

S603a is acquiring the i-th second matrix based on the i-th first parameter value and the i-th third parameter value.

S604a is performing a second matrix conversion on the i-th second window image and the i-th second touch region based on the i-th first parameter value and the i-th second matrix, to obtain the i-th third target window interface.

The method for acquiring the second matrix is the same as the first case of the method for acquiring the first matrix in S301'. In addition, the method for converting the N second target window interfaces into N third target window interfaces is similar to the method for converting the N first target window interfaces into N second target window interfaces in the embodiment. The detailed description thereof is omitted herein.

Further, in order to distinguish the i-th second target window interface being adjusted from other N-1 second target window interfaces not being adjusted and in order to cause the window interface to present a better visual effect, the method further includes S600a before S601a.

S600a is adjusting the transparency value of the i-th second target window interface from a third value to a fourth value different from the third value.

Further, after executing S604a and obtaining the i-th third target window interface, the method further includes steps S605a-S607a.

S605a is acquiring a fifth operation instruction, which is generated in response to a fifth touch operation performed on the i-th third target window interface.

S606a is executing the fifth operation instruction and determining the position coordinate of the touch point of the fifth touch operation.

S607a is performing a second matrix inverse conversion on the position coordinate of the touch point of the fifth touch operation based on the i-th first parameter value and the inverse matrix of the i-th second matrix, to obtain the position coordinate of the touch point on the i-th first target window interface corresponding to the position coordinate of the touch point of the fifth touch operation.

The implementation processes of steps S605a-S607a are similar to steps S303'-S305'. Steps S605a-S607a is to obtain the position coordinate of the same touch event on the first target window interface by performing the second inverse matrix conversion on the position coordinate of the touch event on the third target window interface, and the description thereof is omitted herein.

2. The Implementation Process of the Third Matrix Conversion

Shortcut buttons are provided on the second target window interface, for example, shortcut buttons of zooming in by ¼ times, displaying with full-screen, rotating rightward by 45 degrees. If the adjustment of the second target window interface is achieved by operating the shortcut buttons on the second target window interface by the user, the third matrix may be acquired firstly and the third matrix conversion may be performed on the second target window interface based on the third matrix. The implementation process includes the following steps S601b-S603b.

S601b is acquiring a sixth operation instruction, which is generated in response to a sixth touch operation performed on the i-th second target window interface.

S602b is executing the sixth operation instruction and acquiring the i-th third matrix of the i-th first target window interface corresponding to the sixth operation instruction.

S603b is performing the third matrix conversion on the i-th second window image and the i-th second touch region based on the i-th first parameter value and the i-th third matrix, to obtain the i-th fourth target window interface.

The method for acquiring the third matrix is the same as the second case of the method for acquiring the first matrix in S301'. In addition, the method for converting the N second target window interfaces into N fourth target window interfaces is similar to the method for converting the N first target window interfaces into N second target window interfaces in the embodiment. The detailed description thereof is omitted herein.

Further, in order to distinguish the i-th second target window interface being adjusted from other N-1 second target window interfaces not being adjusted and in order to cause the window interface to present a better visual effect, the method further includes S600b before S601b.

S600b is adjusting the transparency value of the i-th second target window interface from a fifth value to a sixth value different from the fifth value.

Further, after executing S603b and obtaining the i-th third target window interface, the method further includes the following steps S604b-S606b.

S604b is acquiring a seventh operation instruction, which is generated in response to a seventh touch operation performed on the i-th fourth target window interface.

S605b is executing the seventh operation instruction and determining the position coordinate of the touch point of the seventh touch operation.

S606b is performing a third matrix inverse conversion on the position coordinate of the touch point of the seventh touch operation based on the i-th first parameter value and the inverse matrix of the i-th third matrix, to obtain the position coordinate of the touch point on the i-th first target window interface corresponding to the position coordinate of the touch point of the seventh touch operation.

The implementation processes of steps S604b-S606b are similar to steps S303'-S305'. Steps S604b-S606b is to obtain the position coordinate of the same touch event on the first target window interface by performing the third inverse matrix conversion on the position coordinate of the touch event on the fourth target window interface, and the detailed description is omitted herein.

An electronic device is further provided according to an embodiment of the disclosure. M objects of M application programs can be simultaneously displayed on a touch display unit of the electronic device, where M is a positive integer. The electronic device includes:

a first acquisition unit, configured to acquire a triggering instruction, which is generated in response to a triggering operation of N objects of the M objects;

a first execution unit, configured to execute the triggering instruction, and lay out and draw N first target window interfaces of the N objects, where each of the N first target window interfaces includes a first window image and a first touch region, and N is an integer less than or equal to M and greater than or equal to 1;

a first conversion unit, configured to perform a first matrix conversion on the i-th first window image of the i-th first target window interface of the N first target window interfaces to obtain the i-th second window image, and perform a first matrix conversion on the i-th first touch region of the i-th first target window interface to obtain the i-th second touch region, so as to obtain the i-th second target window interface, where i is taken to be an integer from 1 to N sequentially, and the i-th second target window interface includes: the i-th second window image and the i-th second touch region; and a first display unit, configured to obtain the N second target window interfaces when i is taken to be N, and display simultaneously the N second target window interfaces on the touch display unit.

In order to allow the opened N target window interfaces of the N objects to be all in the foreground and interacted with the user to achieve the multi-window application, the electronic device further includes:

an Activity management unit, configured to start N Activities of the N first target window interfaces and cause the N Activities to be in a Resumed state, when the first execution unit executes the triggering instruction and lays out and draws the N first target window interfaces of the N objects.

In an implementation, since the screen size of the electronic device is fixed, the parameter value of the first target window interface laid out and drawn on the entire screen of the electronic device is also fixed. In order to provide a fixed original reference value for matrix conversion, the first execution unit lays out and draws the N first target window interfaces of the N objects, i.e., lays out and draws N first target window interfaces of the N objects based on the display parameter value of the touch display unit.

Further, in order to provide an accurate reference value related to the first target window interface for matrix conversion, the electronic device further includes:

a second acquisition unit, configured to acquire N first parameter values of the N first target window interfaces, after the N first target window interfaces of the N objects is laid out and drawn by the first execution unit, where the i-th first target window interface corresponds to the i-th first parameter value in a case that i is an integer taken from 1 to N.

In an implementation, in order to allow the window interface to be converted based on the first target window interface and in order not to re-layout and re-draw the window interface of the application program when adjusting the first target window interface, the first conversion unit includes:

a third acquisition unit, configured to acquire the i-th first matrix for the first matrix conversion, based on the i-th first target window interface; and a first conversion sub-unit, configured to perform the first matrix conversion on the i-th first window image based on the i-th first parameter value and the i-th first matrix to acquire the i-th second window frame and meanwhile perform the first matrix conversion on the i-th first touch region based on the i-th first parameter value and the i-th first matrix to acquire the i-th second touch region, so as to acquire the i-th second target window interface.

Further, in order to distinguish the i-th first target window interface being adjusted from other N-1 first target window interfaces not being adjusted and in order to allow the window interface to present a better visual effect, the first conversion unit further includes:

a first adjustment unit, configured to adjust the transparency value of the i-th first target window interface from a first value to a second value different from the first value, before the third acquisition unit acquires the i-th first matrix for the first matrix conversion based on the i-th first target window interface.

In order to obtain the first matrix by performing a touch operation by a user on any point on the first target window interface and achieve the adjustment of the first target window interface by converting the first target window interface based on the first matrix, the third acquisition unit includes:

a first acquisition sub-unit, configured to acquire a first operation instruction, which is generated in response to a first touch operation performed on the i-th first target window interface;

a second execution unit, configured to execute the first operation instruction and acquire the i-th second parameter value of the i-th first target window interface; and a second acquisition sub-unit, configured to acquire the i-th first matrix based on the i-th first parameter value and the i-th second parameter value.

Alternatively, in order to obtain the first matrix by performing an operation by a user on shortcut buttons on the first target window interface and achieve the adjustment of the first target window interface by converting the first target window interface based on the first matrix, the third acquisition unit includes:

a third acquisition sub-unit, configured to acquire a second operation instruction, which is generated in response to a second touch operation performed on the i-th first target window interface; and a third execution unit, configured to execute the second operation instruction and acquire the i-th first matrix of the i-th first target window interface corresponding to the second operation instruction.

Further, in order to make the coordinate of the touch event on the second target window interface obtained by the first matrix conversion correspond to the coordinate of the same touch event on the first target window interface, i.e., to make the touch effect generated when the user clicks a touch event on the second target window interface the same as the touch effect generated when the user clicks a same touch event on the first target window interface, the first conversion unit further includes:

a fourth acquisition unit, configured to acquire a third operation instruction, which is generated in response to a third touch operation performed on the i-th second target window interface, after the second conversion sub-unit obtains the i-th second target window interface by conversion;

a fourth execution unit, configured to execute the third operation instruction and determine the position coordinate of the touch point of the third touch operation; and a first inverse conversion unit, configured to perform a first matrix inverse conversion on the position coordinate of the touch point of the third touch operation based on the i-th first parameter value and the inverse matrix of the i-th first matrix, to obtain the position coordinate of the touch point on the i-th first target window interface corresponding to the position coordinate of the touch point of the third touch operation.

In an implementation, in order to acquire the second matrix and convert the second target window interface into the third target window interface by performing the second matrix conversion based on the second matrix if the adjustment of the second target window interface is achieved by performing a touch operation by a user on any point on the second target window interface, the electronic device further includes:

a fifth acquisition unit, configured to acquire a fourth operation instruction, which is generated in response to a fourth touch operation performed on the i-th second target window interface, after the first conversion unit obtains the i-th second target window interface by performing conversion;

a fifth execution unit, configured to execute the fourth operation instruction and acquire the i-th third parameter value of the i-th second target window interface;

a sixth acquisition unit, configured to acquire the i-th second matrix based on the i-th first parameter value and the i-th third parameter value; and a second conversion unit, configured to perform the second matrix conversion on the i-th second window image and the i-th second touch region based on the i-th first parameter value and the i-th second matrix, to obtain the i-th third target window interface.

Further, in order to make the N second target window interfaces be in a current window state, and distinguish the i-th second target window interface to be converted into the third target window interface from other N-1 second target window interfaces and allow the window interface to present a better visual effect, the electronic device further includes:

a second adjustment unit, configured to adjust the transparency value of the i-th second target window interface from a third value to a fourth value different from the third value, before the fifth acquisition unit acquires the fourth operation instruction which is generated in response to the fourth touch operation performed on the i-th second target window interface.

Further, in order to make the coordinate of the touch event on the third target window interface obtained by the second matrix conversion correspond to the coordinate of the same touch event on the first target window interface, i.e., to make the touch effect generated when the user clicks a touch event on the third window interface the same as the touch effect generated when the user clicks a same touch event on the first window interface, the electronic device further includes:

a seventh acquisition unit, configured to acquire a fifth operation instruction, which is generated in response to a fifth touch operation performed on the i-th third target window interface, after the second conversion unit obtains the i-th third target window interface by performing conversion;

a sixth execution unit, configured to execute the fifth operation instruction and determine the position coordinate of the touch point of the fifth touch operation; and a second inverse conversion unit, configured to perform a second matrix inverse conversion on the position coordinate of the touch point of the fifth touch operation based on the i-th first parameter value and the inverse matrix of the i-th second matrix, to obtain the position coordinate of the touch point on the i-th first target window interface corresponding to the position coordinate of the touch point of the fifth touch operation.

Alternately, in order to obtain the third matrix by performing an operation by a user on a shortcut button on the second target window interface and obtain the fourth window interface by performing the third matrix conversion on the second target window interface based on the third matrix, the electronic device further includes:

an eighth acquisition unit, configured to acquire a sixth operation instruction, which is generated in response to a sixth touch operation performed on the i-th second target window interface, after the first conversion unit obtains the i-th second target window interface by performing conversion;

a seventh execution unit, configured to execute the sixth operation instruction and acquire the i-th third matrix of the i-th first target window interface corresponding to the sixth operation instruction; and a third conversion unit, configured to perform the third matrix conversion on the i-th second window image and the i-th second touch region based on the i-th first parameter value and the i-th third matrix, to obtain the i-th fourth target window interface.

Further, in order to make the N second target window interfaces be in a current window state, and distinguish the i-th second target window interface to be converted into the fourth target window interface from other N-1 second target window interfaces and allow the window interface to present a better visual effect, the electronic device further includes:

a third adjustment unit, configured to adjust the transparency value of the i-th second target window interface from a fifth value to a sixth value different from the fifth value, before the eighth acquisition unit acquires the sixth operation instruction which is generated in response to the sixth touch operation performed on the i-th second target window interface.

Further, in order to make the coordinate of the touch event on the fourth target window interface obtained by the third matrix conversion correspond to the coordinate of the same touch event on the first target window interface, i.e., to make the touch effect generated when the user clicks a touch event on the fourth target window interface the same as the touch effect generated when the user clicks a same touch event on the first target window interface, the electronic device further includes:

a ninth acquisition unit, configured to acquire a seventh operation instruction, which is generated in response to a seventh touch operation performed on the i-th fourth target window interface, after the third conversion unit obtains the i-th fourth target window interface by performing conversion;

an eighth execution unit, configured to execute the seventh operation instruction and determine the position coordinate of the touch point of the seventh touch operation; and a third inverse conversion unit, configured to perform a third matrix inverse conversion on the position coordinate of the touch point of the seventh touch operation based on the i-th first parameter value and the inverse matrix of the i-th third matrix, to obtain the position coordinate of the touch point on the i-th first target window interface corresponding to the position coordinate of the touch point of the seventh touch operation.

One or more technical solutions provided in the embodiments of the disclosure have at least the following technical effects or advantages.

(1) In the embodiments of the disclosure, the touch display unit can simultaneously display M window interfaces of M application programs. For the first application program in the M application programs, a triggering instruction for triggering the first application program is firstly acquired, a first parameter for generating a first window interface of the first application program is obtained when the triggering instruction is executed, and the first window interface, whose display area is less than the full-screen display area of the first application program on the display region, is generated based on the first parameter. Therefore, the technical problem in the prior art that multi-window display can not be achieved in the electronic device is effectively solved, and multiple application window interfaces of multiple application programs are simultaneously displayed on the display unit of the electronic device in non-full-screen display size when the multiple application programs are run.

(2) In the embodiments of the disclosure, the first parameter may be converted, based on a touch operation of a user on the displayed first window interface, into a second parameter corresponding to the touch operation, and the first window interface may be converted into a second window interface based on the second parameter. The first parameter may be a matrix, i.e., a first matrix. Specifically, when an operation such as moving, zooming or triggering, which corresponds to a touch operation of moving, zooming or triggering, are performed on the first window interface, corresponding operations are performed on the first matrix to obtain a second matrix, a third matrix or a first inverse matrix which can achieve an expected operation effect. In summary, a conversion matrix can be obtained flexibly from the first matrix based on the operation instruction, and thus an expected second window interface can be obtained. The operation performed on the window interface by the user is unknown to the application program. That is, the window interface is not needed to be re-constructed and drawn, which effectively solves the technical problem in the prior art that the window interface can not be adjusted and displayed flexibly in the multi-window display of the electronic device, and achieves the technical effect that the window interface is not needed to be re-constructed and drawn in adjusting the window interface, and the display of contents in the window interface is not limited by the application program, so as to flexibly adjust and display multi-window interface.

(3) In the embodiments of the disclosure, in zooming the first window interface, the content displayed in the window interface after the zooming is the same as the content displayed in the window interface before the zooming, and after the user performs a touch operation on the interactive object (i.e., a touch point) on the first window interface, an arithmetic is performed on the position coordinate of the touch point with the inverse matrix of the first matrix to obtain the position coordinate of the touch point when the first application program is displayed in a full-screen display manner, and thereby a user event corresponding to the touch point can be triggered, which effectively solves the technical problem in the prior art that the contents in the touch region of the window interface is lessened when the size of the application window interface is less than the screen size, and achieves the technical effect that when multiple applications reuse one actual screen, each application has a full virtual screen and the touch region of application window interface is unchanged.

(4) In the embodiments of the disclosure, when the user performs a touch operation on the first window interface, the change of the first window interface can not be sensed by the application program, therefore, the window interface needs not to be adjusted, that is, the developers do not need to consider operating system environments to which the application program is to be applied in developing the application program, which effectively solves the technical problem that the writing of the application program is limited by the operating system, and achieves the technical effect that the development of the application program is independent from the operating system environments.

Figure 10:
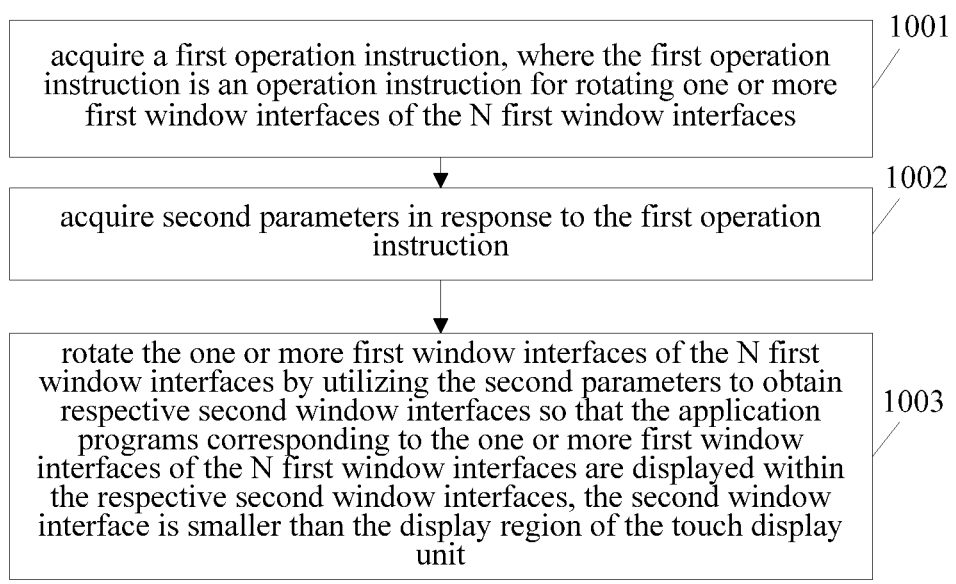
FIG. 10 is a schematic flow chart of an information processing method according to an embodiment of the disclosure.

An information processing method applied to an electronic device is provided according to an embodiment of the disclosure. The electronic device includes a touch display unit capable of running M application programs simultaneously, where M is a positive integer. The electronic device can execute a first instruction and present N first window interfaces on the touch display unit, where the N first window interfaces correspond to N application programs of the M application programs so that the N application programs are displayed in their respective first window interfaces. The first window interface is smaller than a display region of the touch display unit. FIG. 10 is a schematic flow chart of an information processing method according to an embodiment of the disclosure. As shown in FIG. 10, the information processing method includes the following steps S1001 to S1003.

S1001 is acquiring a first operation instruction, where the first operation instruction is an operation instruction for rotating one or more first window interfaces of the N first window interfaces.

S1002 is acquiring second parameters in response to the first operation instruction.

The second parameter is a parameter preset in the electronic device, or a matrix determined according to first rotation angle information obtained by parsing the first operation instruction. The second parameter may be in a form of multiple parameters, or in a form of a matrix. The first operation instruction may be a touch operation instruction to the touch display unit, a voice operation instruction to the electronic device or a shaking operation instruction to the electronic device.

S1003 is rotating the one or more first window interfaces of the N first window interfaces by utilizing the second parameters to obtain corresponding second window interfaces, so that the application programs corresponding to the one or more first window interfaces of the N first window interfaces are displayed in the respective second window interfaces, the second window interface is smaller than the display region of the touch display unit.

In a preferable embodiment, step S1003 is reading graphics buffer data of the application programs corresponding to the one or more first window interfaces of the N first window interfaces;

converting the read graphics buffer data of the application programs corresponding to the one or more first window interfaces into graphics buffer data corresponding to the second window interfaces respectively by utilizing the second parameters, and combining the graphics buffer data of the second window interfaces into frame buffer data corresponding to the touch display unit; and displaying the second window interfaces corresponding to the one or more first window interfaces on the touch display unit by utilizing the frame buffer data, replacing the first window interfaces with the second window interfaces to make the application programs corresponding to the one or more first window interfaces be displayed in the respective second window interfaces.

Figure 11A:
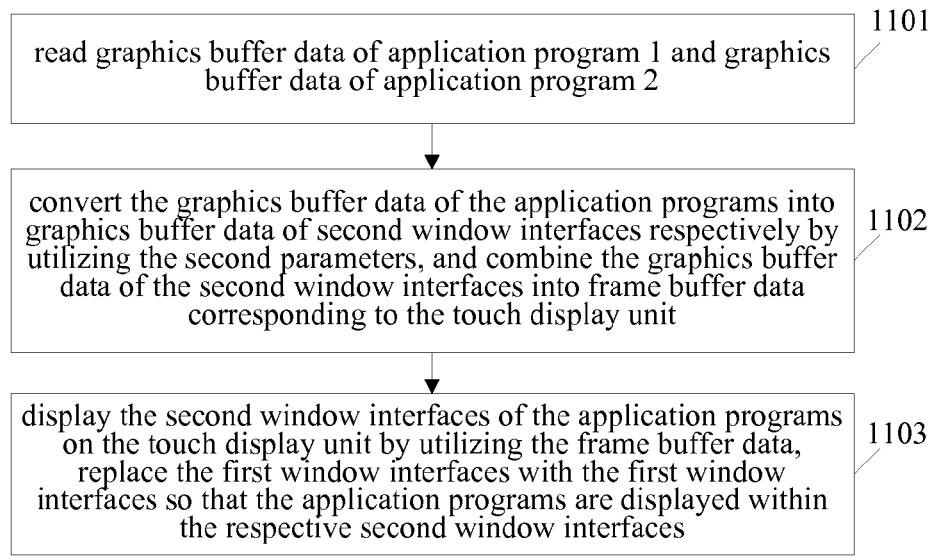
FIG. 11a is a schematic flow chart of displaying two application programs in second window interfaces according to an embodiment of the disclosure.

In the following, it is illustrated by taking a case that two application programs are displayed within second window interfaces, i.e., two application programs are displayed in a non-full-screen manner, as an example. The following embodiment is also suitable for a scenario that more than two application programs are displayed within respective second window interfaces. As shown in FIG. 11a, steps S1101-S1103 are included.

S1101 is reading graphics buffer data of application program 1 and graphics buffer data of application program 2.

The application program 1 and the application program 2 write graphics buffer data for full-screen display drawn by themselves into a graphics buffer, i.e., stored as graphics buffer data. The graphics buffer data includes two-dimensional coordinate information of a pixel and RGB (Red Green Blue) color information of the pixel.

S1102 is converting the read graphics buffer data corresponding to the application programs into graphics buffer data corresponding to the second window interfaces respectively by utilizing the second parameters, and combining the graphics buffer data of the second window interfaces into frame buffer data corresponding to the touch display unit.

Figure 11B:
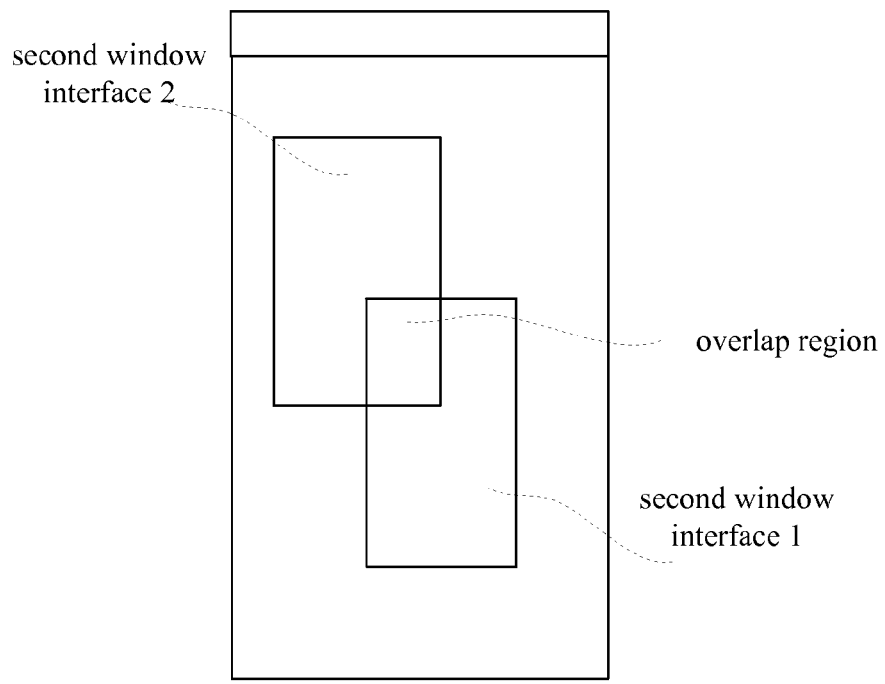
FIG. 11b is a schematic diagram showing there is an overlap region between a second window interface 1 and a second window interface 2 according to an embodiment of the disclosure.

A case that there may be an overlap region between the second window interface of application program 1 and the second window interface of application program 2 is considered. As shown in FIG. 11b, there is an overlap region between the second window interface 1 and the second window interface 2. Accordingly, in the embodiment, two-dimensional coordinate $(x_o, y_o)$ of a pixel in the graphics buffer data of the application program 1 and the application program 2 is extended into three-dimensional coordinate $(x_o, y_o, z_o)$, and different second window interfaces have different third dimensional coordinates $z_o$. Therefore, the second window interface of the application program 1 and the second window interface of the application program 2 can be differentiated by different third dimensional coordinates, so that the overlap relationship of the overlap region between the display region of the second window interface of the application program 1 and the display region of the second window interface of the application program 2 can be determined. For example, in a case that there is an overlap region between the second window interface 1 of the application program 1 and the second window interface 2 of the application program 2 and the third dimensional coordinate of the second window interface 2 is farther from the coordinate origin than the third dimensional coordinate of the second window interface 1, it is identified that part of the display region of the second window interface 1 is overlapped by the second window interface 2, and the overlap region between the second window interface 1 and the second window interface 2 is used for displaying the application program 2.

The graphics buffer data read in S1101 is combined with graphics buffer data of regular application programs (such as status bar) in the electronic device, to form frame buffer data, i.e., content displayed by the electronic device in a full-screen manner. Therefore, in the embodiment, the extended three-dimensional coordinate $(x_o, y_o, z_o)$ in the graphics buffer data is converted by utilizing the second parameter, thus the full-screen window interface, i.e., the first window interface of the application program is converted into the second window interface, i.e., a non-full-screen window interface. The converted graphics buffer data includes the converted $(x_o, y_o, z_o)$ and RGB information of the pixels.

A case that a first window interface is scaled down by ½ times to obtain a second window interface is taken as an example. The second parameter, which takes the form of a matrix, is $$\begin{pmatrix} 1/2 & 0 & 0 \\ 0 & 1/2 & 0 \\ 0 & 0 & 1/2 \end{pmatrix},$$

and the three-dimensional coordinate $(x_t, y_t, z_t)$ of the pixel in the frame buffer data corresponding to the second window interface is shown as equation (6):

$$(x_t, y_t, z_t) = \begin{pmatrix} 1/2 & 0 & 0 \\ 0 & 1/2 & 0 \\ 0 & 0 & 1/2 \end{pmatrix} \times \begin{pmatrix} x_o \\ y_o \\ z_o \end{pmatrix} \quad (6)$$

A case that a first window interface is scaled down by ½ times to obtain a second window interface and the second window interface is displaced $\Delta x$ in the horizontal direction and $\Delta y$ in the vertical direction is taken as an example. The second parameter is $$\begin{pmatrix} 1/2 & 0 & \Delta x \\ 0 & 1/2 & \Delta y \\ 0 & 0 & 1/2 \end{pmatrix},$$

and the three-dimensional coordinate $(x_t, y_t, z_t)$ of the pixel in the frame buffer data corresponding to the second window interface is shown as equation (7):

$$(x_t, y_t, z_t) = \begin{pmatrix} 1/2 & 0 & \Delta x \\ 0 & 1/2 & \Delta y \\ 0 & 0 & 1/2 \end{pmatrix} \times \begin{pmatrix} x_o \\ y_o \\ z_o \end{pmatrix} \quad (7)$$

A case that a first window interface is scaled down by ½ times to obtain a second window interface and the second window interface is rotated clockwise by θ degrees is taken as an example. The second parameter is $$\begin{pmatrix} \cos\theta/2 & \sin\theta/2 & 0 \\ -\sin\theta/2 & \cos\theta/2 & 0 \\ 0 & 0 & 1/2 \end{pmatrix},$$

and the three-dimensional coordinate $(x_t, y_t, z_t)$ of the pixel in the frame buffer data corresponding to the second window interface is shown as equation (8):

$$(x_t, y_t, z_t) = \begin{pmatrix} \cos\theta/2 & \sin\theta/2 & 0 \\ -\sin\theta/2 & \cos\theta/2 & 0 \\ 0 & 0 & 1/2 \end{pmatrix} \times \begin{pmatrix} x_o \\ y_o \\ z_o \end{pmatrix} \quad (8)$$

S1103 is displaying the second window interfaces of the application programs on the touch display unit by utilizing the frame buffer data, replacing the first window interfaces with the second window interfaces so that the application programs are displayed within the respective second window interfaces.

It should be noted that the rotation angle of the first window interface depends on the angle parameter θ in the second parameter. Therefore, in a case that multiple first window interfaces adopt a same second parameter, the multiple first window interfaces are rotated by the same angle θ. Alternatively, the multiple first window interfaces may be rotated by utilizing different second parameters, so that rotation angles of the multiple first window interfaces are different.

In the embodiment, with trigger of the first operation instruction, the first window interface is rotated by utilizing the second parameter to obtain the second window interface, thereby implementing displaying with the first window interface, i.e., a non-full-screen window interface. Further, the operation of rotating the first window interface may be implemented via a specific operation instruction. Therefore, the first window interface may be rotated quickly and easily, which meets user's requirements in different application scenes and improves user experience.

Figure 12:
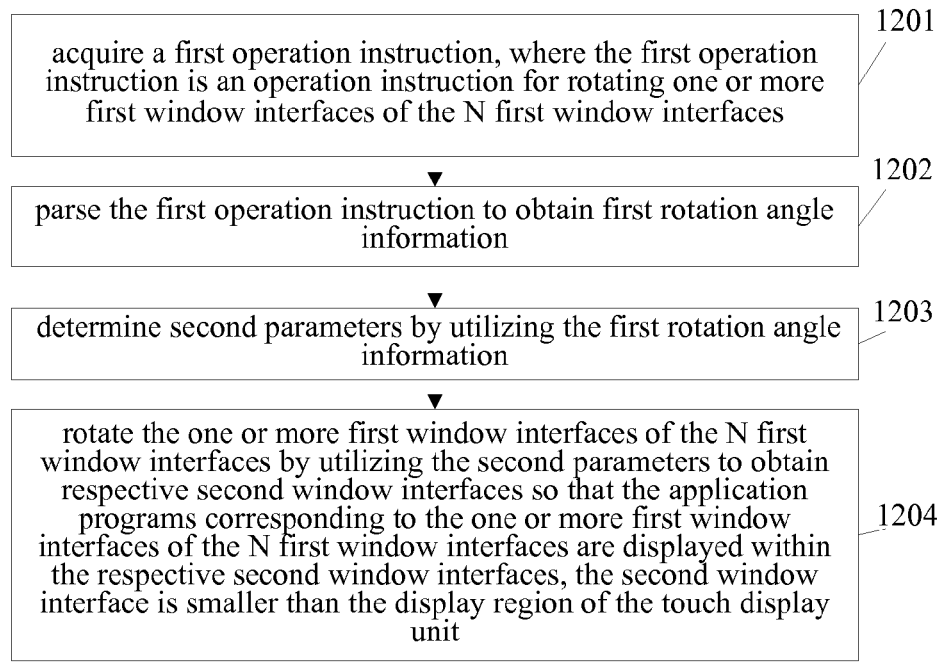
FIG. 12 is a schematic flow chart of an information processing method according to an embodiment of the disclosure.

An information processing method applied to an electronic device is provided according to an embodiment of the disclosure. The electronic device includes a touch display unit capable of running M application programs, where M is a positive integer. The electronic device can perform a first instruction and present N first window interfaces on the touch display unit, where the N first window interfaces correspond to N application programs of the M application programs respectively so that the N application programs are displayed within their respective first window interfaces. The first window interface is smaller than a display region of the touch display unit. FIG. 12 is a schematic flow chart of an information processing method according to an embodiment of the disclosure. As shown in FIG. 12, the method includes the following steps S1201-S1204.

S1201 is acquiring a first operation instruction, where the first operation instruction is an operation instruction for rotating one or more first window interfaces of the N first window interfaces.

S1202 is parsing the first operation instruction to obtain first rotation angle information.

S1203 is determining second parameters by utilizing the first rotation angle information.

The first operation includes a touch operation instruction of the touch display unit, a voice operation instruction of the electronic device or a shaking operation instruction of the electronic device. The second parameter may be in a form of multiple parameters, or in a form of a matrix.

S1204 is rotating the one or more first window interfaces of the N first window interfaces by utilizing the second parameters to obtain respective second window interfaces so that the application programs corresponding to the one or more first window interfaces of the N first window interfaces are displayed within the respective second window interfaces, where the second window interface is smaller than the display region of the touch display unit.

The angles by which the one or more first window interfaces of the N first window interfaces are rotated by utilizing the second parameters correspond to the first rotation angle information obtained by parsing the first operation instruction. That is, the angle by which the first window interface is rotated by utilizing the second parameter corresponds to the first operation angle information obtained by parsing the first operation instruction. Therefore, the user of the electronic device may rotate the first window interface by any angle as needed, which facilitates the operation and improves user experience.

In a preferable embodiment, S1204 is reading graphics buffer data of the application programs corresponding to the one or more first window interfaces of the N first window interfaces;

converting the read graphics buffer data of the application programs corresponding to the one or more first window interfaces into graphics buffer data corresponding to second window interfaces respectively by utilizing the second parameters, and combining the graphics buffer data of the second window interfaces into frame buffer data corresponding to the touch display unit; and displaying the second window interfaces corresponding to the one or more first window interfaces on the touch display unit by utilizing the frame buffer data, replacing the first window interfaces with the second window interfaces so that the application programs corresponding to the one or more first window interfaces are displayed within the respective second window interfaces.

In the following, it is illustrated by taking a case that two application programs are displayed within second window interfaces, i.e., two application programs are displayed in a non-full-screen manner, as an example. The following embodiment is also suitable for a scenario that more than two application programs are displayed within respective second window interfaces. As shown in FIG. 11a, steps S1101-S1103 are included.

S1101 is reading graphics buffer data of application program 1 and graphics buffer data of application program 2.

The application program 1 and the application program 2 write graphics buffer data for full-screen display drawn by themselves into a graphics buffer, i.e., stored as graphics buffer data. The graphics buffer data includes two-dimensional coordinate information of a pixel and RGB (Red Green Blue) color information of the pixel.

S1102 is converting the read graphics buffer data corresponding to the application programs into graphics buffer data corresponding to the second window interfaces respectively by utilizing the second parameters, and combining the graphics buffer data of the second window interfaces into frame buffer data corresponding to the touch display unit.

A case that there may be an overlap region between the second window interface of application program 1 and the second window interface of application program 2 is considered. As shown in FIG. 11b, there is an overlap region between the second window interface 1 and the second window interface 2. Accordingly, in the embodiment, two-dimensional coordinate $(x_o, y_o)$ of a pixel in the graphics buffer data of the application program 1 and the application program 2 is extended into three-dimensional coordinate $(x_o, y_o, z_o)$, and different second window interfaces have different third dimensional coordinates $z_o$. Therefore, the second window interface of the application program 1 and the second window interface of the application program 2 can be differentiated by different third dimensional coordinates, so that the overlap relationship of the overlap region between the display region of the second window interface of the application program 1 and the display region of the second window interface of the application program 2 can be determined. For example, in a case that there is an overlap region between the second window interface 1 of the application program 1 and the second window interface 2 of the application program 2 and the third dimensional coordinate of the second window interface 2 is farther from the coordinate origin than the third dimensional coordinate of the second window interface 1, it is identified that part of the display region of the second window interface 1 is overlapped by the second window interface 2, and the overlap region between the second window interface 1 and the second window interface 2 is used for displaying the application program 2.

The graphics buffer data read in S1101 is combined with graphics buffer data of regular application programs (such as status bar) in the electronic device, to form frame buffer data, i.e., content displayed by the electronic device in a full-screen manner. Therefore, in the embodiment, the extended three-dimensional coordinate $(x_o, y_o, z_o)$ in the graphics buffer data is converted by utilizing the second parameter, thus the full-screen window interface, i.e., the first window interface of the application program is converted into the second window interface, i.e., a non-full-screen window interface. The converted graphics buffer data includes the converted $(x_o, y_o, z_o)$ and RGB information of the pixels.

A case that a first window interface is scaled down by ½ times to obtain a second window interface is taken as an example. The second parameter, which takes the form of a matrix, is $$\begin{pmatrix} 1/2 & 0 & 0 \\ 0 & 1/2 & 0 \\ 0 & 0 & 1/2 \end{pmatrix},$$

and the three-dimensional coordinate $(x_t, y_t, z_t)$ of the pixel in the frame buffer data corresponding to the second window interface is shown as equation (6):

$$(x_t, y_t, z_t) = \begin{pmatrix} 1/2 & 0 & 0 \\ 0 & 1/2 & 0 \\ 0 & 0 & 1/2 \end{pmatrix} \times \begin{pmatrix} x_o \\ y_o \\ z_o \end{pmatrix} \quad (6)$$

A case that a first window interface is scaled down by ½ times to obtain a second window interface and the second window interface is displaced $\Delta x$ in the horizontal direction and $\Delta y$ in the vertical direction is taken as an example. The second parameter is $$\begin{pmatrix} 1/2 & 0 & \Delta x \\ 0 & 1/2 & \Delta y \\ 0 & 0 & 1/2 \end{pmatrix},$$

and the three-dimensional coordinate $(x_t, y_t, z_t)$ of the pixel in the frame buffer data corresponding to the second window interface is shown as equation (7):

$$(x_t, y_t, z_t) = \begin{pmatrix} 1/2 & 0 & \Delta x \\ 0 & 1/2 & \Delta y \\ 0 & 0 & 1/2 \end{pmatrix} \times \begin{pmatrix} x_o \\ y_o \\ z_o \end{pmatrix} \quad (7)$$

A case that a first window interface is scaled down by ½ times to obtain a second window interface and the second window interface is rotated clockwise by θ degrees is taken as an example. The second parameter is $$\begin{pmatrix} \cos\theta/2 & \sin\theta/2 & 0 \\ -\sin\theta/2 & \cos\theta/2 & 0 \\ 0 & 0 & 1/2 \end{pmatrix},$$

and the three-dimensional coordinate $(x_t, y_t, z_t)$ of the pixel in the frame buffer data corresponding to the second window interface is shown as equation (8):

$$(x_t, y_t, z_t) = \begin{pmatrix} \cos\theta/2 & \sin\theta/2 & 0 \\ -\sin\theta/2 & \cos\theta/2 & 0 \\ 0 & 0 & 1/2 \end{pmatrix} \times \begin{pmatrix} x_o \\ y_o \\ z_o \end{pmatrix} \quad (8)$$

S1103 is displaying the second window interfaces of the application programs on the touch display unit by utilizing the frame buffer data, replacing the first window interfaces with the second window interfaces so that the application programs are displayed within the respective second window interfaces.

In the embodiment, with trigger of the first operation instruction, the first window interface is rotated by utilizing the second parameter to obtain the second window interface, thereby implementing displaying with the first window interface, i.e., a non-full-screen window interface. Further, different first window interfaces may be rotated by different rotation angles, which meets user's requirements in different application scenes and improves user experience.

Figure 13:
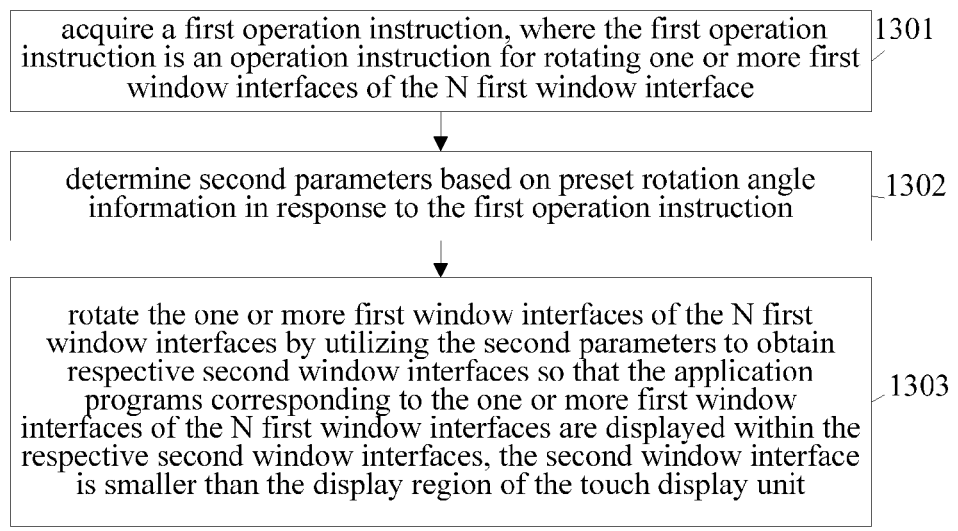
FIG. 13 is a schematic flow chart of an information processing method according to an embodiment of the disclosure.

An information processing method applied to an electronic device is provided according to an embodiment of the disclosure. The electronic device includes a touch display unit capable of running M application programs, where M is a positive integer. The electronic device can perform a first instruction and present N first window interfaces on the touch display unit, where the N first window interfaces correspond to N application programs of the M application programs respectively so that the N application programs are displayed within their respective first window interfaces. The first window interface is smaller than a display region of the touch display unit. FIG. 13 is a schematic flow chart of an information processing method according to an embodiment of the disclosure. As shown in FIG. 13, the method includes the following steps S1301-S1303.

S1301 is acquiring a first operation instruction, where the first operation instruction is an operation instruction for rotating one or more first window interfaces of the N first window interfaces.

S1302 is determining second parameters based on preset first rotation angle information in response to the first operation instruction.

The first operation includes a touch operation instruction of the touch display unit, a voice operation instruction of the electronic device or a shaking operation instruction of the electronic device. The second parameter may be in a form of multiple parameters, or in a form of a matrix.

S1303 is rotating the one or more first window interfaces of the N first window interfaces by utilizing the second parameters to obtain respective second window interfaces so that the application programs corresponding to the one or more first window interfaces of the N first window interfaces are displayed within the respective second window interfaces, where the second window interface is smaller than the display region of the touch display unit.

The one or more first window interfaces of the N first window interfaces are rotated by utilizing the second parameters, so that the rotated angles of the one or more first window interfaces of the N first window interfaces correspond to the preset first rotation angle information.

In the embodiment, the angles by which the one or more first window interfaces of the N first window interfaces are rotated correspond to the preset first rotation angle information. That is, each operation triggers the first window interface to be rotated by a preset rotation angle to obtain the second window. Therefore, multiple first window interfaces may be rotated by the user of the electronic device simultaneously, and the rotated angles correspond to the preset first rotation angle information. The preset first rotation angle information may be set as needed, which facilitates the operation and improves user experience.

In a preferable embodiment, S1303 is reading graphics buffer data of the application programs corresponding to the one or more first window interfaces of the N first window interfaces;

converting the read graphics buffer data of the application programs corresponding to the one or more first window interfaces into graphics buffer data corresponding to second window interfaces respectively by utilizing the second parameters, and combining the graphics buffer data of the second window interfaces into frame buffer data corresponding to the touch display unit; and displaying the second window interfaces corresponding to the one or more first window interfaces on the touch display unit by utilizing the frame buffer data, replacing the first window interfaces with the second window interfaces so that the application programs corresponding to the one or more first window interfaces are displayed within the respective second window interfaces.

In the following, it is illustrated by taking a case that two application programs are displayed within second window interfaces, i.e., two application programs are displayed in a non-full-screen manner, as an example. The following embodiment is also suitable for a scenario that more than two application programs are displayed within respective second window interfaces. As shown in FIG. 11a, steps S1101-S1103 are included.

S1101 is reading graphics buffer data of application program 1 and graphics buffer data of application program 2.

The application program 1 and the application program 2 write graphics buffer data for full-screen display drawn by themselves into a graphics buffer, i.e., stored as graphics buffer data. The graphics buffer data includes two-dimensional coordinate information of a pixel and RGB (Red Green Blue) color information of the pixel.

S1102 is converting the read graphics buffer data corresponding to the application programs into graphics buffer data corresponding to the second window interfaces respectively by utilizing the second parameters, and combining the graphics buffer data of the second window interfaces into frame buffer data corresponding to the touch display unit.

A case that there may be an overlap region between the second window interface of application program 1 and the second window interface of application program 2 is considered. As shown in FIG. 11b, there is an overlap region between the second window interface 1 and the second window interface 2. Accordingly, in the embodiment, two-dimensional coordinate $(x_o, y_o)$ of a pixel in the graphics buffer data of the application program 1 and the application program 2 is extended into three-dimensional coordinate $(x_o, y_o, z_o)$, and different second window interfaces have different third dimensional coordinates $z_o$. Therefore, the second window interface of the application program 1 and the second window interface of the application program 2 can be differentiated by different third dimensional coordinates, so that the overlap relationship of the overlap region between the display region of the second window interface of the application program 1 and the display region of the second window interface of the application program 2 can be determined. For example, in a case that there is an overlap region between the second window interface 1 of the application program 1 and the second window interface 2 of the application program 2 and the third dimensional coordinate of the second window interface 2 is farther from the coordinate origin than the third dimensional coordinate of the second window interface 1, it is identified that part of the display region of the second window interface 1 is overlapped by the second window interface 2, and the overlap region between the second window interface 1 and the second window interface 2 is used for displaying the application program 2.

The graphics buffer data read in S1101 is combined with graphics buffer data of regular application programs (such as status bar) in the electronic device, to form frame buffer data, i.e., content displayed by the electronic device in a full-screen manner. Therefore, in the embodiment, the extended three-dimensional coordinate $(x_o, y_o, z_o)$ in the graphics buffer data is converted by utilizing the second parameter, thus the full-screen window interface, i.e., the first window interface of the application program is converted into the second window interface, i.e., a non-full-screen window interface. The converted graphics buffer data includes the converted $(x_o, y_o, z_o)$ and RGB information of the pixels.

A case that a first window interface is scaled down by ½ times to obtain a second window interface is taken as an example. The second parameter, which takes the form of a matrix, is $$\begin{pmatrix} 1/2 & 0 & \Delta x \\ 0 & 1/2 & \Delta y \\ 0 & 0 & 1/2 \end{pmatrix},$$

and the three-dimensional coordinate $(x_t, y_t, z_t)$ of the pixel in the frame buffer data corresponding to the second window interface is shown as equation (6):

$$(x_t, y_t, z_t) = \begin{pmatrix} 1/2 & 0 & 0 \\ 0 & 1/2 & 0 \\ 0 & 0 & 1/2 \end{pmatrix} \times \begin{pmatrix} x_o \\ y_o \\ z_o \end{pmatrix} \quad (6)$$

A case that a first window interface is scaled down by ½ times to obtain a second window interface and the second window interface is displaced $\Delta x$ in the horizontal direction and $\Delta y$ in the vertical direction is taken as an example. The second parameter is $$\begin{pmatrix} 1/2 & 0 & \Delta x \\ 0 & 1/2 & \Delta y \\ 0 & 0 & 1/2 \end{pmatrix},$$

and the three-dimensional coordinate $(x_t, y_t, z_t)$ of the pixel in the frame buffer data corresponding to the second window interface is shown as equation (7):

$$(x_t, y_t, z_t) = \begin{pmatrix} 1/2 & 0 & \Delta x \\ 0 & 1/2 & \Delta y \\ 0 & 0 & 1/2 \end{pmatrix} \times \begin{pmatrix} x_o \\ y_o \\ z_o \end{pmatrix} \quad (7)$$

A case that a first window interface is scaled down by ½ times to obtain a second window interface and the second window interface is rotated clockwise by $\theta$ degrees is taken as an example. The second parameter is $$\begin{pmatrix} \cos\theta/2 & \sin\theta/2 & 0 \\ -\sin\theta/2 & \cos\theta/2 & 0 \\ 0 & 0 & 1/2 \end{pmatrix},$$

and the three-dimensional coordinate $(x_t, y_t, z_t)$ of the pixel in the frame buffer data corresponding to the second window interface is shown as equation (8):

$$(x_t, y_t, z_t) = \begin{pmatrix} \cos\theta/2 & \sin\theta/2 & 0 \\ -\sin\theta/2 & \cos\theta/2 & 0 \\ 0 & 0 & 1/2 \end{pmatrix} \times \begin{pmatrix} x_o \\ y_o \\ z_o \end{pmatrix} \quad (8)$$

S1103 is displaying the second window interfaces of the application programs on the touch display unit by utilizing the frame buffer data, replacing the first window interfaces with the second window interfaces so that the application programs are displayed within the respective second window interfaces.

It should be noted that the rotation angle of the first window interface depends on the angle parameter $\theta$ in the second parameter. Therefore, in a case that multiple first window interfaces adopt a same second parameter, the multiple first window interfaces are rotated by the same angle $\theta$. Alternatively, the multiple first window interfaces may be rotated by utilizing different second parameters, so that rotation angles of the multiple first window interfaces are different.

Figure 14:
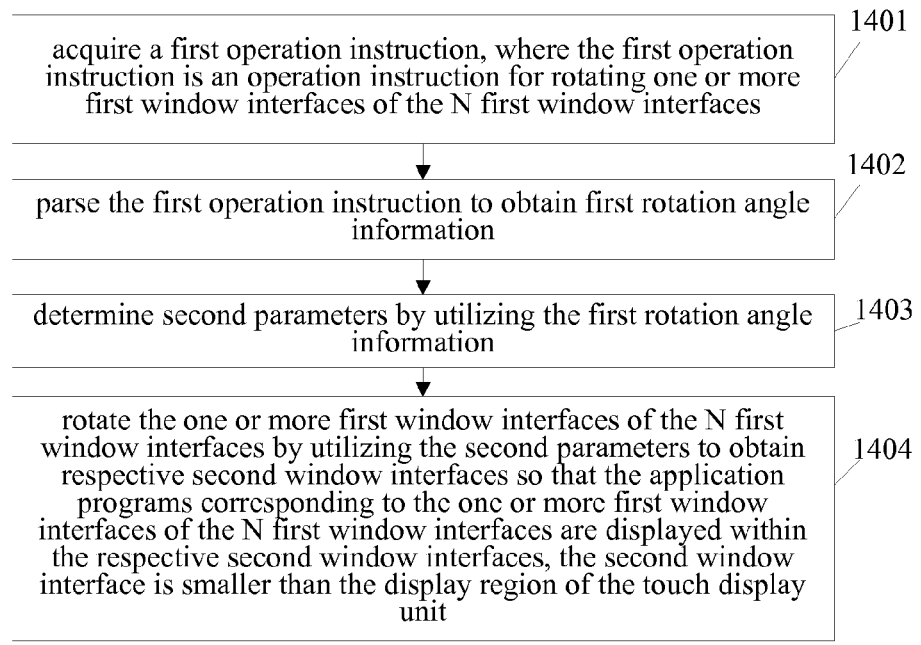
FIG. 14 is a schematic flow chart of an information processing method according to an embodiment of the disclosure.

An information processing method applied to an electronic device is provided according to an embodiment of the disclosure. The electronic device includes a touch display unit capable of running M application programs, where M is a positive integer. The electronic device can perform a first instruction and present N first window interfaces on the touch display unit, where the N first window interfaces correspond to N application programs of the M application programs respectively so that the N application programs are displayed within their respective first window interfaces. The first window interface is smaller than a display region of the touch display unit. FIG. 14 is a schematic flow chart of an information processing method according to an embodiment of the disclosure. As shown in FIG. 14, the method includes the following steps S1401-S1404.

S1401 is acquiring a first operation instruction, where the first operation instruction is an operation instruction for rotating one or more first window interfaces of the N first window interfaces.

S1402 is parsing the first operation instruction to obtain first rotation angle information.

S1403 is determining second parameters by utilizing the first rotation angle information.

The first operation includes a touch operation instruction of the touch display unit, a voice operation instruction of the electronic device or a shaking operation instruction of the electronic device. The second parameter may be in a form of multiple parameters, or in a form of a matrix.

S1404 is rotating the one or more first window interfaces of the N first window interfaces by utilizing the second parameters to obtain respective second window interfaces so that the application programs corresponding to the one or more first window interfaces of the N first window interfaces are displayed within the respective second window interfaces, where the second window interface is smaller than the display region of the touch display unit.

Figure 15A:
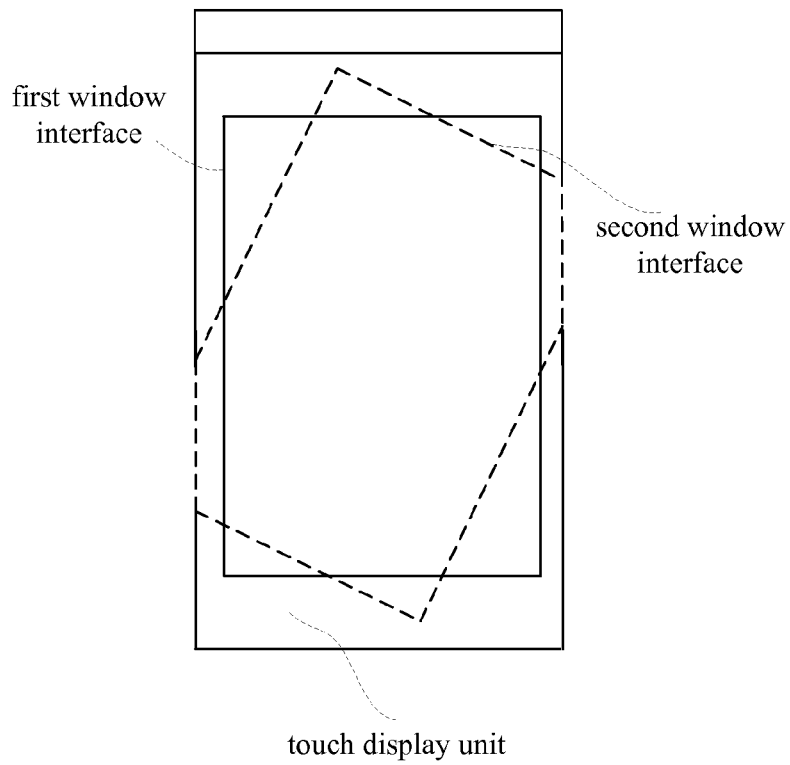
FIG. 15a is a schematic diagram of a first window interface and a second window interface according to an embodiment of the disclosure.

A parameter component in the second parameter that corresponds to the size of a display region of the second window interface is unchanged, so that the shape of the second window interface is unchanged. As shown in FIG. 15a, the first window interface is shown with a solid line, and the second window interface obtained by rotating the first window interface is shown with a dashed line. After the first window interface is rotated, part of content of the second window interface may not be displayed on the touch display unit since the first window interface is not scaled down, i.e., the parameter component in the second parameter that corresponds to the size of the display region of the second window interface is unchanged.

Figure 15B:
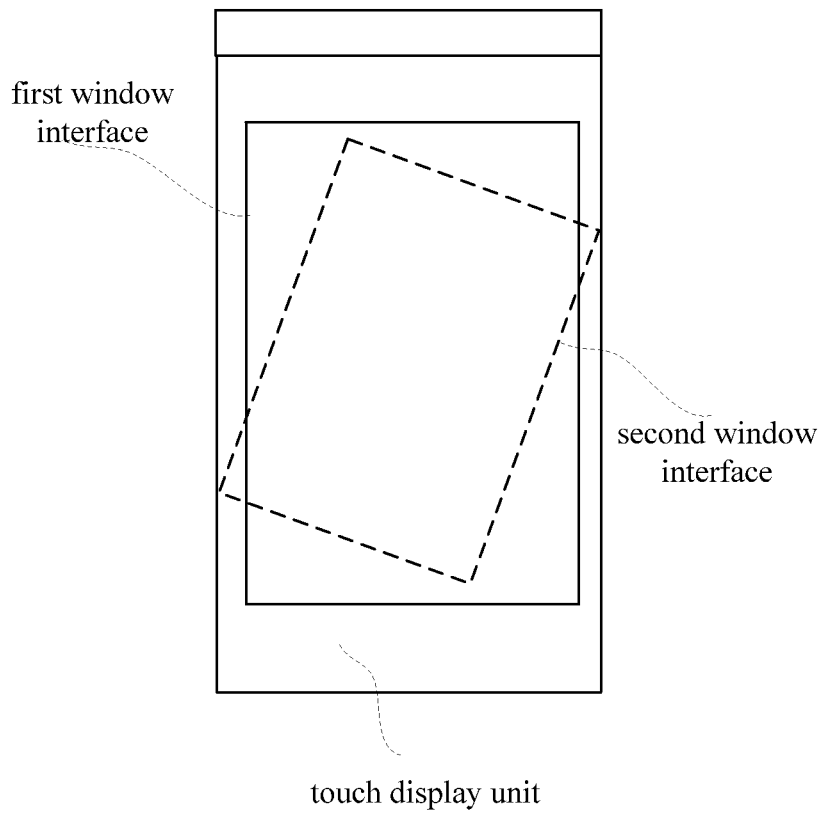
FIG. 15b is a schematic diagram of a first window interface and a second window interface according to an embodiment of the disclosure.

Alternatively, the parameter component in the second parameter that corresponds to the size of the display region of the second window interface may be changed to be adapted to the first rotation angle information, to make all content of the second window interface be displayed on the touch display unit. As shown in FIG. 15b, the first window interface is shown with a solid line, and the second window interface obtained by rotating the first window interface is shown with a dashed line. In view of the fact that part of content may not be displayed on the touch display unit after the first window interface is rotated, in rotating the first window interface by utilizing the second parameter, the first window interface is scaled down adaptively by adjusting the parameter component in the second parameter that corresponds to the size of the display region to obtain the second window interface, so that all content of the second window interface is displayed on the touch display unit. The processing of scaling down and rotating the first window interface to obtain the second window interface may refer to the above embodiments, and the detailed description thereof is omitted herein.

The rotation angles of the one or more first window interfaces of the N first window interfaces correspond to the rotation angle parameter of the received first operation instruction. That is, the angle by which the first window interface is rotated by utilizing the second parameter corresponds to the first operation angle information obtained by parsing the first operation instruction. Therefore, the user of the electronic device may rotate the first window interface by any angle as needed. Further, in rotating the first window interface by utilizing the second parameter, the size of the display region of the obtained second window interface may also be adjusted adaptively, to display all content of the second window interface, which facilitates the operation and improves user experience.

In a preferable embodiment, S1404 is reading graphics buffer data of the application programs corresponding to the one or more first window interfaces of the N first window interfaces;

converting the read graphics buffer data of the application programs corresponding to the one or more first window interfaces into graphics buffer data corresponding to second window interfaces respectively by utilizing the second parameters, and combining the graphics buffer data of the second window interfaces into frame buffer data corresponding to the touch display unit; and displaying the second window interfaces corresponding to the one or more first window interfaces on the touch display unit by utilizing the frame buffer data, replacing the first window interfaces with the second window interfaces so that the application programs corresponding to the one or more first window interfaces are displayed within the respective second window interfaces.

The method of displaying the application program in a non-full-screen manner is the same as the above embodiments, and the detailed description thereof is omitted herein.

Figure 16:
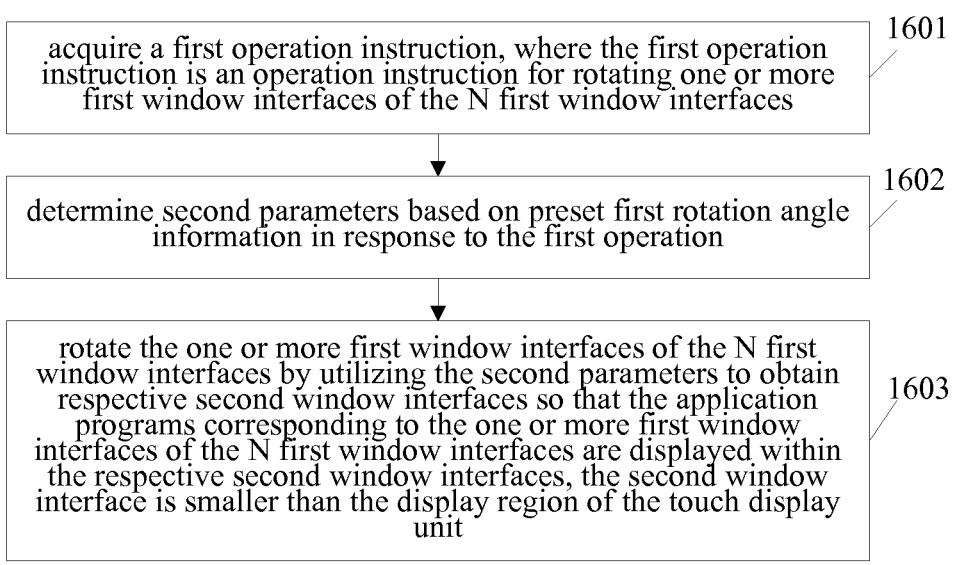
FIG. 16 is a schematic flow chart of an information processing method according to an embodiment of the disclosure.

An information processing method applied to an electronic device is provided according to an embodiment of the disclosure. The electronic device includes a touch display unit capable of running M application programs, where M is a positive integer. The electronic device can perform a first instruction and present N first window interfaces on the touch display unit, where the N first window interfaces correspond to N application programs of the M application programs respectively so that the N application programs are displayed within their respective first window interfaces. The first window interface is smaller than a display region of the touch display unit. FIG. 16 is a schematic flow chart of an information processing method according to an embodiment of the disclosure. As shown in FIG. 16, the method includes the following steps S1601-S1603.

S1601 is acquiring a first operation instruction, where the first operation instruction is an operation instruction for rotating one or more first window interfaces of the N first window interfaces.

S1602 is determining second parameters based on preset first rotation angle information in response to the first operation instruction.

The first operation includes a touch operation instruction of the touch display unit, a voice operation instruction of the electronic device or a shaking operation instruction of the electronic device. The second parameter may be in a form of multiple parameters, or in a form of a matrix.

S1603 is rotating the one or more first window interfaces of the N first window interfaces by utilizing the second parameters to obtain respective second window interfaces so that the application programs corresponding to the one or more first window interfaces of the N first window interfaces are displayed within the respective second window interfaces, where the second window interface is smaller than the display region of the touch display unit.

The one or more first window interfaces of the N first window interfaces are rotated by utilizing the second parameters, so that the rotation angles of the one or more first window interfaces of the N first window interfaces correspond to the preset first rotation angle information.

A parameter component in the second parameter that corresponds to the size of a display region of the second window interface is unchanged, so that the shape of the second window interface is unchanged. As shown in FIG. 15a, the first window interface is shown with a solid line, and the second window interface obtained by rotating the first window interface is shown with a dashed line. After the first window interface is rotated, part of content of the second window interface may not be displayed on the touch display unit since the first window interface is not scaled down, i.e., the parameter component in the second parameter that corresponds to the size of the display region of the second window interface is unchanged.

Alternatively, the parameter component in the second parameter that corresponds to the size of the display region of the second window interface may be changed to be adapted to the first rotation angle information, to make all content of the second window interface be displayed on the touch display unit. As shown in FIG. 15b, the first window interface is shown with a solid line, and the second window interface obtained by rotating the first window interface is shown with a dashed line. In view of the fact that part of content may not be displayed on the touch display unit after the first window interface is rotated, in rotating the first window interface by utilizing the second parameter, the first window interface is scaled down adaptively by adjusting the parameter component in the second parameter that corresponds to the size of the display region to obtain the second window interface, so that all content of the second window interface is displayed on the touch display unit. The processing of scaling down and rotating the first window interface to obtain the second window interface may refer to the above embodiments, and the detailed description thereof is omitted herein.

In the embodiment, the rotation angles of the one or more first window interfaces of the N first window interfaces correspond to the preset first rotation angle information. That is, each operation triggers the first window interface to be rotated by a preset rotation angle to obtain the second window interface. Therefore, multiple first window interfaces may be rotated by the user of the electronic device simultaneously, and the rotation angles correspond to the preset first rotation angle information. The preset first rotation angle information may be set as needed. Further, in rotating the first window interface by utilizing the second parameter, the size of the display region of the second window interface may be adjusted adaptively, to display all content of the second window interface, which facilitates the operation and improves user experience.

It should be noted that, an electronic device described below according to an embodiment is similar to the above described methods. Technical details of the electronic device of the embodiments of the disclosure which are not described may refer to the description of the method embodiments of the disclosure.

Figure 17:
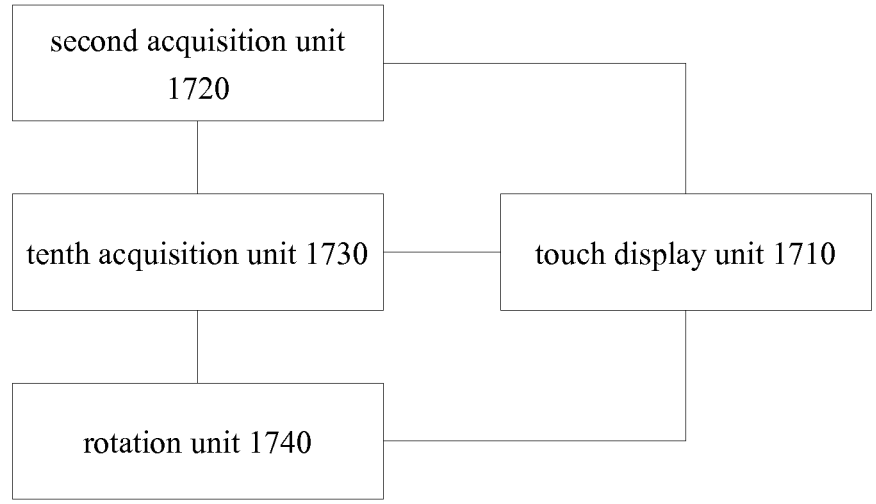
FIG. 17 is a schematic structure diagram of an electronic device according to an embodiment of the disclosure.

An electronic device is provided according to an embodiment of the disclosure. FIG. 17 is a schematic structure diagram of an electronic device according to an embodiment of the disclosure. As shown in FIG. 17, the electronic device includes a touch display unit 1710 capable of running M application programs, where M is a positive integer. The electronic device can perform a first instruction and present N first window interfaces on the touch display unit 1710, where the N first window interfaces correspond to N application programs of the M application programs respectively so that the N application programs are displayed within their respective first window interfaces. The first window interface is smaller than a display region of the touch display unit 1710. The electronic device further includes a second acquisition unit 1720, a tenth acquisition unit 1730 and a rotation unit 1740.

The second acquisition unit 1720 is configured to acquire a first operation instruction, where the first operation instruction is an operation instruction for rotating one or more first window interfaces of the N first window interfaces.

The tenth acquisition unit 1730 is configured to acquire second parameters in response to the first operation instruction.

The rotation unit 1740 is configured to rotate the one or more first window interfaces of the N first window interfaces by utilizing the second parameters to obtain respective second window interfaces so that the application programs corresponding to the one or more first window interfaces of the N first window interfaces are displayed within the respective second window interfaces, where the second window interface is smaller than the display region of the touch display unit 1710.

Figure 18:
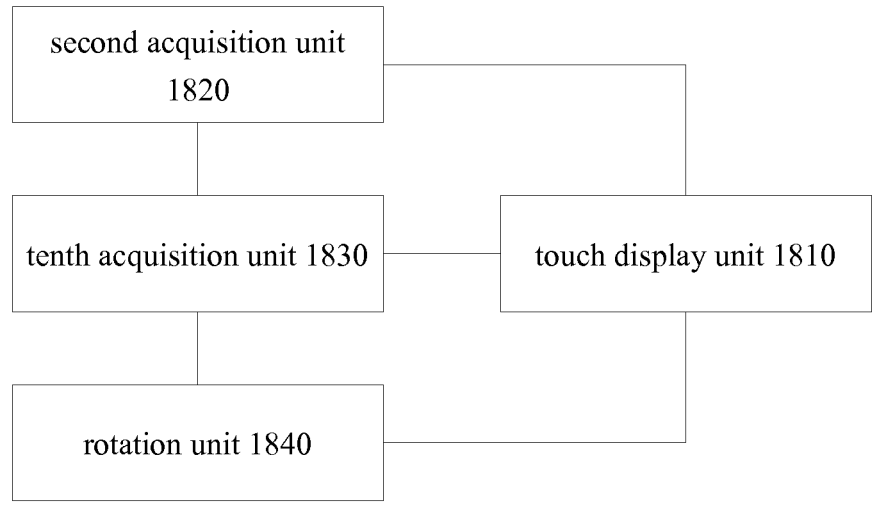
FIG. 18 is a schematic structure diagram of an electronic device according to an embodiment of the disclosure.

An electronic device is provided according to an embodiment of the disclosure. FIG. 18 is a schematic structure diagram of an electronic device according to an embodiment of the disclosure. As shown in FIG. 18, the electronic device includes a touch display unit 1810 capable of running M application programs, where M is a positive integer. The electronic device can perform a first instruction and present N first window interfaces on the touch display unit 1810, where the N first window interfaces correspond to N application programs of the M application programs respectively so that the N application programs are displayed within their respective first window interfaces. The first window interface is smaller than a display region of the touch display unit 1810. The electronic device further includes a second acquisition unit 1820, a tenth acquisition unit 1830 and a rotation unit 1840.

The second acquisition unit 1820 is configured to acquire a first operation instruction, where the first operation instruction is an operation instruction for rotating one or more first window interfaces of the N first window interfaces.

The tenth acquisition unit 1830 is configured to acquire second parameters in response to the first operation instruction.

The rotation unit 1840 is configured to rotate the one or more first window interfaces of the N first window interfaces by utilizing the second parameters to obtain respective second window interfaces so that the application programs corresponding to the one or more first window interfaces of the N first window interfaces are displayed within the respective second window interfaces, where the second window interface is smaller than the display region of the touch display unit 1810.

The tenth acquisition unit 1830 is further configured to parse the first operation instruction to obtain first rotation angle information; and determine the second parameters by utilizing the first rotation angle information.

The rotation unit 1840 is further configured to rotate the one or more first window interfaces of the N first window interfaces by utilizing the second parameters, so that the rotated angles of the one or more first window interfaces of the N first window interfaces correspond to the rotation angle parameter of the received first operation instruction.

The tenth acquisition unit 1830 is further configured to determine the second parameters based on preset first rotation angle information.

The rotation unit 1840 is further configured to rotate the one or more first window interfaces of the N first window interfaces by utilizing the second parameters, so that the rotation angles of the one or more first window interfaces of the N first window interfaces correspond to the preset first rotation angle information.

The rotation unit 1840 is further configured to, in rotating the one or more first window interfaces of the N first window interfaces by utilizing the second parameters, make a parameter component in the second parameter that corresponds to the size of a display region of the second window interface unchanged, so that the size of the display region of the second window interface is unchanged; or adaptively change a parameter component in the second parameter that corresponds to the size of a display region of the second window interface based on the first rotation angle information, so that all content of the second window interface is displayed on the touch display unit 1810.

The rotation unit 1840 is further configured to read graphics buffer data of the application programs corresponding to the one or more first window interfaces of the N first window interfaces;

convert the read graphics buffer data of the application programs corresponding to the one or more first window interfaces into graphics buffer data corresponding to second window interfaces respectively by utilizing the second parameters, and combine the graphics buffer data of the second window interfaces into frame buffer data corresponding to the touch display unit 1810; and display the second window interfaces corresponding to the one or more first window interfaces on the touch display unit 1810 by utilizing the frame buffer data, replacing the first window interfaces with the second window interfaces so that the application programs corresponding to the one or more first window interfaces are displayed within the respective second window interfaces.

In practical applications, the touch display unit 1710 may be implemented by a touch display in the electronic device. The second acquisition unit 1720, the tenth acquisition unit 1730 and the rotation unit 1740 may be implemented by a CPU, a Digital Signal Processor (DSP) or a Field Programmable Gate Array (FPGA) in the electronic device. In the embodiment, the touch display unit 1810 may be implemented by a touch display in the electronic device; the second acquisition unit 1820, the tenth acquisition unit 1830 and the rotation unit 1840 may be implemented by a CPU, a DSP or a FPGA in the electronic device.

Figure 19:
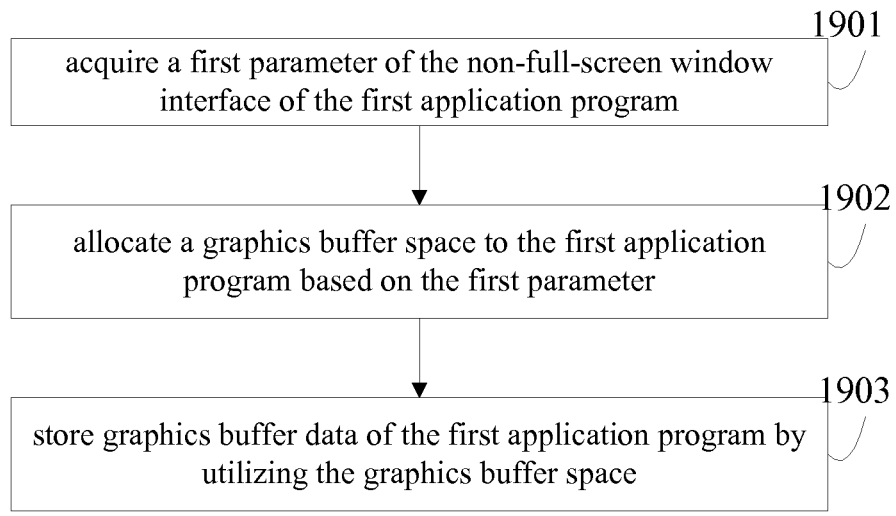
FIG. 19 is a schematic flow chart of an information processing method according to an embodiment of the disclosure.

FIG. 19 is a schematic flow chart of an information processing method according to an embodiment of the disclosure. The information processing method in the embodiment is applied to an electronic device having a touch display unit. The electronic device can run N first application programs, where N is a positive integer. If a first application program is started by an object corresponding to the first application program, the started first application program can be displayed onto the touch display unit in a non-full-screen window interface, and the display region of the non-full-screen window interface is smaller less than the display region of a full-screen window interface of the first application program. The non-full-screen window interface is obtained by converting the full-screen window interface with a first parameter. As shown in FIG. 19, the information processing method includes the following steps S1901-S1903.

S1901 is acquiring a first parameter of the non-full-screen window interface of the first application program.

In the embodiment, the first application program run by the electronic device may be an application program owned by the electronic device system such as a clock application program and a camera application program, or may be a third-party application program set by a user such as a Wechat application program and a game application program.

In general, all the first application programs are displayed on a desktop of the electronic device in a form of icon list. One first application program corresponds to one icon, and a first application program can be started by touching an icon corresponding to the first application program. If the first application program is started as the above, the first application program is displayed on a display screen of the electronic device in a full-screen display manner.

In the embodiment of the disclosure, the first application program is an application program supporting non-full-screen window interface. The first application program is displayed on the touch display unit of the electronic device in a non-full-screen display manner if the first application program is started in a way including but not limited to the following:

adding the first application program into a multi-window management interface in advance, so as to make the first application program support non-full-screen display, where the multi-window management interface may be displayed by starting an icon corresponding to a multi-window management application program; and displaying the first application program on the touch display unit of the electronic device in a non-full-screen display manner when the first application program is started by the multi-window management interface.

Based on the above, if the first application program is displayed in the non-full-screen window interface, it is required to allocate a graphics buffer space to the first application program to store graphics buffer data. The graphics buffer space allocated to the non-full-screen window interface is less than a graphics buffer space allocated to a corresponding full-screen window interface in the embodiment.

Here, the non-full-screen window interface of the first application program corresponds to a first parameter, and the non-full-screen window interface of the first application program can be obtained by converting the full-screen window interface of the first application program by utilizing the first parameter.

In the embodiment, the first parameter at least includes a parameter, a matrix, a parameter group or a parameter set. For example, the first parameter may be realized by a first matrix, and the full-screen window interface of the first application program is converted by utilizing the first matrix, which may be realized by equation (1a):

$$\begin{pmatrix} x_2 \\ y_2 \\ z_2 \end{pmatrix} = \begin{pmatrix} M_{11} & M_{12} & M_{13} \\ M_{21} & M_{22} & M_{23} \\ M_{31} & M_{32} & M_{33} \end{pmatrix} \times \begin{pmatrix} x_1 \\ y_1 \\ z_1 \end{pmatrix} \quad (1a)$$

$$\begin{pmatrix} x_2 \\ y_2 \\ z_2 \end{pmatrix}$$

represents a coordinate vector of the non-full-screen window interface, where $x_2$ is a horizontal coordinate of the non-full-screen window interface, $y_2$ is a vertical coordinate of the non-full-screen window interface, and $z_2$ is set as 1 by default.

$$M = \begin{pmatrix} M_{11} & M_{12} & M_{13} \\ M_{21} & M_{22} & M_{23} \\ M_{31} & M_{32} & M_{33} \end{pmatrix},$$

where M represents the first matrix, and the first matrix is a 3×3 matrix, $M_{ij}$ is an element at the i-th row in the j-th column in the first matrix, where i is taken to be 1, 2 or 3 and j is taken to be 1, 2 or 3.

$$\begin{pmatrix} x_1 \\ y_1 \\ z_1 \end{pmatrix}$$

represents a coordinate vector of the full-screen window interface, where $x_1$ is a horizontal coordinate of the full-screen window interface, $y_1$ is a vertical coordinate of the full-screen window interface, and $z_1$ is set as 1 by default.

In scaling the full-screen window interface by equation (1a), four elements of $M_{ij}$ may be set as $M_{11}=\alpha$, $M_{12}=0$, $M_{21}=0$, $M_{22}=\beta$, and other five elements may be set arbitrarily. In this way, equation (2a) may be obtained by substituting the above set parameters into equation (1a):

$$x_2 = \alpha \times x_1$$

$$y_2 = \beta \times y_1 \quad (2a)$$

where $\alpha$ is a scaling parameter of the horizontal coordinate, and $\beta$ is a scaling parameter of the vertical coordinate.

In rotating the full-screen window interface by equation (1a), four elements of $M_{ij}$ may be set as $M_{11}=\cos\theta$, $M_{12}=\sin\theta$, $M_{21}=-\sin\theta$, $M_{22}=\cos\theta$, and other five elements may be set arbitrarily. In this way, equation (3a) may be obtained by substituting the above set parameters into equation (1a):

$$x_2=\cos\theta \times x_1 + \sin\theta \times y_1$$

$$y_2=-\sin\theta \times x_1 + \cos\theta \times y_1 \tag{3a}$$

where $\theta$ is a rotation angle.

Translating the full-screen window interface of the first application program by utilizing the first matrix may be realized by equation (4a):

$$\begin{pmatrix} x_2 \\ y_2 \\ z_2 \end{pmatrix} = \begin{pmatrix} M_{11} \\ M_{21} \\ M_{31} \end{pmatrix} + \begin{pmatrix} x_1 \\ y_1 \\ z_1 \end{pmatrix} \tag{4a}$$

In translating the full-screen window interface by equation (4a), three elements of $M_{ij}$ may be set as $M_{11}=a$, $M_{21}=b$, $M_{31}=0$. In this way, equation (5a) may be obtained by substituting the above set parameters into equation (4a):

$$x_2=a+x_1$$

$$y_2=b+y_1 \tag{5a}$$

where a is a translation parameter of the horizontal coordinate, and b is a translation parameter of the vertical coordinate.

S1902 is allocating a graphics buffer space to the first application program based on the first parameter.

Here, the graphics buffer space of the non-full-screen window interface of the first application program is less than the graphics buffer space of the full-screen window interface of the first application program.

In the embodiment, the first parameter indicates the size of a non-full-screen window interface of the first application program. Therefore, after the size of the non-full-screen window interface of the first application program is determined by the first parameter, a graphics buffer space is allocated to the first application program based on the size of the non-full-screen window interface of the first application program.

For example, in a case that the window interface of the first application program is smaller, less graphics buffer space may be allocated to the first application program, and in a case that the window interface of the first application program is larger, more graphics buffer space may be allocated to the first application program, so that data displayed in the non-full-screen window interface can be identified clearly by a user. Here, the graphics buffer space of the non-full-screen window interface of the first application program is less than the graphics buffer space of the full-screen window interface of the first application program.

S1903 is storing the graphics buffer data of the first application program by using the graphics buffer space.

In the embodiment, the first application program is displayed by drawing with graphics buffer data less than that of a full-screen window interface, which saves memory space of the electronic device and reduces the influence on the electronic device system due to memory occupied by the graphics buffer data.

Figure 20:
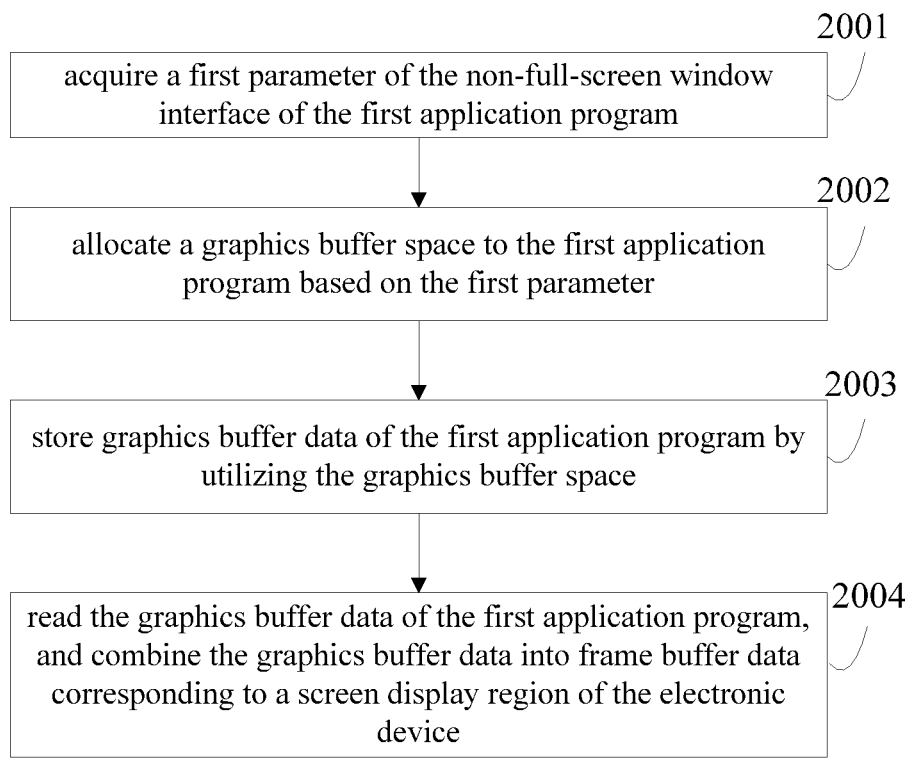
FIG. 20 is a schematic flow chart of an information processing method according to an embodiment of the disclosure.

FIG. 20 is a schematic flow chart of an information processing method according to an embodiment of the disclosure. The information processing method in the embodiment is applied to an electronic device having a touch display unit. The electronic device can run N first application programs, where N is a positive integer. If a first application program is started by an object corresponding to the first application program, the started first application program can be displayed onto the touch display unit in a non-full-screen window interface, and the display region of the non-full-screen window interface is smaller less than the display region of a full-screen window interface of the first application program. The non-full-screen window interface is obtained by converting the full-screen window interface with a first parameter. As shown in FIG. 20, the information processing method includes the following steps S2001-S2005.

S2001 is acquiring a first parameter of the non-full-screen window interface of the first application program.

In the embodiment, the first application program run by the electronic device may be an application program owned by the electronic device system such as a clock application program and a camera application program, or may be a third-party application program set by a user such as a Wechat application program and a game application program.

In general, all the first application programs are displayed on a desktop of the electronic device in a form of icon list. One first application program corresponds to one icon, and a first application program can be started by touching an icon corresponding to the first application program. If the first application program is started as the above, the first application program is displayed on a display screen of the electronic device in a full-screen display manner.

In the embodiment of the disclosure, the first application program is an application program supporting non-full-screen window interface. The first application program is displayed on the touch display unit of the electronic device in a non-full-screen display manner if the first application program is started in a way including but not limited to the following:

adding the first application program into a multi-window management interface in advance, so as to make the first application program support non-full-screen display, where the multi-window management interface may be displayed by starting an icon corresponding to a multi-window management application program; and displaying the first application program on the touch display unit of the electronic device in a non-full-screen display manner when the first application program is started by the multi-window management interface.

Based on the above, if the first application program is displayed in the non-full-screen window interface, it is required to allocate a graphics buffer space to the first application program to store graphics buffer data. The graphics buffer space allocated to the non-full-screen window interface is less than a graphics buffer space allocated to a corresponding full-screen window interface in the embodiment.

Here, the non-full-screen window interface of the first application program corresponds to a first parameter, and the non-full-screen window interface of the first application program can be obtained by converting the full-screen window interface of the first application program by utilizing the first parameter.

In the embodiment, the first parameter at least includes a parameter, a matrix, a parameter group or a parameter set. For example, the first parameter may be realized by a first matrix, and the full-screen window interface of the first application program is converted by utilizing the first matrix, which may be realized by equation (1b):

$$\begin{pmatrix} x_2 \\ y_2 \\ z_2 \end{pmatrix} = \begin{pmatrix} M_{11} & M_{12} & M_{13} \\ M_{21} & M_{22} & M_{23} \\ M_{31} & M_{32} & M_{33} \end{pmatrix} \times \begin{pmatrix} x_1 \\ y_1 \\ z_1 \end{pmatrix} \quad (1b)$$

$$\begin{pmatrix} x_2 \\ y_2 \\ z_2 \end{pmatrix}$$

represents a coordinate vector of the non-full-screen window interface, where $x_2$ is a horizontal coordinate of the non-full-screen window interface, $y_2$ is a vertical coordinate of the non-full-screen window interface, and $z_2$ is set as 1 by default.

$$M = \begin{pmatrix} M_{11} & M_{12} & M_{13} \\ M_{21} & M_{22} & M_{23} \\ M_{31} & M_{32} & M_{33} \end{pmatrix},$$

where M represents the first matrix, and the first matrix is a 3×3 matrix, $M_{ij}$ is an element at the i-th row in the j-th column in the first matrix, where i is taken to be 1, 2 or 3 and j is taken to be 1, 2 or 3.

$$\begin{pmatrix} x_1 \\ y_1 \\ z_1 \end{pmatrix}$$

represents a coordinate vector of the full-screen window interface, where $x_1$ is a horizontal coordinate of the full-screen window interface, $y_1$ is a vertical coordinate of the full-screen window interface, and $z_1$ is set as 1 by default.

In scaling the full-screen window interface by equation (1b), four elements of $M_{ij}$ may be set as $M_{11}=\alpha$, $M_{12}=0$, $M_{21}=0$, $M_{22}=\beta$, and other five elements may be set arbitrarily. In this way, equation (2b) may be obtained by substituting the above set parameters into equation (1b):

$$x_2 = \alpha \times x_1$$

$$y_2 = \beta \times y_1 \quad (2b)$$

where $\alpha$ is a scaling parameter of the horizontal coordinate, and $\beta$ is a scaling parameter of the vertical coordinate.

In rotating the full-screen window interface by equation (1b), four elements of $M_{ij}$ may be set as $M_{11}=\cos\theta$, $M_{12}=\sin\theta$, $M_{21}=-\sin\theta$, $M_{22}=\cos\theta$, and other five elements may be set arbitrarily. In this way, equation (3b) may be obtained by substituting the above set parameters into equation (1b):

$$x_2 = \cos\theta \times x_1 + \sin\theta \times y_1$$

$$y_2 = -\sin\theta \times x_1 + \cos\theta \times y_1 \quad (3b)$$

where $\theta$ is a rotation angle.

Translating the full-screen window interface of the first application program by utilizing the first matrix may be realized by equation (4b):

$$\begin{pmatrix} x_2 \\ y_2 \\ z_2 \end{pmatrix} = \begin{pmatrix} M_{11} \\ M_{21} \\ M_{31} \end{pmatrix} + \begin{pmatrix} x_1 \\ y_1 \\ z_1 \end{pmatrix} \quad (4b)$$

In translating the full-screen window interface by equation (4b), three elements of $M_{ij}$ may be set as $M_{11}=a$, $M_{21}=b$, $M_{31}=0$. In this way, equation (5b) may be obtained by substituting the above set parameters into equation (4b):

$$x_2 = a + x_1$$

$$y_2 = b + y_1 \quad (5b)$$

where a is a translation parameter of the horizontal coordinate, and b is a translation parameter of the vertical coordinate.

S2002 is allocating a graphics buffer space to the first application program based on the first parameter.

Here, the graphics buffer space of the non-full-screen window interface of the first application program is less than the graphics buffer space of the full-screen window interface of the first application program.

In the embodiment, the first parameter indicates the size of a non-full-screen window interface of the first application program. Therefore, after the size of the non-full-screen window interface of the first application program is determined by the first parameter, a graphics buffer space is allocated to the first application program based on the size of the non-full-screen window interface of the first application program.

For example, in a case that the window interface of the first application program is smaller, less graphics buffer space may be allocated to the first application program, and in a case that the window interface of the first application program is larger, more graphics buffer space may be allocated to the first application program, so that data displayed in the non-full-screen window interface can be identified clearly by a user. Here, the graphics buffer space of the non-full-screen window interface of the first application program is less than the graphics buffer space of the full-screen window interface of the first application program.

S2003 is storing the graphics buffer data of the first application program by using the graphics buffer space.

S2004 is reading the graphics buffer data of the first application program, and combining the read graphics buffer data into frame buffer data corresponding to a screen display region of the electronic device.

Here, the graphics buffer data of the first application program may be RGB (Red Green Blue) data.

The electronic device in the embodiment includes two buffer regions which are graphics buffer and frame buffer respectively. The graphics buffer is used to store the RGB data drawn by the first application program; and the frame buffer is used to store the frame buffer data obtained after the graphics buffer data is combined. In this way, data of a whole frame is displayed on the screen display region of the electronic device.

S2005 is displaying the frame buffer data on the touch display unit of the electronic device via a non-full-screen window interface of the first application program.

In the embodiment, the first application program is displayed by drawing with graphics buffer data less than that of a full-screen window interface, which saves memory space of the electronic device and reduces the influence on the electronic device system due to memory occupied by the graphics buffer data.

Figure 21:
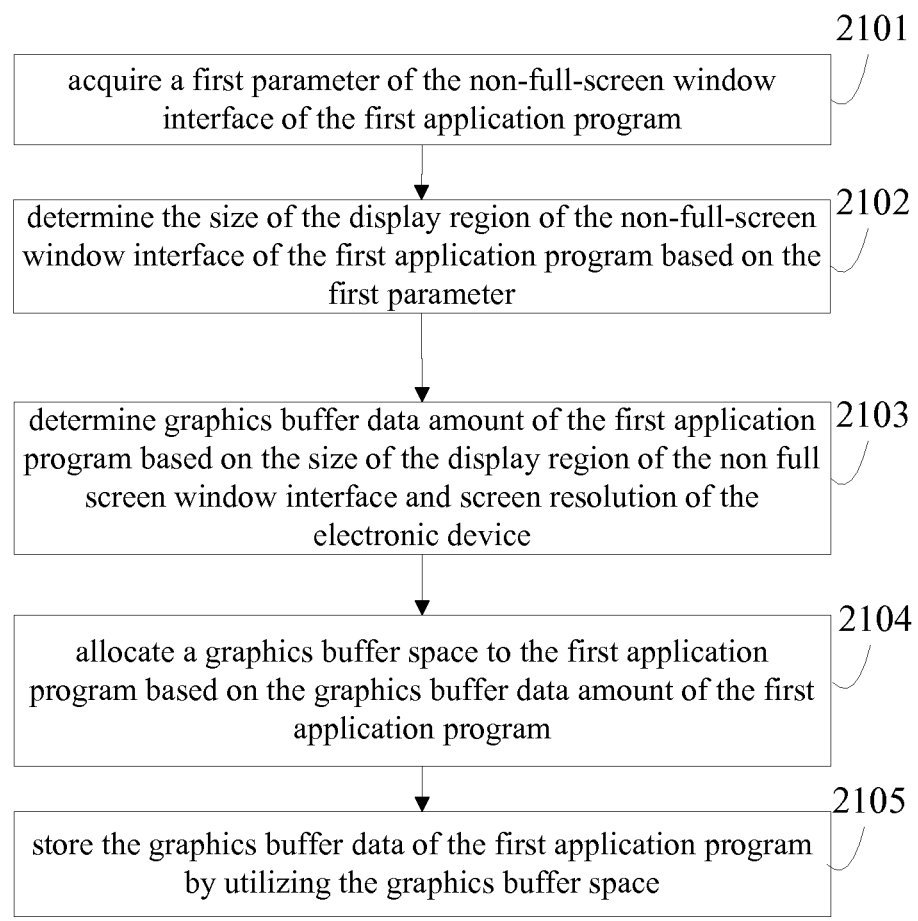
FIG. 21 is a schematic flow chart of an information processing method according to an embodiment of the disclosure.

FIG. 21 is a schematic flow chart of an information processing method according to an embodiment of the disclosure. The information processing method in the embodiment is applied to an electronic device having a touch display unit. The electronic device can run N first application programs, where N is a positive integer. If a first application program is started by an object corresponding to the first application program, the started first application program can be displayed onto the touch display unit in a non-full-screen window interface, and the display region of the non-full-screen window interface is smaller less than the display region of a full-screen window interface of the first application program. The non-full-screen window interface is obtained by converting the full-screen window interface with a first parameter. As shown in FIG. 21, the information processing method includes the following steps S2101-S2105.

S2101 is acquiring a first parameter of the non-full-screen window interface of the first application program.

In the embodiment, the first application program run by the electronic device may be an application program owned by the electronic device system such as a clock application program and a camera application program, or may be a third-party application program set by a user such as a Wechat application program and a game application program.

In general, all the first application programs are displayed on a desktop of the electronic device in a form of icon list. One first application program corresponds to one icon, and a first application program can be started by touching an icon corresponding to the first application program. If the first application program is started as the above, the first application program is displayed on a display screen of the electronic device in a full-screen display manner.

In the embodiment of the disclosure, the first application program is an application program supporting non-full-screen window interface. The first application program is displayed on the touch display unit of the electronic device in a non-full-screen display manner if the first application program is started in a way including but not limited to the following:

adding the first application program into a multi-window management interface in advance, so as to make the first application program support non-full-screen display, where the multi-window management interface may be displayed by starting an icon corresponding to a multi-window management application program; and displaying the first application program on the touch display unit of the electronic device in a non-full-screen display manner when the first application program is started by the multi-window management interface.

Based on the above, if the first application program is displayed in the non-full-screen window interface, it is required to allocate a graphics buffer space to the first application program to store graphics buffer data. The graphics buffer space allocated to the non-full-screen window interface is less than a graphics buffer space allocated to a corresponding full-screen window interface in the embodiment.

Here, the non-full-screen window interface of the first application program corresponds to a first parameter, and the non-full-screen window interface of the first application program can be obtained by converting the full-screen window interface of the first application program by utilizing the first parameter.

In the embodiment, the first parameter at least includes a parameter, a matrix, a parameter group or a parameter set. For example, the first parameter may be realized by a first matrix, and the full-screen window interface of the first application program is converted by utilizing the first matrix, which may be realized by equation (1c):

$$\begin{pmatrix} x_2 \\ y_2 \\ z_2 \end{pmatrix} = \begin{pmatrix} M_{11} & M_{12} & M_{13} \\ M_{21} & M_{22} & M_{23} \\ M_{31} & M_{32} & M_{33} \end{pmatrix} \times \begin{pmatrix} x_1 \\ y_1 \\ z_1 \end{pmatrix} \quad (1c)$$

$$\begin{pmatrix} x_2 \\ y_2 \\ z_2 \end{pmatrix} \begin{pmatrix} x_2 \\ y_2 \\ z_2 \end{pmatrix}$$

represents a coordinate vector of the non-full-screen window interface, where $x_2$ is a horizontal coordinate of the non-full-screen window interface, $y_2$ is a vertical coordinate of the non-full-screen window interface, and $z_2$ is set as 1 by default.

$$M = \begin{pmatrix} M_{11} & M_{12} & M_{13} \\ M_{21} & M_{22} & M_{23} \\ M_{31} & M_{32} & M_{33} \end{pmatrix},$$

where M represents the first matrix, and the first matrix is a 3×3 matrix, $M_{ij}$ is an element at the i-th row in the j-th column in the first matrix, where i is taken to be 1, 2 or 3 and j is taken to be 1, 2 or 3.

$$\begin{pmatrix} x_1 \\ y_1 \\ z_1 \end{pmatrix}$$

represents a coordinate vector of the full-screen window interface, where $x_1$ is a horizontal coordinate of the full-screen window interface, $y_1$ is a vertical coordinate of the full-screen window interface, and $z_1$ is set as 1 by default.

In scaling the full-screen window interface by equation (1c), four elements of $M_{ij}$ may be set as $M_{11}=\alpha$, $M_{12}=0$, $M_{21}=0$, $M_{22}=\beta$, and other five elements may be set arbitrarily. In this way, equation (2c) may be obtained by substituting the above set parameters into equation (1c):

$$x_2 = \alpha \times x_1$$

$$y_2 = \beta \times y_1 \quad (2c)$$

where $\alpha$ is a scaling parameter of the horizontal coordinate, and $\beta$ is a scaling parameter of the vertical coordinate.

In rotating the full-screen window interface by equation (1c), four elements of $M_{ij}$ may be set as $M_{11}=\cos\theta$, $M_{12}=\sin\theta$, $M_{21}=-\sin\theta$, $M_{22}=\cos\theta$, and other five elements may be set arbitrarily. In this way, equation (3c) may be obtained by substituting the above set parameters into equation (1c):

$$x_2 = \cos\theta \times x_1 + \sin\theta \times y_1$$

$$y_2 = -\sin\theta \times x_1 + \cos\theta \times y_1 \quad (3c)$$

where $\theta$ is a rotation angle.

Translating the full-screen window interface of the first application program by utilizing the first matrix may be realized by equation (4c):

$$\begin{pmatrix} x_2 \\ y_2 \\ z_2 \end{pmatrix} = \begin{pmatrix} M_{11} \\ M_{21} \\ M_{31} \end{pmatrix} + \begin{pmatrix} x_1 \\ y_1 \\ z_1 \end{pmatrix} \quad (4c)$$

In translating the full-screen window interface by equation (4c), three elements of $M_{ij}$ may be set as $M_{11}$=a, $M_{21}$=b, $M_{31}$=0. In this way, equation (5c) may be obtained by substituting the above set parameters into equation (4c):

$$x_2 = a + x_1$$

$$y_2 = b + y_1 \quad (5c)$$

where a is a translation parameter of the horizontal coordinate, and b is a translation parameter of the vertical coordinate.

S2102 is determining the size of the display region of the non-full-screen window interface of the first application program based on the first parameter.

S2103 is determining graphics buffer data amount of the first application program based on the size of the display region of the non-full-screen window interface and screen resolution of the electronic device.

The graphics buffer data amount is in direct proportion to the size of the display region and the screen resolution. The larger the display region is, the more the graphics buffer data amount is, and the smaller the display region is, the less the graphics buffer data amount is. The higher the screen resolution is, the more the graphics buffer data amount is, and the lower the screen resolution is, the less the graphics buffer data amount is.

S2104 is allocating a graphics buffer space to the first application program based on the graphics buffer data amount of the first application program.

Here, the graphics buffer space of the non-full-screen window interface of the first application program is less than the graphics buffer space of the full-screen window interface of the first application program.

In the embodiment, the first parameter indicates the size of a non-full-screen window interface of the first application program. Therefore, after the size of the non-full-screen window interface of the first application program is determined by the first parameter, a graphics buffer space is allocated to the first application program based on the size of the non-full-screen window interface of the first application program.

For example, in a case that the window interface of the first application program is smaller, less graphics buffer space may be allocated to the first application program, and in a case that the window interface of the first application program is larger, more graphics buffer space may be allocated to the first application program, so that data displayed in the non-full-screen window interface can be identified clearly by a user. Here, the graphics buffer space of the non-full-screen window interface of the first application program is less than the graphics buffer space of the full-screen window interface of the first application program.

S2105 is storing the graphics buffer data of the first application program by using the graphics buffer space.

In the embodiment, the first application program is displayed by drawing with graphics buffer data less than that of a full-screen window interface, which saves memory space of the electronic device and reduces the influence on the electronic device system due to memory occupied by the graphics buffer data.

Figure 22:
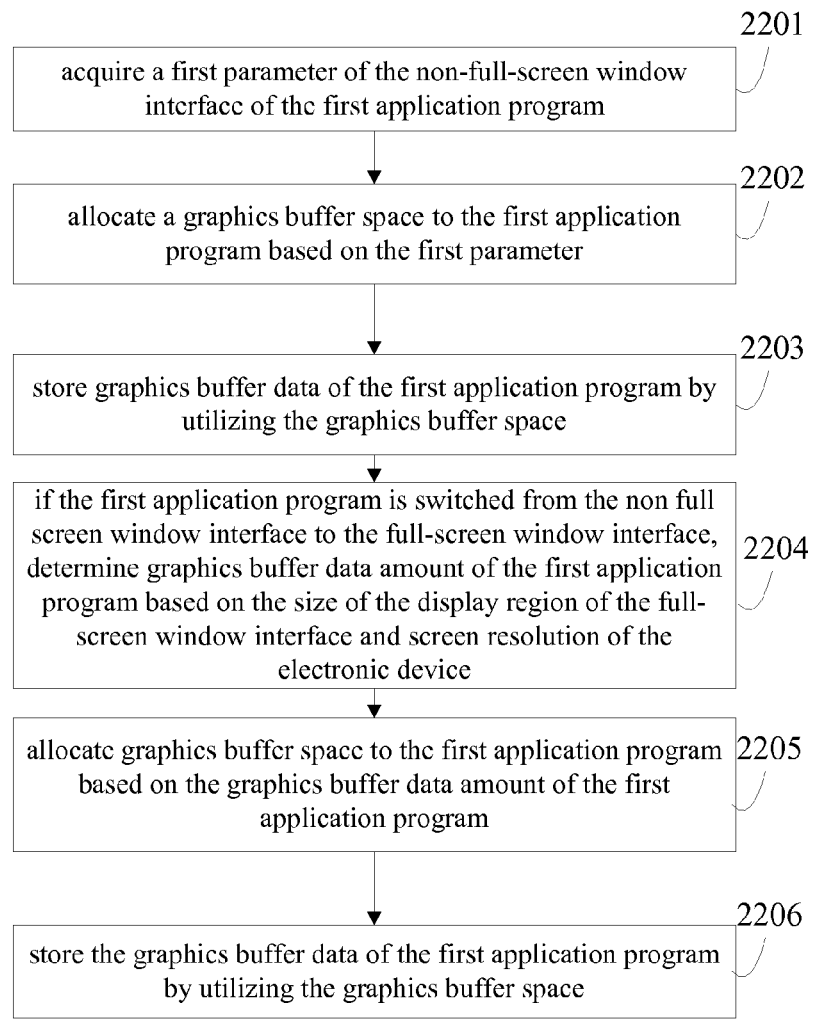
FIG. 22 is a schematic flow chart of an information processing method according to an embodiment of the disclosure.

FIG. 22 is a schematic flow chart of an information processing method according to an embodiment of the disclosure. The information processing method in the embodiment is applied to an electronic device having a touch display unit. The electronic device can run N first application programs, where N is a positive integer. If a first application program is started by an object corresponding to the first application program, the started first application program can be displayed onto the touch display unit in a non-full-screen window interface, and the display region of the non-full-screen window interface is smaller less than the display region of a full-screen window interface of the first application program.

The non-full-screen window interface is obtained by converting the full-screen window interface with a first parameter. As shown in FIG. 22, the information processing method includes the following steps S2201-S2206.

S2201 is acquiring a first parameter of the non-full-screen window interface of the first application program.

In the embodiment, the first application program run by the electronic device may be an application program owned by the electronic device system such as a clock application program and a camera application program, or may be a third-party application program set by a user such as a Wechat application program and a game application program.

In general, all the first application programs are displayed on a desktop of the electronic device in a form of icon list. One first application program corresponds to one icon, and a first application program can be started by touching an icon corresponding to the first application program. If the first application program is started as the above, the first application program is displayed on a display screen of the electronic device in a full-screen display manner.

In the embodiment of the disclosure, the first application program is an application program supporting non-full-screen window interface. The first application program is displayed on the touch display unit of the electronic device in a non-full-screen display manner if the first application program is started in a way including but not limited to the following:

adding the first application program into a multi-window management interface in advance, so as to make the first application program support non-full-screen display, where the multi-window management interface may be displayed by starting an icon corresponding to a multi-window management application program; and displaying the first application program on the touch display unit of the electronic device in a non-full-screen display manner when the first application program is started by the multi-window management interface.

Based on the above, if the first application program is displayed in the non-full-screen window interface, it is required to allocate a graphics buffer space to the first application program to store graphics buffer data. The graphics buffer space allocated to the non-full-screen window interface is less than a graphics buffer space allocated to a corresponding full-screen window interface in the embodiment.

Here, the non-full-screen window interface of the first application program corresponds to a first parameter, and the non-full-screen window interface of the first application program can be obtained by converting the full-screen window interface of the first application program by utilizing the first parameter.

In the embodiment, the first parameter at least includes a parameter, a matrix, a parameter group or a parameter set. For example, the first parameter may be realized by a first matrix, and the full-screen window interface of the first application program is converted by utilizing the first matrix, which may be realized by equation (1d):

$$\begin{pmatrix} x_2 \\ y_2 \\ z_2 \end{pmatrix} = \begin{pmatrix} M_{11} & M_{12} & M_{13} \\ M_{21} & M_{22} & M_{23} \\ M_{31} & M_{32} & M_{33} \end{pmatrix} \times \begin{pmatrix} x_1 \\ y_1 \\ z_1 \end{pmatrix} \quad (1d)$$

$$\begin{pmatrix} x_2 \\ y_2 \\ z_2 \end{pmatrix}$$

represents a coordinate vector of the non-full-screen window interface, where $x_2$ is a horizontal coordinate of the non-fullscreen window interface, $y_2$ is a vertical coordinate of the non-full-screen window interface, and $z_2$ is set as 1 by default.

$$M = \begin{pmatrix} M_{11} & M_{12} & M_{13} \\ M_{21} & M_{22} & M_{23} \\ M_{31} & M_{32} & M_{33} \end{pmatrix},$$

where M represents the first matrix, and the first matrix is a 3×3 matrix, $M_{ij}$ is an element at the i-th row in the j-th column in the first matrix, where i is taken to be 1, 2 or 3 and j is taken to be 1, 2 or 3.

$$\begin{pmatrix} x_1 \\ y_1 \\ z_1 \end{pmatrix}$$

represents a coordinate vector of the full-screen window interface, where $x_1$ is a horizontal coordinate of the full-screen window interface, $y_1$ is a vertical coordinate of the full-screen window interface, and $z_1$ is set as 1 by default.

In scaling the full-screen window interface by equation (1d), four elements of $M_{ij}$ may be set as $M_{11}=\alpha$, $M_{12}=0$, $M_{21}=0$, $M_{22}=\beta$, and other five elements may be set arbitrarily. In this way, equation (2d) may be obtained by substituting the above set parameters into equation (1d):

$$x_2 = \alpha \times x_1$$
$$y_2 = \beta \times y_1 \quad (2d)$$

where α is a scaling parameter of the horizontal coordinate, and β is a scaling parameter of the vertical coordinate.

In rotating the full-screen window interface by equation (1d), four elements of $M_{ij}$ may be set as $M_{11}=\cos\theta$, $M_{12}=\sin\theta$, $M_{21}=-\sin\theta$, $M_{22}=\cos\theta$, and other five elements may be set arbitrarily. In this way, equation (3d) may be obtained by substituting the above set parameters into equation (1d):

$$x_2 = \cos\theta \times x_1 + \sin\theta \times y_1$$
$$y_2 = -\sin\theta \times x_1 + \cos\theta \times y_1 \quad (3d)$$

where θ is a rotation angle.

Translating the full-screen window interface of the first application program by utilizing the first matrix may be realized by equation (4d):

$$\begin{pmatrix} x_2 \\ y_2 \\ z_2 \end{pmatrix} = \begin{pmatrix} M_{11} \\ M_{21} \\ M_{31} \end{pmatrix} + \begin{pmatrix} x_1 \\ y_1 \\ z_1 \end{pmatrix} \quad (4d)$$

In translating the full-screen window interface by equation (4d), three elements of $M_{ij}$ may be set as $M_{11}=a$, $M_{21}=b$, $M_{31}=0$. In this way, equation (5d) may be obtained by substituting the above set parameters into equation (4d):

$$x_2 = a + x_1$$
$$y_2 = b + y_1 \quad (5d)$$

where a is a translation parameter of the horizontal coordinate, and b is a translation parameter of the vertical coordinate.

S2202 is allocating a graphics buffer space to the first application program based on the first parameter.

Here, the graphics buffer space of the non-full-screen window interface of the first application program is less than the graphics buffer space of the full-screen window interface of the first application program.

In the embodiment, the first parameter indicates the size of a non-full-screen window interface of the first application program. Therefore, after the size of the non-full-screen window interface of the first application program is determined by the first parameter, a graphics buffer space is allocated to the first application program based on the size of the non-full-screen window interface of the first application program.

For example, in a case that the window interface of the first application program is smaller, less graphics buffer space may be allocated to the first application program, and in a case that the window interface of the first application program is larger, more graphics buffer space may be allocated to the first application program, so that data displayed in the non-full-screen window interface can be identified clearly by a user. Here, the graphics buffer space of the non-full-screen window interface of the first application program is less than the graphics buffer space of the full-screen window interface of the first application program.

S2203 is storing the graphics buffer data of the first application program by using the graphics buffer space.

S2204 is determining graphics buffer data amount of the first application program based on the size of the display region of the full-screen window interface and screen resolution of the electronic device when the first application program is switched from the non-full-screen window interface to the full-screen window interface.

The graphics buffer data amount is in direct proportion to the size of the display region and the screen resolution. The larger the display region is, the more the graphics buffer data amount is, and the smaller the display region is, the less the graphics buffer data amount is. The higher the screen resolution is, the more the graphics buffer data amount is, and the lower the screen resolution is, the less the graphics buffer data amount is.

S2205 is allocating a graphics buffer space to the first application program based on the graphics buffer data amount of the first application program.

S2206 is storing the graphics buffer data of the first application program by using the graphics buffer space.

In the embodiment, the first application program is displayed by drawing with graphics buffer data less than that of a full-screen window interface, which saves memory space of the electronic device and reduces the influence on the electronic device system due to memory occupied by the graphics buffer data.

Figure 23:
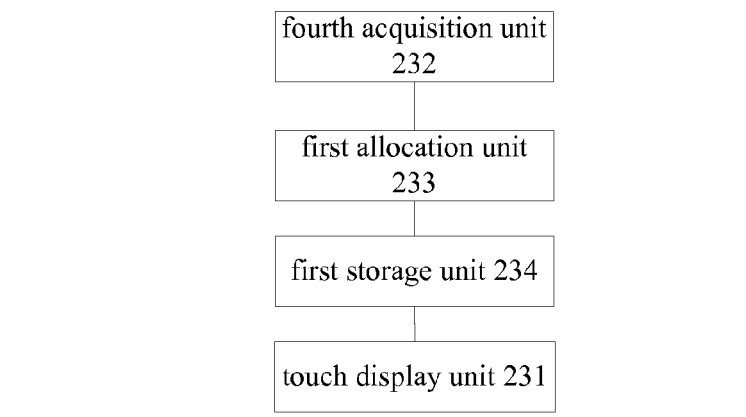
FIG. 23 is a schematic structure diagram of an electronic device according to an embodiment of the disclosure.

FIG. 23 is a schematic structure diagram of an electronic device according to an embodiment of the disclosure. The electronic device has a touch display unit 231, and can run N first application programs, where N is a positive integer. If a first application program is started by an object corresponding to the first application program, the started first application program can be displayed on the touch display unit 231 in a non-full-screen window interface, and the display region of the non-full-screen window interface is smaller less than the display region of a full-screen window interface of the first application program. The non-full-screen window interface is obtained by converting the full-screen window interface with a first parameter. As shown in FIG. 23, the electronic device includes a fourth acquisition unit 232, a first allocation unit 233 and a first storage unit 234.

The fourth acquisition unit 232 is configured to acquire a first parameter of the non-full-screen window interface of the first application program.

The first allocation unit 233 is configured to allocate a graphics buffer space to the first application program based on the first parameter, where the graphics buffer space of the non-full-screen window interface of the first application program is less than the graphics buffer space of the full-screen window interface of the first application program.

The first storage unit 234 is configured to store graphics buffer data of the first application program by utilizing the graphics buffer space.

In the embodiment of the disclosure, the first parameter at least includes a parameter, a matrix, a parameter group or a parameter set.

It should be understood by those skilled in the art that the function realized by each unit in the electronic device shown in FIG. 23 may refer to related description of the information processing method described above.

Figure 24:
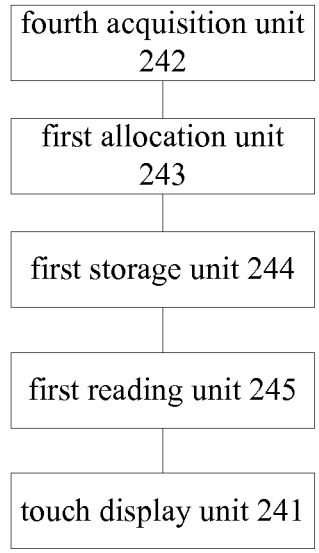
FIG. 24 is a schematic structure diagram of an electronic device according to an embodiment of the disclosure.

FIG. 24 is a schematic structure diagram of an electronic device according to an embodiment of the disclosure. The electronic device has a touch display unit 241, and can run N first application programs, where N is a positive integer. If a first application program is started by an object corresponding to the first application program, the started first application program can be displayed on the touch display unit 61 in a non-full-screen window interface, and the display region of the non-full-screen window interface is smaller less than the display region of a full-screen window interface of the first application program. The non-full-screen window interface is obtained by converting the full-screen window interface with a first parameter. As shown in FIG. 24, the electronic device includes a fourth acquisition unit 242, a first allocation unit 243 and a first storage unit 244.

The fourth acquisition unit 242 is configured to acquire a first parameter of the non-full-screen window interface of the first application program.

The first allocation unit 243 is configured to allocate a graphics buffer space to the first application program based on the first parameter, where the graphics buffer space of the non-full-screen window interface of the first application program is less than the graphics buffer space of the full-screen window interface of the first application program.

The first storage unit 244 is configured to store graphics buffer data of the first application program by utilizing the graphics buffer space.

In the embodiment of the disclosure, the first parameter at least includes a parameter, a matrix, a parameter group or a parameter set.

Preferably, the electronic device further includes a first reading unit 245.

The first reading unit 245 is configured to read the graphics buffer data of the first application program, and combine the graphics buffer data into frame buffer data corresponding to a screen display region of the electronic device.

The touch display unit 241 is configured to display the frame buffer data via the non-full-screen window interface of the first application program.

It should be understood by those skilled in the art that the function realized by each unit in the electronic device shown in FIG. 24 may refer to related description of the information processing method described above.

Figure 25:
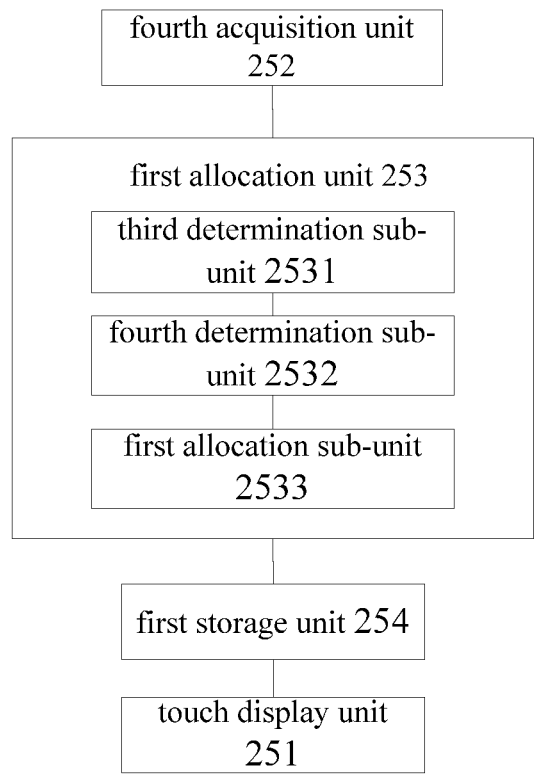
FIG. 25 is a schematic structure diagram of an electronic device according to an embodiment of the disclosure.

FIG. 25 is a schematic structure diagram of an electronic device according to an embodiment of the disclosure. The electronic device has a touch display unit 251, and can run N first application programs, where N is a positive integer. If a first application program is started by an object corresponding to the first application program, the started first application program can be displayed on the touch display unit 251 in a non-full-screen window interface, and the display region of the non-full-screen window interface is smaller less than the display region of a full-screen window interface of the first application program. The non-full-screen window interface is obtained by converting the full-screen window interface with a first parameter. As shown in FIG. 25, the electronic device includes a fourth acquisition unit 252, a first allocation unit 253 and a first storage unit 254.

The fourth acquisition unit 252 is configured to acquire a first parameter of the non-full-screen window interface of the first application program.

The first allocation unit 253 is configured to allocate a graphics buffer space to the first application program based on the first parameter, where the graphics buffer space of the non-full-screen window interface of the first application program is less than the graphics buffer space of the full-screen window interface of the first application program.

The first storage unit 254 is configured to store graphics buffer data of the first application program by using the graphics buffer space.

In the embodiment of the disclosure, the first parameter at least includes a parameter, a matrix, a parameter group or a parameter set.

Preferably, the first allocation unit 253 includes a third determination sub-unit 2531, a fourth determination sub-unit 2532 and a first allocation sub-unit 2533.

The third determination sub-unit 2531 is configured to determine the size of the display region of the non-full-screen window interface of the first application program based on the first parameter.

The fourth determination sub-unit 2532 is configured to determine graphics buffer data amount of the first application program based on the size of the display region of the non-full-screen window interface and screen resolution of the electronic device.

The first allocation sub-unit 2533 is configured to allocate graphics buffer space to the first application program based on the graphics buffer data amount of the first application program.

It should be understood by those skilled in the art that the function realized by each unit and the sub-unit thereof in the electronic device shown in FIG. 25 may refer to related description of the information processing method described above.

Figure 26:
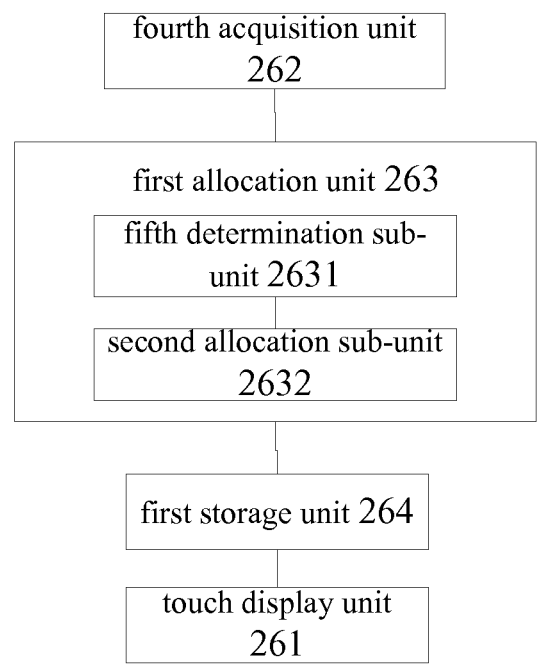
FIG. 26 is a schematic structure diagram of an electronic device according to an embodiment of the disclosure.

FIG. 26 is a schematic structure diagram of an electronic device according to an embodiment of the disclosure. The electronic device has a touch display unit 261, and can run N first application programs, where N is a positive integer. If a first application program is started by an object corresponding to the first application program, the started first application program can be displayed on the touch display unit 261 in a non-full-screen window interface, and the display region of the non-full-screen window interface is smaller less than the display region of a full-screen window interface of the first application program. The non-full-screen window interface is obtained by converting the full-screen window interface with a first parameter. As shown in FIG. 26, the electronic device includes a fourth acquisition unit 262, a first allocation unit 263 and a first storage unit 264.

The fourth acquisition unit 262 is configured to acquire a first parameter of the non-full-screen window interface of the first application program.

The first allocation unit 263 is configured to allocate a graphics buffer space to the first application program based on the first parameter, where the graphics buffer space of the non-full-screen window interface of the first application program is less than the graphics buffer space of the full-screen window interface of the first application program.

The first storage unit 264 is configured to store graphics buffer data of the first application program by utilizing the graphics buffer space.

In the embodiment of the disclosure, the first parameter at least includes a parameter, a matrix, a parameter group or a parameter set.

Preferably, the first allocation unit 263 includes a fifth determination sub-unit 2631 and a second allocation sub-unit 2632.

The fifth determination sub-unit 2631 is configured to determine graphics buffer data amount of the first application program based on the size of the display region of the full-screen window interface and screen resolution of the electronic device when the first application program is switched from the non-full-screen window interface to the full-screen window interface.

The second allocation sub-unit 2632 is configured to allocate a graphics buffer space to the first application program based on the graphics buffer data amount of the first application program.

It should be understood by those skilled in the art that the function realized by each unit and the sub-unit thereof in the electronic device shown in FIG. 26 may refer to related description of the information processing method described above.

In the embodiments provided by the application program, it should be understood that the disclosed device and method can be realized in other ways. The device embodiments described above are just schematic. For example, the described units are divided only according to logical functions, and can be divided in other ways during actual implementation, for example, multiple units and components can be combined together or can be integrated into another system, or some features can be avoided or can not be performed. In addition, a coupling, a direct coupling and a communication connection between various constitutional parts which are displayed or discussed may be an indirect coupling or a communication connection through some interfaces, devices or units which may be in an electrical form, a mechanical form or other forms.

It should be understood that, in the embodiments of the disclosure, the disclosed devices and methods may be implemented in other ways. The device embodiments described above are only illustrative. For example, the division of the units is only division in logical function, which may be achieved in other ways in practical applications, such as multiple units or members may be combined, or may be integrated into another system, or some features may be omitted or not be performed. In addition, the coupling, or direct coupling or communication connection among individual components that are displayed or discussed may be implemented via indirect coupling or communication connection between some interfaces, devices or units, and may be electrical, mechanical or may be in other forms.

The above units described as separate components may be or may not be separated physically. The component shown as a unit may be or may not be a physical unit, i.e., may be located at one place or may be distributed onto multiple network units. All or part of the units therein may be selected according to actual needs to implement the object of the solution of the embodiment.

In addition, all of the individual function units in the embodiments of the disclosure may be integrated into one processing unit, or each unit may be an independent unit, or may be a unit formed by integrating two or more units. The integrated unit described above may y be implemented in a form of hardware, or may be implemented in a form of hardware and software function units.

Those skilled in the art should understand that the embodiment of the disclosure may be embodied as method, system, or computer program product. Accordingly, the disclosure may be in a form of hardware completely, software completely, or a combination of software and hardware. Moreover, the disclosure may be in a form of a computer program product which is implemented on one or more computer usable and installable media (including but not limited to disk device, CD-ROM and optical device) containing computer usable program codes.

The disclosure is described by referring to flow charts and/or block diagrams of a method, a device (system) and a computer program product according to the embodiments of the disclosure. It should be understood that, each flow and/or block in the flow charts and/or block diagrams and combination of flows and/or blocks in the flow charts and/or block diagrams may be implemented by computer program instructions. These computer program instructions may be provided for a general purpose computer, a dedicated computer, an embedded processor or processors of other programmable data processing devices, to produce a machine, such that apparatuses for implementing functions specified in one or more flows of the flow charts and/or one or more blocks of the block diagrams is produced by the instructions executed by a computer or processes of other programmable data processing devices.

These computer program instructions may be stored in a computer readable storage which can conduct a computer or other programmable data processing devices to operate in a special manner, such that the instructions stored in the computer readable storage produce an article including instruction apparatuses, and the instruction apparatuses implement functions specified in one or more flows of the flow charts and/or one or more blocks of the block diagrams.

These computer program instructions may be loaded into a computer or other programmable data processing devices, such that a series of operating steps are performed on the computer or other programmable data processing devices to produce a processing implemented by a computer, thus the instructions executed on the computer or other programmable devices are provided to implement the steps of functions specified in one or more flows of the flow charts and/or one or more blocks of the block diagrams.

With the above description of the disclosed embodiments, those skilled in the art can practice or use the disclosure. Various modifications to the embodiments are apparent for those skilled in the art. The general principle defined herein can be implemented in other embodiments without departing from the spirit or scope of the present application. Therefore, the present application should not be limited to the embodiments disclosed herein, but has the widest scope that is in conformity with the principle and the novel features disclosed herein.

The invention claimed is:

1. An information processing method, which is applied to an electronic device, wherein the electronic device comprises a touch display unit on which M application programs are capable of being run simultaneously, and M window interfaces of the M application programs are capable of being displayed simultaneously on a display region of the touch display unit, M is a positive integer, the method comprises:

acquiring a triggering instruction for starting a first application program of the M application programs;

executing the triggering instruction, and obtaining a first parameter;

generating a first window interface of the first application program based on the first parameter; and displaying the first window interface, wherein a display area of the first window interface is less than a full-screen display area of the first application program on the display region.

2. The method according to claim 1, wherein the first parameter at least comprises a parameter value, a matrix, a parameter group or a parameter set.

3. The method according to claim 2, wherein the first parameter is a first matrix which is inverse-transformable, and the method further comprises:

acquiring a touch instruction of an operator on the first window interface;

acquiring a position coordinate of a touch instruction of the operator on the first window interface;

performing inverse transformation on the first matrix to obtain a first inverse matrix;

performing a fifth arithmetic on the position coordinate with the first inverse matrix, to obtain a second position coordinate; and transmitting the second position coordinate to the first window interface to be used for responding the touch instruction on the first window interface.

4. The method according to claim 2, wherein the method further comprises, after the displaying the first window interface, acquiring a first operation instruction for controlling the first window interface;

executing the first operation instruction, and converting the first parameter into a second parameter;

converting the first window interface based on the second parameter to obtain a second window interface; and displaying the second window interface.

5. The method according to claim 4, wherein the first parameter is a first matrix and the first matrix is inverse-transformable.

6. The method according to claim 5, wherein the acquiring a first operation instruction for controlling the first window interface comprises:

acquiring a rotating operation instruction for controlling the first window interface to rotate, and the converting the first window interface based on the second parameter to obtain a second window interface comprises:

rotating the first window interface based on the second parameter to obtain the second window interface, wherein the application program corresponding to the first window interface is displayed in the second window interface, and a display area of the second window interface is less than a display area of the touch display unit.

7. The method according to claim 6, wherein the executing the first operation instruction and converting the first parameter into a second parameter comprises:

parsing the first operation instruction to obtain first rotation angle information; and determining the second parameter based on the first rotation angle information, and the rotating the first window interface based on the second parameter comprises:

rotating the first window interface based on the second parameter, wherein the first window interface rotates by an angle that equals to an angle in the first operation instruction for rotating the first window interface.

8. The method according to claim 7, wherein in rotating the first window interface based on the second parameter, a parameter component corresponding to size of a display region of the second window interface in the second parameter keeps unchanged, so that the size of the display region of the second window interface keeps unchanged; or a parameter component corresponding to size of a display region of the second window interface in the second parameter is changed based on the first rotation angle information, so that all content in the second window interface is displayed on the touch display unit.

9. The method according to claim 6, wherein the executing the first operation instruction and converting the first parameter into a second parameter comprises:

determining the second parameter based on preset first rotation angle information, and the rotating the first window interface based on the second parameter comprises:

rotating the first window interface based on the second parameter, wherein the first window interface rotates by an angle that corresponds to the preset first rotation angle information.

10. The method according to claim 5, wherein the acquiring a first operation instruction for controlling the first window interface comprises:

acquiring a move operation instruction for controlling the first window interface to move from a current position region to a first position region which is not completely overlapped with the current position region, wherein the current position region and the first position region are both on the display region, the executing the first operation instruction and converting the first parameter into a second parameter comprises:

executing the move operation instruction to obtain at least one first conversion coefficient;

determining at least one first matrix element corresponding to the move operation instruction in the first matrix;

performing a first arithmetic on the at least one first matrix element with the at least one first conversion coefficient, to obtain at least one second matrix element; and generating a second matrix, wherein the second matrix is the second parameter, and the converting the first window interface based on the second parameter to obtain a second window interface comprises:

acquiring, on the current position, a first position coordinate set of all data points of the first window interface; and performing a second arithmetic on each of position coordinates in the first position coordinate set sequentially with the second matrix, to obtain a second position coordinate set and thus the second window interface, wherein the second position coordinate set is a position coordinate set of all data points of the second window interface in the first position region.

11. The method according to claim 5, wherein the acquiring a first operation instruction for controlling the first window interface comprises:

acquiring a zooming operation instruction for controlling a display area of the first window interface to be adjusted from a current display area to a first display area not equal to the current display area, wherein the first display area is less than or equal to the full-screen display area, the executing the first operation instruction and converting the first parameter into a second parameter comprises:

executing the zooming operation instruction to obtain at least one second conversion coefficient;

determining at least one third matrix element corresponding to the zooming operation instruction in the first matrix;

performing a third arithmetic on the at least one third matrix element with the at least one second conversion coefficient to obtain at least one fourth matrix element; and generating a third matrix, wherein the third matrix is the second parameter, and the converting the first window interface based on the second parameter to obtain a second window interface comprises:

acquiring a third position coordinate set of all data points of the first window interface in a case that the display area of the first window interface is the current display area; and performing a fourth arithmetic on each of position coordinates in the third position coordinate set sequentially with the third matrix, to obtain a fourth position coordinate set and thus the second window interface, wherein the fourth position coordinate set is a position coordinate set of all data points of the second window interface having the first display area, and first content information displayed in the first window interface is the same as second content information displayed in the second window interface.

12. The method according to claim 1, wherein the method further comprises:

allocating a graphics buffer space to the first application program based on the first parameter, wherein the graphics buffer space of the first application program for the first window interface is less than graphics buffer space of the first application program for a full-screen display window interface; and storing graphics buffer data of the first application program in the allocated graphics buffer space.

13. The method according to claim 12, wherein the method further comprises:

reading the graphics buffer data of the first application program, and combining the graphics buffer data into frame buffer data corresponding to a screen display region of the electronic device; and displaying the frame buffer data in the first window interface of the first application program on the touch display unit of the electronic device.

14. The method according to claim 12, wherein the allocating a graphics buffer space to the first application program based on the first parameter comprises:

determining size of a display region of the first window interface of the first application program based on the first parameter;

determining graphics buffer data amount of the first application program based on the size of the display region of the first window interface and screen resolution of the electronic device; and allocating the graphics buffer space to the first application program based on the graphics buffer data amount of the first application program.

15. An electronic device, wherein the electronic device comprises a touch display unit on which M application programs are capable of being run simultaneously, and M window interfaces of the M application programs are capable of being displayed simultaneously on a display region of the touch display unit, M is a positive integer, the electronic device further comprises:

a first acquisition unit, configured to acquire a triggering instruction for starting a first application program of the M application programs;

a first execution unit, configured to execute the triggering instruction and obtain a first parameter;

a first generation unit, configured to generate a first window interface of the first application program based on the first parameter; and a first display unit, configured to display the first window interface, wherein a display area of the first window interface is less than a full-screen display area of the first application program on the display region.

16. The electronic device according to claim 15, wherein the first parameter at least comprises a parameter value, a matrix, a parameter group or a parameter set.

17. The electronic device according to claim 16, wherein the electronic device further comprises:

a second acquisition unit, configured to acquire a first operation instruction for controlling the first window interface after the first window interface is displayed on the first display unit;

a second execution unit, configured to execute the first operation instruction and convert the first parameter into a second parameter;

a first conversion unit, configured to convert the first window interface based on the second parameter to obtain a second window interface; and a second display unit, configured to display the second window interface.

18. The electronic device according to claim 15, wherein the first parameter is a first matrix which is inverse-transformable, and the electronic device further comprises:

a third acquisition unit, configured to acquire a touch instruction of an operator on the first window interface;

a fourth acquisition unit, configured to acquire a position coordinate of a touch instruction of the operator on the first window interface;

a second conversion unit, configured to perform inverse transformation on the first matrix to obtain a first inverse matrix;

a fifth arithmetic unit, configured to perform a fifth arithmetic on the position coordinate with the first inverse matrix, to obtain a second position coordinate; and a first transmission unit, configure to transmit the second position coordinate to the first window to be used for responding the touch instruction on the first window interface.

19. The electronic device according to claim 17, wherein the second acquisition unit comprises:

a third acquisition sub-unit, configured to acquire a rotating operation instruction for controlling the first window interface to rotate, and the first conversion unit comprises:

a rotation unit, configured to rotate the first window interface based on the second parameter to obtain the second window interface, wherein the application program corresponding to the first window interface is displayed in the second window interface, and a display area of the second window interface is less than a display area of the touch display unit.

20. The electronic device according to claim 19, wherein
the fourth acquisition sub-unit is further configured to determine the second parameter based on preset first rotation angle information; and
the rotation unit is further configured to rotate the first window interface based on the second parameter, wherein the first window interface rotates by an angle that corresponds to the preset first rotation angle information.

21. The electronic device according to claim 19, wherein
the third acquisition sub-unit is further configured to parse the first operation instruction to obtain first rotation angle information;
the fourth acquisition sub-unit is further configured to determine the second parameter based on the first rotation angle information; and
the rotation unit is further configured to rotate the first window interface based on the second parameter, wherein the first window interface rotates by an angle that equals to an angle in the first operation instruction for rotating the first window interface.

22. The electronic device according to claim 21, wherein in the rotation unit rotating the first window interface based on the second parameter,
a parameter component corresponding to size of a display region of the second window interface in the second parameter keeps unchanged, so that the size of the display region of the second window interface keeps unchanged; or
a parameter component corresponding to size of a display region of the second window interface in the second parameter is changed based on the first rotation angle information, so that all content in the second window interface is displayed on the touch display unit.

23. The electronic device according to claim 17, wherein the first parameter is a first matrix and the first matrix is inverse-transformable.

24. The electronic device according to claim 23, wherein the second acquisition unit comprises:
a first acquisition sub-unit, configured to acquire a move operation instruction for controlling the first window interface to move from a current position region to a first position region which is not completely overlapped with the current position region, wherein the current position region and the first position region are both on the display region,
the second execution unit comprises:
a first execution sub-unit, configured to execute the move operation instruction to obtain at least one first conversion coefficient;
a first determination sub-unit, configured to determine at least one first matrix element corresponding to the move operation instruction in the first matrix;
a first arithmetic sub-unit, configured to perform a first arithmetic on the at least one first matrix element with the at least one first conversion coefficient, to obtain at least one second matrix element; and
a first generation sub-unit, configured to generate a second matrix, wherein the second matrix is the second parameter, and
the first conversion unit comprises:
a fourth acquisition sub-unit, configured to acquire, on the current position, a first position coordinate set of all data points of the first window interface; and
a second arithmetic sub-unit, configured to perform a second arithmetic on each of position coordinates in the first position coordinate set sequentially with the second matrix, to obtain a second position coordinate set and thus the second window interface, wherein the second position coordinate set is a position coordinate set of all data points of the second window interface in the first position region.

25. The electronic device according to claim 23, wherein the second acquisition unit comprises:
a second acquisition sub-unit, configured to acquire a zooming operation instruction for controlling a display area of the first window interface to be adjusted from a current display area to a first display area not equal to the current display area, wherein the first display area is less than or equal to the full-screen display area,
the second execution unit comprises:
a second execution sub-unit, configured to execute the zooming operation instruction to obtain at least one second conversion coefficient;
a second determination sub-unit, configured to determine at least one third matrix element corresponding to the zooming operation instruction in the first matrix;
a third arithmetic sub-unit, configured to perform a third arithmetic on the at least one third matrix element with the at least one second conversion coefficient to obtain at least one fourth matrix element; and
a second generation sub-unit, configured to generate a third matrix, wherein the third matrix is the second parameter, and
the first conversion unit comprises:
a fifth acquisition sub-unit, configured to acquire a third position coordinate set of all data points of the first window interface in a case that the display area of the first window interface is the current display area; and
a fourth arithmetic sub-unit, configured to perform a fourth arithmetic on each of position coordinates in the third position coordinate set sequentially with the third matrix, to obtain a fourth position coordinate set and thus the second window interface, wherein the fourth position coordinate set is a position coordinate set of all data points of the second window interface having the first display area, and first content information displayed in the first window interface is the same as second content information displayed in the second window interface.

26. The electronic device according to claim 15, wherein the electronic device further comprises a first allocation unit and a first storage unit, wherein
the first allocation unit is configured to allocate a graphics buffer space to the first application program based on the first parameter, wherein the graphics buffer space of the first application program for the first window interface is less than graphics buffer space of the first application program for a full-screen display window interface; and
the first storage unit is configured to store graphics buffer data of the first application program in the allocated graphics buffer space.

27. The electronic device according to claim 26, wherein the electronic device further comprises a first reading unit, wherein
the first reading unit is configured to read the graphics buffer data of the first application program, and combining the graphics buffer data into frame buffer data corresponding to a screen display region of the electronic device; and the touch display unit is further configured to display the frame buffer data in the first window interface of the first application program.

28. The electronic device according to claim 26, wherein the first allocation unit comprises a third determination sub-unit, a fourth determination sub-unit and a first allocation sub-unit, wherein
  the third determination sub-unit is configured to determine size of a display region of the first window interface of the first application program based on the first parameter;
  the fourth determination sub-unit is configured to determine graphics buffer data amount of the first application program based on the size of the display region of the first window interface and screen resolution of the electronic device; and
  the first allocation sub-unit is configured to allocate the graphics buffer space to the first application program based on the graphics buffer data amount of the first application program.

* * * * *